United States Patent
Kageyama

(10) Patent No.: US 6,539,294 B1
(45) Date of Patent: Mar. 25, 2003

(54) VEHICLE GUIDANCE SYSTEM FOR AVOIDING OBSTACLES STORED IN MEMORY

(75) Inventor: Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/857,409

(22) PCT Filed: Nov. 3, 1999

(86) PCT No.: PCT/JP99/01171

§ 371 (c)(1),
(2), (4) Date: Jun. 4, 2001

(87) PCT Pub. No.: WO00/33152

PCT Pub. Date: Jun. 8, 2000

(30) Foreign Application Priority Data

Feb. 13, 1998 (JP) .......... 10-031531
Dec. 3, 1998 (JP) .......... 10-344407

(51) Int. Cl.[7] .......... G01C 22/00; G05D 1/00
(52) U.S. Cl. .......... 701/23; 701/25; 701/26; 701/210; 701/209; 180/168; 318/568.1; 318/587; 348/118; 348/119
(58) Field of Search .......... 701/1, 23, 24, 701/25, 26, 207, 208, 209, 210, 211; 180/167, 168, 169; 318/587, 580, 568.1, 567; 348/113, 118, 119

(56) References Cited

U.S. PATENT DOCUMENTS

| | | | | |
|---|---|---|---|---|
| 4,809,178 A | * | 2/1989 | Ninomiya et al. | 318/587 |
| 5,006,988 A | * | 4/1991 | Borenstein et al. | 180/169 |
| 5,036,935 A | * | 8/1991 | Kohara | 180/168 |
| 5,321,614 A | * | 6/1994 | Ashworth | 180/167 |
| 5,343,206 A | * | 8/1994 | Ansaldi et al. | 342/179 |
| 5,969,969 A | * | 10/1999 | Ejiri et al. | 701/207 |
| 6,026,347 A | * | 2/2000 | Schuster | 180/167 |
| 6,169,572 B1 | * | 1/2001 | Sogawa | 348/113 |

FOREIGN PATENT DOCUMENTS

| | | |
|---|---|---|
| JP | 61240306 | 10/1986 |
| JP | 63271509 | 9/1988 |
| JP | 324606 | 2/1991 |
| JP | 7146707 | 6/1995 |
| JP | 7248820 | 9/1995 |
| JP | 2523005 | 5/1996 |
| JP | 2651662 | 5/1997 |
| JP | 10105233 | 4/1998 |

* cited by examiner

Primary Examiner—Jacques Louis Jacques
(74) Attorney, Agent, or Firm—Varndell & Varndell, PLLC

(57) ABSTRACT

If an obstacle (74) is detected, its position is stored in obstacle memory unit (41) on the assumption that the obstacle (74) is common to a plurality of vehicles (2, 2). As vehicles (2, 2) pass by, the content of the obstacle memory unit (44) is updated. When the vehicles (2, 2) are supplied with position data of the respective goal point (72, 72), the vehicles (2, 2) are guided by their goal point (72, 72) in accordance with the content of the obstacle memory unit (41) so that they can avoid the obstacle (74). Vehicles can be thus guided to avoid obstacles by knowing the existence of obstacles in the working sites where the positions of obstacles are always different.

33 Claims, 24 Drawing Sheets

UPDATING LOADING AREA

VEHICLE GUIDANCE SYSTEM FOR AVOIDING OBSTACLES STORED IN MEMORY

TECHNICAL FIELD

This invention relates to a vehicle guidance system, and particularly to a system suitable for applications in cases where a plurality of unmanned off-road dump trucks are guided at a work site such as a mine.

BACKGROUND ART

Unmanned vehicle guidance systems are being broadly and practically implemented which guide the movements of unmanned vehicles such as unmanned off-road dump trucks at mining sites of extensive area in the interest of releasing from hard labor, lowering production costs, and reducing fuel consumption, etc.

These unmanned vehicles carry position measurement equipment that uses GPS (global positioning system) equipment or the like to measure travel positions thereof. At a monitoring station that monitors a plurality of unmanned vehicles, meanwhile, position data for travel courses that the unmanned vehicles are to travel over are determined by means of work site surveying and/or teaching, and stored in memory. When an unmanned vehicle is sent such travel course position data via radio communications or the like, that vehicle measures its own position (and direction) with the on-board position measuring equipment, and effects vehicle steering control so that it successively reaches positions on that travel course while comparing the measured current position with the successive positions on the travel course.

One widely employed method of acquiring the travel course position data noted here is a teaching method wherewith a manned vehicle designed for teaching is actually driven and the course run is stored in memory.

In such cases, the teaching vehicle actually travels over a course, and position data are acquired for a course extending from a starting point to a target point, or for a course that extends from the starting point, passes through the target point, and returns to a finish point, so that unmanned vehicles will pass through the target points that they are supposed to reach. Another method is to acquire only the position data for the target point by teaching and then generate the courses to be run from those target point position data.

Consider, for example, the case diagrammed in FIG. 8 where, at a mining site, there exists a dumping area 65 where an unmanned vehicle 2 is to perform the operation of transporting earth and dumping that earth, that is, an earth dumping operation. Position data for a travel course 71 that passes through a target dumping point 72 in that dumping area 65 are acquired by the teaching method.

Work sites such as mining sites of extensive area are usually unpaved, and the road surface conditions change from time to time in conjunction with the traveling of the unmanned vehicles 2. Also, during the traveling of the unmanned vehicles 2, the rock and earth loaded thereon sometimes fall onto the road surface. It sometimes happens, therefore, that potholes and/or mud is formed on the travel course obtained by teaching, making it very difficult for the vehicles to pass through. There are also cases where rocks and the like appear on travel courses obtained by teaching, making it impossible for vehicles to pass through. In this specification, the comprehensive term "obstacle(s)" is applied to all obstacles to vehicle travel resulting from potholes, mud, or fallen load.

In such cases, it is necessary to again conduct teaching for a new travel course that will avoid the obstacle or obstacles.

However, redoing the teaching operation every time the road surface condition changes or every time load falls from another unmanned vehicle results in the loading operations or dumping operations being interrupted and causes a sharp decline in work efficiency.

In the face of this, a method is being adopted wherewith, instead of avoiding conflict with the obstacles noted above by redoing the teaching operation, an obstacle 74 is detected by an obstacle detector 34 carried on the unmanned vehicle 2 while that vehicle is moving, as diagrammed in FIG. 9, so that each vehicle can individually alter the course it is traveling over.

In Japanese Patent Application Laid-Open No. 63-273916, Japanese Patent Application Laid-Open. No. 3-113516, and Japanese Patent Application Laid-Open No. 5-87608, for example, inventions are described wherewith obstacles ahead of a vehicle are detected by an obstacle detector carried by the vehicle, and the travel course is altered so as to avoid conflict with that detected obstacle.

Using the inventions described in the publications noted above, however, only obstacles in front of a vehicle within a range detectable by the obstacle detector can be detected. Other obstacles existing on the travel course after course alteration cannot be detected ahead of time. For that reason, when a vehicle starts to negotiate an altered travel course, there is a danger that conflicts will occur with such other obstacles.

The inventions described in the publications noted above are only able to detect obstacles of shapes that are detectable by an obstacle detector. Conversely, obstacles of a shape that is undetectable by the obstacle detector cannot be detected. Obstacle detectors are generally capable of detecting obstacles that bulge out from the road surface, that is, obstacles such as fallen load (rocks), and can alter the travel course so that such obstacles are avoided. They are not able, however, to detect potholes that constitute indentations in the road surface, or rough road surfaces, or mud or the like. For that reason, there is a danger that vehicles will run afoul of such obstacles because the travel course will not be altered to avoid them, rendering the vehicles unable to move.

A plurality of unmanned vehicles will be in operation at a work site. However, even if each of those plurality of unmanned vehicles carries an obstacle detector, there is no guarantee that every one of that plurality of vehicles will always be able to safely detect the same obstacle. More specifically, obstacle detectors generally make use of milliwave radar, laser radar, or visual sensors, wherewith the obstacle detection precision is affected by the S/N ratio.

Work sites such as mining sites tend to become dusty. Thus it happens that such dust constitutes noise when obstacles are being detected by obstacle detectors, making it very difficult to distinguish between those obstacles and the surrounding environment. It is thus possible that, depending on changes in the surrounding environment, even if an obstacle can be detected by the obstacle detector carried on one unmanned vehicle, that same obstacle might not be detectable with the obstacle detector carried on another unmanned vehicle. There is therefore a danger that the unmanned vehicle that could not detect the obstacle will run afoul of that obstacle.

In Japanese Patent Application Laid-Open No. 10-38586, an invention is described wherewith, instead of detecting obstacles ahead of vehicles by obstacle detectors, the obstacles are registered beforehand, and an alarm is issued when a vehicle approaches such a pre-registered obstacle to alert the operator to be careful.

In the invention described in this publication, the positions of obstacles to a snow removal vehicle are stored beforehand in a memory medium carried on board the snow removal vehicle. Provision is made so that, while the snow removal vehicle is in operation, the data in that memory medium are sequentially read out, and an alarm is issued when an obstacle stored in that memory medium is approached to alert the operator to be careful.

According to the invention described in the publication noted above, only those obstacles that have been pre-stored in the memory medium can be detected and avoided. Conversely, newly developed obstacles that have not been pre-stored in the memory medium cannot be detected or avoided.

To be sure, the problem of overlooking obstacles will not occur in applications in cases where fixed obstacles are detected, and no new ones develop, as in snow removal vehicle operations, with respect to ditches and road shoulders and the like that are covered with snow.

When the invention described in the publication noted above is employed at work sites such as mining sites of extensive area where pluralities of unmanned vehicles are operated, however, problems arise in that newly developed obstacles are overlooked and already removed obstacles are erroneously detected as obstacles.

More specifically, at mining sites of extensive area, objects (load) fall from the unmanned dump trucks from time to time. And, even when such obstacles (load) do fall, they may be promptly discovered and removed by a manned vehicle such as a bulldozer. There will also be cases where another manned work vehicle such as a bulldozer or fuel truck or the like will be stopped on the travel course of an unmanned dump truck. In such cases, the manned work vehicle constitutes an obstacle to the unmanned vehicle. Also, the positions where such manned vehicles that constitute obstacles stop change from time to time. Thus the obstacles are not stationary or fixed at work sites such as this where a plurality of vehicles is being operated. New obstacles will develop, or be removed, and the positions thereof will change from time to time, as the vehicles travel about.

Accordingly, when the invention described in the publication noted above is employed, there will be cases where newly developed obstacles other than those obstacles pre-stored in the memory medium are overlooked, thus giving rise to the possibility that a vehicle will run afoul of such obstacles. Problems will also arise when, conversely, obstacles already removed are erroneously recognized as existing obstacles and unnecessary course changes are made or the vehicle is stopped unnecessarily.

In other words, the invention described in Japanese Patent Application Laid-Open No. 10-38586 is not able to cope with work sites where the obstacles change in real time, such as work sites where pluralities of vehicles are operated.

The objects of the present invention, which was devised in view of the situation described in the foregoing, are as follows.

(1) To provide for altering the travel course when an obstacle develops, with good work efficiency (altering the travel course with better work efficiency than with methods based on teaching).

(2) To eliminate the overlooking of obstacles and the erroneous recognition of obstacles even at work sites where the obstacles change in real time, such as at work sites where pluralities of vehicles are being operated.

(3) To make it possible to capture obstacles without fail, even when they are obstacles existing within a range undetectable by the obstacle detector, or are obstacles of an undetectable shape.

(4) To make it possible to capture objects without fail, irrespective of noise surrounding the obstacle or other surrounding environment.

Other objects are described next.

The teaching procedure described earlier exhibits great capability in operations where the same course is traveled repeatedly. At sites where the shape of the course changes frequently, however, the operation of producing course data by teaching must be done frequently, wherefore the capability thereof is severely limited.

In a loading area at a mining site, for example, the positions of loading equipment such as wheel loaders or power shovels are subject to change at any time as the work progresses. In a dumping area at a mining site, on the other hand, dumping is not only done at a fixed dumping facility (pit), but the procedure of dumping while successively altering the dumping position within a dumping area having a certain breadth is also employed.

With the teaching procedure described earlier, it is necessary to teach a new course every time the position of the loading equipment or the dumping position changes, and that necessity severely impairs the personnel reduction benefit of an unmanned dumping system.

In order to cope with changing work sites like this, the method of altering once prepared courses and then using them, and the method of guiding the vehicles by radio control have been proposed.

Specifically, in Japanese Patent Application Laid-Open No. 5-257529, a method is proposed wherewith, after guiding a vehicle by radio control, a course for returning to the circuit course (original course) is generated.

It is possible to guide a vehicle to any location using such radio control, in like manner as in manual operations, but personnel are then needed to operate the radio control. When a vehicle is guided from outside using a joy stick or the like, moreover, a very difficult and onerous operation is required that involves continually switching between the direction of advance of the vehicle and the operator's own point of view, as has been demonstrated by actually employing radio control equipment.

To avoid the difficulties of such radio control operations, there are cases also where most of the work is done by unmanned operations, but when loading operations are done, operators climb into vehicles and perform the operation.

A method has also been proposed, in Japanese Patent Application Laid-Open No. 9-44243, wherewith courses are produced from a branching point in a scheduled course (original course) using cubic curves.

This method exhibits higher utility in actual use than does the method using radio control, but it suffers shortcomings in that the range wherein the vehicle can be guided is limited by the cubic curve, and in that there is a possibility of conflict with a vehicle when an obstacle exists within the guidance range.

The occurrence of conflicts cannot be verified unless a vehicle is actually test-operated, wherefore adequate monitoring is necessary during operation, and it is also very difficult to use unless the work site allows a sufficiently flat guidance range to be prepared beforehand.

There is a proposal made in Japanese Patent Application Laid-Open No. 8-101712 that takes conflicts with obstacles into consideration after planning vehicle travel routes. This involves teaching for straight line segments and other simple segments but teaching with an actual vehicle for complex segments where there is a great possibility of conflict.

With this method, teaching for the loading segments has to be repeated as a loading operation progresses, so there is no hope of improving utilization convenience.

Furthermore, a method has been proposed (in Japanese Patent Application Laid-Open No. 1-173300) wherewith the shape of an extremely confined course area such as a parking area is detected with a revolving ultrasound sensor, and the ideal steering angle for entering that parking area is found from a database and indicated to the driver.

With that method, however, it is impossible to operate unmanned traveling vehicles that move freely while changing the steering angle within course areas that are both large and complex while avoiding conflicts.

In other words, unlike a parking area, the shapes of and target positions in course areas at loading sites in mining facilities differ over a very broad range. Also, it is very difficult in practice to create a database for finding one-to-one course data from the shape of that course area, etc., and hence a more general-purpose method is deemed necessary.

Furthermore, in route searches for general articulated industrial robots, the concept of a configuration coordinate system wherein the angle at each axis is taken in a coordinate axis is widely used. In view of the fact that each robot axis can move independently, it is possible for a robot to move in a straight line passing through any two points within that space. (Conversely, it is not always possible for a robot to move between any two points given in three-dimensional space.) By using this space, the maze method and various other route search techniques have been devised.

In the space described above, if a route is first produced which will avoid conflict with obstacles, that route will always be negotiable. That is, it will be possible to effect route searches that consider obstacle avoidance only, giving no thought to the problem of route negotiability.

This configuration coordinate system concept cannot be used in unmanned vehicles which operate with steering controls. That is, even if the positions of two points in a plane, and directions of vehicle advance at those position, are prescribed, an unmanned vehicle that only has functions for moving forward and in reverse, and steering, cannot move over a route that connects the positions noted above with straight lines.

That is, even if a route is planned which gives the priority to obstacle avoidance, it will be impossible for an ordinary vehicle that operates with steering controls and the like, specifically a vehicle having steering mechanisms such as a front wheel steering mechanism, rear wheel steering mechanism, four wheel steering mechanism, and articulation, to negotiate that course.

In FIG. 37, for example, a route between two points is represented which takes an obstacle into consideration. In this case, however, it is clearly impossible for vehicle A to move.

Given the conditions diagrammed in FIG. 37, a route such as that diagrammed in FIG. 38 is desirable.

In order to resolve the problem described in the foregoing, there are cases where the vehicle mechanisms are modified and a vehicle is designed which is capable of moving in all directions. Extra steering mechanisms not only involve increased costs, however, but high-speed driving stability is lost, wherefore such are not suitable for applications to unmanned vehicles used at mining sites where high-speed travel is demanded.

In view of the situation described in the foregoing, an object of the present invention is to provide an unmanned vehicle guidance system wherewith guidance courses can easily be prepared that are responsive to changes in course area shape and changes in movement target positions, and wherewith vehicles can be prevented from conflicting with course area boundaries and excavation faces.

DISCLOSURE OF THE INVENTION

Thereupon, a first invention is a vehicle guidance system for guiding a plurality of vehicles, comprising:

memory means for storing positions of obstacles at a work site common to the plurality of vehicles when that plurality of vehicle travel simultaneously over that work site;

updating means for updating content stored in the memory means; and guidance means for guiding the.plurality of vehicles based on the content stored in the memory means so that those vehicles do not conflict with the obstacles.

Based on the first invention, as diagrammed in FIG. 3 and FIG. 12(a), when an obstacle 74 has been detected, etc., the position of that obstacle 74 is stored in the memory means 41, considering that position as an obstacle 74 common to a plurality of vehicles 2, 2 . . . . Then, as the multiple vehicles 2, 2 . . . travel, the content stored in the memory means 41 is continually updated.

Guidance is effected, based on the content stored in the memory means 41, so that there is no conflict with the obstacle 74. That is, conflicting objects are avoided by stopping before they are reached, etc.

According to this invention, as described in the foregoing, provision is made so that the position of the obstacle 74 common to the plurality of vehicles 2, 2 . . . is stored in the memory means 41, and so that the content stored in the memory means 41 is updated in conjunction with the traveling of the plurality of vehicles 2, 2 . . . . Therefore, even should one vehicle overlook or erroneously recognize something as an obstacle, that which has been accurately judged by another vehicle will be recorded as an obstacle. Accordingly, even if at a work site where the obstacles change in real time, as at a work site where multiple vehicles are traveling about, there will cease to be obstacles that are overlooked and erroneous judgments of things as obstacles.

A second invention is a vehicle guidance system in which each of a plurality of vehicles is provided with vehicle position measurement means for measuring a current position of its own vehicle, when position data for target points that should be reached by each of the plurality of vehicles are given, data are generated for travel courses that pass through those target points and each of the plurality of vehicles is guided along its proper travel course while comparing the current vehicle position measured by the vehicle position measurement means with positions on the generated travel course, the vehicle guidance system comprising:

memory means for storing positions of obstacles at a work site common to the plurality of vehicles when the plurality of vehicles travel simultaneously over that work site;

updating means for updating content stored in the memory means;

travel course generation means which, when position data on the target points are given, generates data for travel courses that pass through those target points, based on the content stored in the memory means, such that there is no conflict with the obstacles; and guidance means for guiding the plurality of vehicles, respectively, along the travel courses generated by the travel course generation means.

Based on the second invention, as diagrammed in FIG. 3 and FIG. 12(a), when an obstacle 74 has been detected, etc., the position of that obstacle 74 is stored in the memory means 41, considering that position as an obstacle 74 common to a plurality of vehicles 2, 2 . . . . Then, as the multiple vehicles 2, 2 . . . travel, the content stored in the memory means 41 is continually updated.

Then, when position data for the target points 72, 72 . . . for each of the plurality of vehicles 2, 2 . . . are given, data are generated for travel courses 71', 71' . . . that pass through those target points 72, 72 . . . , based on the content recorded in the memory means 41, so that there is no conflict with the obstacle 74. Then the plurality of vehicles 2, 2 . . . , respectively, is guided along the travel courses 71', 71' . . . .

According to this invention, as described in the foregoing, provision is made so that the position of the obstacle 74 common to the plurality of vehicles 2, 2 . . . is stored in the memory means 41, and so that the content stored in the memory means 41 is updated in conjunction with the traveling of the plurality of vehicles 2, 2 . . . . Therefore, even should there be an obstacle that one vehicle overlooked, that which has been accurately judged by another vehicle will be recorded as an obstacle. Accordingly, even if at a work site where the obstacles change in real time, as at a work site where a plurality of vehicles is traveling about, obstacles will no longer be overlooked.

Based on this invention, moreover, the position, of the obstacle 74 common to the plurality of vehicles 2, 2 . . . is stored in the memory means 41, wherefore it becomes possible to perform the operation of revising the travel courses 71, 71 . . . for the plurality of vehicles 2, 2 . . . easily and in a short time from the content recorded in the memory means 41. For that reason, the operation of revising the travel courses 71, 71 . . . can be done with good work efficiency. Work efficiency will be dramatically improved compared to the teaching operation wherewith a special teaching vehicle must be operated every time an obstacle develops.

A third invention is a vehicle guidance system in which each of a plurality of vehicles is provided with vehicle position measurement means for measuring a current position of its own vehicle, when position data for target points that should be reached by each of the plurality of vehicles and position data for a course area capable of being traveled by the plurality of vehicles are given, data are generated for travel courses that travel inside that course area and pass through those target points and each of the plurality of vehicles is guided along its proper travel course while comparing the current vehicle position measured by the vehicle position measurement means with positions on the generated travel course;

the vehicle guidance system comprising:

memory means for storing positions of obstacles at a work site common to the plurality of vehicles when that plurality of vehicle travel simultaneously over that work site;

updating means for updating content stored in the memory means;

travel course generation means which, when position data on the target points and position data on the course area are given, generates data for the travel courses that travel inside the course area and pass through the target points, based on the content stored in the memory means, such that there is no conflict with the obstacles; and guidance means for guiding the plurality of vehicles, respectively, along the travel courses generated by the travel course generation means.

Based on the third invention, as diagrammed in FIG. 3 and FIG. 12(a), when an obstacle 74 has been detected, etc., the position of that obstacle 74 is stored in memory means 41, considering that position as an obstacle 74 common to a plurality of vehicles 2, 2 . . . . Then, as the multiple vehicles 2, 2 . . . travel, the content stored in the memory means 41 is continually updated.

Then, when position data for the target points 72, 72 . . . for each of the plurality of vehicles 2, 2 . . . and position data for the course area 65 are given, data are generated for travel courses 71', 71' . . . that travel inside the course area 65 and pass through those target points 72, 72 . . . , based on the content recorded in the memory means 41, so that there is no conflict with the obstacle 74. Then the plurality of vehicles 2, 2 . . . , respectively, is guided along the travel courses 71', 71' . . . .

Based on this third invention, the same effectiveness as with the second invention is realized. Based on the third invention, however, the vehicle 2 is guided so that it does not conflict with the untravelable area outside the course area 65.

A fourth invention is the third invention, comprising:

display means for displaying the course area on a display screen; and obstacle indication means for indicating positions of obstacles on the display screen based on relative positional relationship thereof with the course area on the display screen;

wherein the memory means stores the positions of obstacles on the display screen indicated by the obstacle indication means as positions of obstacles common to the plurality of vehicles; and the updating means updates the content stored in the memory means every time the position of an obstacle is newly indicated by the obstacle display means.

Based on the fourth invention, the same benefits as with the third invention are realized.

Furthermore, based on the fourth invention, as diagrammed in FIG. 12(a), when an operator has discovered an obstacle 74, the position where the obstacle 74 appeared or disappeared can be indicated accurately on the screen in a relative positional relationship with the course area (dumping area) 65 on the display screen 76.

Based on this fourth invention, provision is made so that the operator visually verifies the obstacle 74 to be an obstacle, wherefore even an obstacle 74 that exists in a range that cannot be detected by the obstacle detector 34 carried on an unmanned vehicle or an obstacle 74 of a shape that cannot be detected (pothole, mud, rough road surface, etc.) can be judged to be an obstacle.

Based on this fourth invention, furthermore, because provision is made so that an operator visually verifies the obstacle 74 to be an obstacle, obstacles 74 can be ascertained more definitely, irrespective of the surrounding environment, as compared to when they are detected by an obstacle detector 34.

A fifth invention is the third invention, comprising: display means for displaying on a display screen the course area and, of the travel courses generated by the travel course generation means, a traveled travel course or courses that have already been traveled over by the vehicles; and obstacle indication means for indicating positions of obstacles on the display screen based both on relative positional relationship thereof with the course area on the display screen and on relative positional relationship with the traveled travel course or courses on the display screen;

wherein the memory means stores the positions of obstacles on the display screen indicated by the obstacle indication means as positions of obstacles common to the plurality of vehicles; and the updating means updates the content stored in the memory means every time the position of an obstacle is newly indicated by the obstacle display means.

Based on the fifth invention, the same benefits as with the third invention are realized.

Based on the fifth invention, furthermore, as diagrammed in FIG. 12(a), when an operator has discovered an obstacle 74, the position where the obstacle 74 appeared can be indicated on the screen in a relative positional relationship with the course area (dumping area) 65 on/the display screen 76.

At work sites at mining sites of extensive area, obstacles 74 such as rocks mainly come into being when load falls from a vehicle 2. Accordingly, such obstacles 74 will often be positioned on a traveled travel course 71" that a vehicle 2 has completed a run over.

Here, as diagrammed in FIG. 12(b), a traveled travel course 71" is being displayed on the display screen 76, wherefore the generation position of an obstacle 74 such as a rock or the like can be determined even more accurately in a relative positional relationship with this traveled travel course 71". That is, an operator can revise the position of an obstacle 74 judged in the relative positional relationship with the course area 65 (dumping area), judging it to be positioned at 74' on the traveled travel course 71", and thus accurately indicate the position of the obstacle 74.

Based on this fifth invention, because provision is made so that an operator visually verifies the obstacle 74 to be an obstacle, obstacles 74 can be ascertained more definitely, irrespective of the surrounding environment, as compared to when they are detected by an obstacle detector 34.

A sixth invention is the third invention, comprising: display means for displaying the course area on a display screen;

obstacle indication means for indicating positions of obstacles on the display screen based on relative positional relationship thereof with the course area on the display screen; and revision means for revising the positions of obstacles indicated by the obstacle indication means, based on data on the traveled travel course or courses over which the vehicles have already traveled, of the travel courses generated by the travel course generation means;

wherein the memory means stores the obstacle positions revised by the revision means as positions of obstacles common to the plurality of vehicles; and the updating means updates the content stored in the memory means every time an obstacle position newly indicated by the obstacle indication means is revised by the revision means.

Based on the sixth invention, the same benefits as with the third invention are realized.

Based on the sixth invention, furthermore, as diagrammed in FIG. 12(a), when an operator has discovered an obstacle 74, the position where the obstacle 74 appeared can be indicated on the screen in a relative positional relationship with the course area (dumping area) 65 on the display screen 76.

At work sites at mining sites of extensive area, obstacles 74 such as rocks mainly come into being when load falls from a vehicle 2. Accordingly, such obstacles 74 will often be positioned on a traveled travel course 71" that a vehicle 2 has completed a run over.

Here, as diagrammed in FIG. 12(b), the position where an obstacle 74 appeared, such as a rock or the like, indicated by an operator, is automatically revised to the accurate position 74', based on position data for the traveled travel course 71".

Based on this sixth invention, because provision is made so that an operator visually verifies the obstacle 74 to be an obstacle, obstacles 74 can be ascertained more definitely, irrespective of the surrounding environment, as compared to when they are detected by an obstacle detector 34.

A seventh invention is the first invention or the second invention or the third invention, in which some or all of the plurality of vehicles comprise obstacle detection means for detecting obstacles; the vehicle guidance system further comprising:

obstacle position measurement means for measuring positions of those obstacles based on position of a vehicle when an obstacle has been detected by the obstacle detection means; and wherein the memory means stores the positions of obstacles measured by the obstacle position measurement means as positions of obstacles common to the plurality of vehicles; and the updating means updates the content stored in the memory means, based on the position of a new obstacle measured by the obstacle position measurement means, every time a new obstacle is detected by the obstacle detection means.

Based on the seventh invention, the same benefits are realized as with the first invention or the second invention or the third invention.

Based on the seventh invention, the following benefit is also realized.

That is, based on the seventh invention, as diagrammed in FIG. 9, an obstacle 74 detected by one vehicle 2 will be stored in the memory means 41 as an obstacle 74 to other unmanned vehicles 2. Hence another vehicle 2 will be able to avoid the obstacle 74 without fail, even if that obstacle 74 could not be detected by the obstacle detection means 34 carried on board that other vehicle 2. In other words, even in cases where the obstacle detection means 34 of another vehicle 2 fail or operate uncertainly, or where the obstacle 74 cannot be detected precisely due to the influence of the surrounding environment, that other vehicle 2 can nevertheless safely avoid the obstacle 74.

An eighth invention is the first invention or the second invention or the third invention, in which some or all of the plurality of vehicles comprise:

road surface condition detection means for detecting a road surface condition; and determination means for determining that a current road surface is an obstacle based on the road surface condition detected by the road surface condition detection means;

wherein the memory means stores position of a vehicle at the time when the current road surface was determined to be an obstacle by the determination means as position of an obstacle common to the plurality of vehicles; and the updating means updates the content stored in the memory means every time the determination means determines a new obstacle.

Based on the eighth invention, the same benefits are realized as with the first invention or the second invention or the third invention.

Based on the eighth invention, the following benefit is also realized.

That is, based on this eighth invention, a vehicle 2 determines from the condition of the road surface over which it travels that that is an obstacle 74, wherefore even an obstacle 74 that cannot be detected by the obstacle detection means 34 (cf. FIG. 9) carried on the vehicle (such as mud, a pothole, or rough road surface, etc.) can be determined to be an obstacle.

A ninth invention is the first invention or the second invention or the third invention, in which some or all of the plurality of vehicles comprise:

reception means for receiving signals from other manned vehicles indicating that an obstacle exists in vicinity of its own vehicle;

transmission means for transmitting signals indicating position of its own vehicle when a signal is received indicating that an obstacle exists in vicinity of its own vehicle; and obstacle position measurement means for receiving signals indicating a vehicle position transmitted from the transmission means and for measuring positions of obstacles near that vehicle based on the vehicle position received;

wherein the memory means stores the positions of obstacles measured by the obstacle position measurement means as positions of obstacles common to the plurality of vehicles; and the updating means updates the content stored in the memory means, based on the position of a new obstacle measured by the obstacle position measurement means, every time a signal is received by the reception means indicating that a new obstacle exists.

Thus, based on the ninth invention, the position of an obstacle 74 is measured on the basis of the position of a vehicle 2 that has been sent a signal indicating the presence of an obstacle near that selfsame vehicle, that is, more specifically, that has been sent a stop command, and those data are stored in the obstacle memory unit 41.

Based on the ninth invention, the same benefits are realized as with the first invention or the second invention or the third invention.

A tenth invention is the first invention or the second invention or the third invention, wherein, when a manned or unmanned work vehicle having vehicle position measurement means for measuring position of its own vehicle is present inside an area traveled over by the plurality of vehicles, the memory means stores the position of the work vehicle measured by the vehicle position measurement means as position of an obstacle common to the plurality of vehicles, and the updating means updates the content stored in the memory means every time the position of the work vehicle is altered by the vehicle position measurement means.

In other words, there are times when a work vehicle such as a manned vehicle 20 or loading machine 14 or the like becomes an obstacle to the traveling of a plurality of unmanned vehicles 2, 2 . . . , as diagrammed in FIG. 7.

Thereupon, as diagrammed in FIG. 3, the measured positions transmitted from the work vehicles 20 and 14 are stored as the positions of obstacles 74 in the memory means 41. Then, every time the measured positions of the work vehicles 20 and 14 change, as they may at any time, the content stored in the memory means 41 is updated.

Then, based on the content stored in the memory means 41, the vehicles 2 are guided so that they avoid the obstacles 74.

Based on the tenth invention, the same benefits are realized as with the first invention or the second invention or the third invention.

An 11th invention is the tenth invention, wherein the updating means updates the content stored in the memory means every time the positions of the work vehicles are successively changed in conjunction with traveling of the work vehicles.

Based on the 11th invention, the updating of the stored positions of the obstacles 74 is done at any time, so long as the vehicle positions are being changed, irrespective of whether the work vehicles 20 and 14 are travelling or stopped.

A 12th invention is the tenth invention, wherein the updating means updates the content stored in the memory means every time the work vehicle stops traveling and stopped position of that work vehicle is changed.

Based on the 12th invention, the updating of the stored positions of the obstacles 74 is not done while the work vehicles 20 and 14 are traveling, but only when those work vehicles 20 and 14 are stopped.

A 13th invention is a vehicle guidance system comprising: vehicle position measurement means for measuring a current position of its own vehicle, and being constructed such that, when position data for target points that should be reached by the vehicle and position data for a course area where the vehicle can travel are given, data for a travel course that enables the vehicle to travel inside the course area and to pass through the target points are generated; and the own vehicle is guided over that travel course while comparing current vehicle positions measured by the vehicle position measurement means and position on the generated travel course;

the vehicle guidance system comprising:

indication means for indicating positions of target points inside the course area;

indication means for indicating the position of a movement starting point inside the course area, the direction of a vehicle at the movement starting point, the position of a target point inside the course area, and the direction of a vehicle at the target point;

travel course generation means for generating travel course data wherewith the vehicle departs the movement target point in the indicated vehicle direction, alters the direction of advance thereof, reversing direction at one or more direction reversal points, and, arrives at the target point in the indicated vehicle direction, so that, when position data indicating the boundary line of the course area are given, and the position of the movement starting point, the vehicle direction at the movement starting point, the position of the target point, and the vehicle direction at the target point are indicated by the indication means, the vehicle can travel over the interior enclosed by the boundary line of the course area and also turn around with a turning radius equal to or greater than the minimum turning radius of the vehicle; and guidance means for guiding the vehicle over the travel course generated by the travel course generation means.

Based on the 13th invention, travel courses can easily be generated that cope with changes in the shape of the course area and changes in the positions and directions of the target points, without performing travel course teaching using an actual vehicle.

Also, because travel courses are generated so that the vehicles travel inside the course area, vehicles are prevented before the fact from conflicting with course area boundaries or excavation faces.

A 14th invention is an unmanned vehicle guidance system for guiding unmanned vehicles over guidance courses based on travel positions of those unmanned vehicles measured by travel position measurement means and course data defining guidance courses for the unmanned vehicles; the unmanned vehicle guidance system comprising:

means for inputting a shape of a course area;

means for respectively indicating the position of a movement starting point and the direction of advance of the unmanned vehicle at that position, and the position of a movement target point and the direction of advance of the unmanned vehicle at that position;

means for producing course data wherewith the indicated position and the direction of advance are satisfied at the movement starting point and at the movement target point, and wherewith the direction of advance of the unmanned vehicle changes at one or more direction reversal points provided between the movement starting point and the movement target point;

means for producing course data wherewith the indicated position and direction of vehicle advance are satisfied at the position of the movement starting point and at the movement target point;

means for inferring conflicts between the course area and the unmanned vehicle when the unmanned vehicle is made to travel over a guidance course defined by the produced course data, based on data relating to the unmanned vehicle; and course data alteration means for altering the course data when a conflict has been inferred.

Based on the 14th invention, guidance courses can easily be generated that cope with changes in the shape of the course area and changes in movement target positions, without performing guidance course teaching using an actual vehicle.

Moreover, in addition to inferring conflicts between unmanned vehicles traveling over the generated guidance courses and the boundaries of the course area, the course data are altered when such a conflict has been inferred, Accordingly, conflicts between unmanned vehicles and course area boundaries or excavation faces can be prevented before the fact.

A 15th invention is the 14th invention wherein the means for producing course data comprises:

means for generating position of an intermediate point in the guidance course inside the course area and direction of vehicle advance at that position; and means for connecting position of the movement starting point, position of the intermediate point, and position of the movement target point, with a circular arc or arcs and/or straight line or lines, so as to pass through each of those positions, and such that the direction of vehicle advance at each of those positions coincides either with direction of a tangent to such circular arc or arcs or with direction of such straight line or lines;

wherein the course data alteration means alters the course data by altering the position of the intermediate point when the conflict has been inferred.

Based on this 15th invention, the guidance course is produced using an intermediate point, wherefore it is possible easily to generate a route that reverses direction at the intermediate point. As a consequence, routes can be freely planned that contain direction reversals.

Moreover, guidance courses are produced by connecting the position of the movement starting point, the position of the intermediate point, and the position of the movement target point, by circular arcs, tangents, or both, wherefore the guidance course can be produced efficiently.

A 16th invention is the 14th invention wherein the means for producing course data comprises:

means for generating position of an intermediate point in the guidance course inside the course area and direction of vehicle advance at that position; and means for connecting position of the movement starting point, position of the intermediate point, and position of the movement target point, with a spline curve, so as to pass through each of those positions, and such that direction of vehicle advance at each of those positions coincides with direction of a tangent to the spline curve;

wherein the course data alteration means alters the course data by altering the position of the intermediate point when such conflict has been inferred.

Based on the 16th invention, the same benefits are realized as with the 15th invention.

A 17th invention is the 14th invention wherein the means for producing the course data comprises:

means for generating position of an intermediate point in the guidance course inside the course area and direction of vehicle advance at that position; and means for connecting position of the movement starting point, position of the intermediate point, and position of the movement target point, with a spline curve and a circular arc, or with a spline curve and a straight line or lines, so as to pass through each of those positions, and such that direction of the vehicle advance at each of those positions coincides with direction of a tangent to that spline curve, direction of a tangent to such circular arc, or direction of such straight line or lines;

wherein the course data alteration means alters the course data by altering the position of the intermediate point when such conflict has been inferred.

By this 17th invention also, the same acting benefits are realized as with the 15th invention.

An 18th invention is either the 15th or the 17th invention, wherein the means for producing the course data comprises:

evaluation means for evaluating the course data using distances between the guidance course and boundaries of the course area; and selection means for selecting course data having best evaluation values out of a plurality of generated course data.

Based on this 18th invention, course data are evaluated, and those course data having the best evaluation values are selected, wherefore it is possible to evaluate and select course data wherewith conflict will not occur between the unmanned vehicles and the boundaries of the course area.

A 19th invention is either the 15th or the 17th invention, wherein the means for producing the course data comprises:

evaluation means for evaluating the course data using a function between distances between the guidance course and boundaries of the course area, and minimum radius of the guidance course; and selection means for selecting course data having best evaluation values out of a plurality of generated course data.

Based on this 19th invention, it is possible to evaluate and select course data wherewith conflict will not arise between the unmanned vehicles and the boundaries of the course area, and wherewith the turning of the unmanned vehicles will not be hindered.

A 20th invention is an unmanned vehicle guidance system for guiding unmanned vehicles over guidance courses based on travel positions of those unmanned vehicles measured by travel position measurement means and course data defining guidance courses for the unmanned vehicles; the unmanned vehicle guidance system comprising:

means for inputting shape of a course area;

means for producing course data;

means for inferring conflicts between the course area and the unmanned vehicle when the unmanned vehicle is made to travel over a guidance course defined by the produced course data, based on data relating to the unmanned vehicle;

course data alteration means for altering the course data when the conflict has been inferred; and mode setting means for setting an automatic operation mode when the unmanned vehicle is being guided using the generated course data, and for setting a measurement mode when shape of the course area is being input.

Based on this 20th invention, an automatic operation mode or a measurement mode can be selectively set, wherefore such problems as an unmanned vehicle operating automatically while in the measurement mode, or a course area shape being input when in automatic operation can be avoided. An operator can selectively set either of those modes, moreover, so work efficiency is enhanced.

A 21st invention is an unmanned vehicle guidance system for guiding unmanned vehicles over guidance courses based on travel positions of those unmanned vehicles measured by travel position measuring means and course data defining guidance courses for the unmanned vehicles, the unmanned vehicle guidance system comprising:

means for inputting shape of a course area;

means for producing course data;

mode setting means for causing can unmanned vehicle be guided using the generated course data when the automatic operation mode has been set, and for collecting course area shape data by causing the unmanned vehicle be guided along a course area and detecting positions traveled by the unmanned vehicle when a measurement mode has been set.

means for recognizing a shape change zone of the course area; and course area shape updating means for updating shape of the course area so that the course area shape is altered only in the zone whose shape has been changed.

Based on this 21st invention, a shape change zone is recognized, and the shape a of the course area is updated only in that shape change zone, wherefore the frequency of course area shape input operations can be reduced to the extent possible.

A 22nd invention is the 21st invention wherein the means for recognizing the shape change zone of the course area comprises:

a moving body for measuring that moves through the course area;

movement position measurement means for measuring movement position of the moving body for measuring; and means for specifying the shape change zone based on the movement position of the moving body for measuring and an area occupied by that moving body.

Based on this 22nd invention, the shape change zone is specified on the bases of the movement position of the moving body for measuring and the area occupied by the moving body. Accordingly, if the course area is a mining operation area, for example, a work machine for performing such operations as loading in the course area can be used as the moving body for measuring.

A 23rd invention is the 21st invention wherein the means for recognizing the shape change zone of the course area comprises:

position measurement means for measuring three-dimensional positions of digging unit of a work machine for digging operations in the course area;

ground height measurement means for measuring initial ground height in the course area; and means for specifying the shape change zone of the course area based on position of the digging unit and area occupied thereby when height of the digging unit and the initial ground height coincide.

Based on this 23rd invention, changes in the course area are detected from the fact that the height of the digging unit of a work machine for performing digging. operations has coincided with the ground height in the course area, and the shape change zone is specified based on the digging unit position and area occupied. As a consequence, the shape change zone can be specified without provided special measurement means.

A 24th invention is any one of the 14th, 20th, or 21st invention, wherein the travel position measurement means is a GPS, and means for inputting shape of the course area comprises:

means for switching a position measured by the GPS to a position measured at left edge or right edge of the unmanned vehicle; and indication means for indicating whether to switch to position measured at the left edge or to position measured at the right edge.

Based on this 24th invention, a position measured by the GPS is switched to a position measured either at the left edge or right edge of the unmanned vehicle, wherefore, by causing the unmanned vehicle to travel while bringing either the left edge or the right edge of the unmanned vehicle up to the boundary of the course area, the shape of the course area can be precisely input by a so-called teaching procedure.

A 25th invention is any one of the 14th, 20th, or 21st inventions, wherein the travel position measurement means is a GPS, and means for inputting shape of the course area comprises means for selectively altering position of antenna of the GPS to left edge or right edge of the unmanned moving body.

Based on the 25th invention, the position of the GPS antenna can be selectively altered between the left edge and right edge of the unmanned moving body, wherefore, by causing the unmanned vehicle to travel while bringing either the left edge or the right edge of the unmanned vehicle up to the boundary of the course area, the shape of the course area can be precisely input by a so-called teaching procedure.

A 26th invention is the 13th invention wherein the vehicle is an unmanned vehicle that is loaded with a load by a loading machine, and the course area position data are updated by excluding a certain area referenced to current position of the loading machine from current course area.

Based on this 26th invention, as diagrammed in FIG. 40(a), by excluding a certain area 14b based on the current position of the loading machine 14 from the current course area 1, the position data for the course area 1 (course area 1 shape) are updated. That is, even if the loading machine 14 does not comprise a device for measuring the bucket position, updating the position data for the course area 1 can be performed accurately so long as a device is provided for measuring the current position of the loading machine 14.

A 27th invention is the 26th invention wherein the certain area excluded from the current course area is an area within reach of the loading mechanism of the loading machine.

Based on this 27th invention, as diagrammed in FIG. 40(a), an area 14b within a range reachable by the loading mechanism (arm) of the loading machine 14 from the current position of the loading machine 14 is determined, that area 14b is excluded from the course area 1, and thereby the position data for the course area 1 (course area 1 shape) are updated. In other words, even if the loading machine 14 is not equipped with a device for measuring the bucket position, updating the position data for the course area 1 can be performed accurately so long as a device is provided for measuring the current position of the loading machine 14.

A 28th invention is the 26th invention wherein the certain area excluded from the current course area is inside an area within reach of the loading mechanism of the loading machine, and an area of about size of main body of the loading machine.

Based on this 28th invention, as diagrammed in FIG. 40(a), an area 14a of about the size of the main body of the loading machine 14, inside the area 14b within the range reachable by the loading mechanism (arm) of the loading machine 14, is found from the current position of the loading machine 14, that area 14a is excluded from the current course area 1, and thereby the position data of the course area 1 (course area 1 shape) are updated. In other words, even if the loading machine 14 is not equipped with a device for measuring the bucket position, updating the position data for the course area 1 can be performed accurately so long as a device is provided for measuring the current position of the loading machine 14.

A 29th invention is the 26th invention, wherein the certain area excluded from the current course area is inside an area within reach of the loading mechanism of the loading machine, and an area that is located at a constant distance from the boundary of the course area.

Based on this 29th invention, as diagrammed in FIG. 41, an area 14c such that the distance from the boundary 1a of the course area 1 is constant, inside the area 14b within the range reachable by the loading mechanism (arm) of the loading machine 14, is found from the current position of the loading machine 14, that area 14c is excluded from the current course area 1, and thereby the position data of the course area 1 (course area 1 shape) are updated. In other words, even if the loading machine 14 is not equipped with a device for measuring the bucket position, updating the position data for the course area 1 can be performed accurately so long as a device is provided for measuring the current position of the loading machine 14.

A 30th invention is the 13th invention, wherein the vehicle is an unmanned vehicle that is loaded with a load by a loading machine; relative position indication means for indicating relative positions relative to the loading machine is provided; and position data for the course area are updated by excluding an area referenced to positions indicated by the relative position indication means from current course area.

Based on the 30th invention, relative positions (bucket positions) relative to the loading machine 14 are indicated by the relative position indication means, and areas based on those indicated positions are excluded from the current course area 1, whereby the position data of the course area 1 (course area 1 shape) are updated. In other words, in cases where the form of the excavation work lacks a certain regularity, a range that should be excluded from the course area 1 can be directly indicated by the operator, and the position data for the course area 1 accurately updated.

A 31st invention is the 13th invention, wherein the vehicle is an unmanned vehicle that is loaded with a load by a loading machine, and position data for the course area are updated by adding, to current course area, an area within range occupied by the unmanned vehicle at a target point that should be reached by the unmanned vehicle.

Based on this 31st invention, as diagrammed in FIG. 39(a), from the target point which the unmanned vehicle 2 should reach is found an area 2a within the range a occupied by the unmanned vehicle 2 at the target point, and that occupation range area 2a is added to the current course area 1, thereby updating the course area 1 position data (course area 1 shape). In other words, even if the loading machine 14 is not equipped with a device for measuring the bucket position, updating the position data for the course area 1 can be performed accurately so long as a device is provided for measuring the current position of the loading machine 14 (that is, the target point of the unmanned vehicle 2).

A 32nd invention is the 13th invention wherein the vehicle is an unmanned vehicle that is loaded with a load by a loading machine, and position data for the course area are updated either by excluding a certain area referenced to current position of the loading machine from current course area, or by adding area within range occupied by the unmanned vehicle at target point that should be reached by the unmanned vehicle to current course area.

Based on this 32nd invention, as diagrammed in FIG. 40(a), the course area 1 position data (course area 1 shape) are updated by excluding a certain area 14b based on the current position of the loading machine 14 from the current course area 1, or, alternatively, as diagrammed in FIG. 39(a), the course area 1 position data (course area 1 shape) are updated by finding, from the target point that the unmanned vehicle 2 should reach, an area 2a within the range occupied by the unmanned vehicle 2 at the target point, and adding that area 2a within that occupied range to the course area 1. In other words, even if the loading machine 14 is not equipped with a device for measuring the bucket position, updating the position data for the course area 1 can be performed accurately so long as a device is provided for measuring the current position of the loading machine 14 (that is, the target point of the unmanned vehicle 2).

A 33rd invention is the 32nd invention, further comprising selection means for selecting whether the course area is to be expanded or contracted, according to type of work being done by the loading machine, wherein the course area position data are subjected to updating processing according to results of selection made by the selection means.

Based on the 33rd invention, selection means for selecting whether the course area 1 is to be expanded or contracted, according to the work form of the loading machine 14, are also comprised, and the course area 1 position data are subjected to updating processing according to the results of the selection made by those selection means.

BEST MODE FOR CARRYING OUT THE INVENTION

Embodiment aspects of the vehicle guidance system relating to the present invention are now described with reference to the drawings.

To begin with, embodiment aspects wherewith conflict with an obstacle can be avoided are described.

Figure 7:
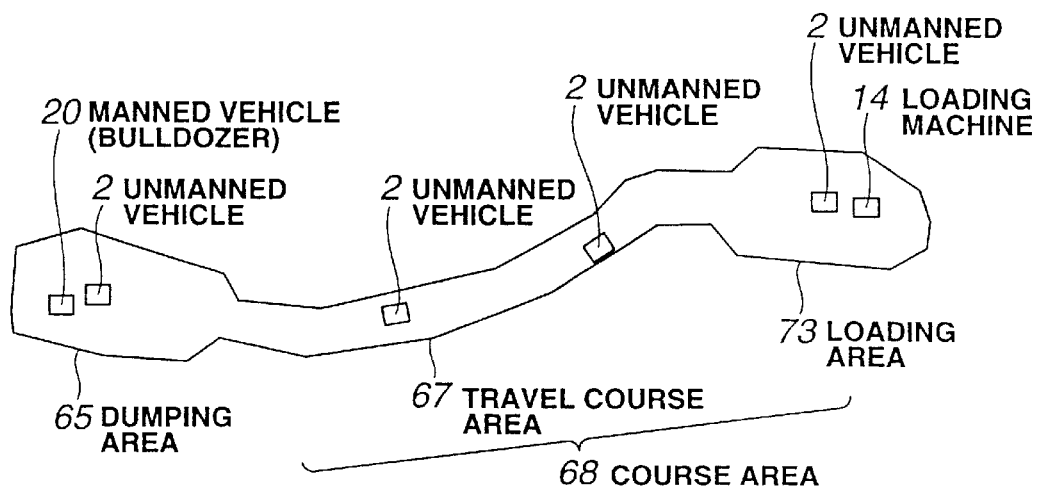
FIG. 7 is a diagram representing the entirety of a course area.

FIG. 7 represents the entirety of a work site for an embodiment aspect. In this embodiment aspect, it is supposed that a plurality of unmanned vehicles (dump trucks) 2, 2 . . . is engaged in loading operations for loading rock or earth containing ore in a loading area 73 at a mining site of extensive area, that those unmanned vehicles 2, 2 . . . travel at high speed over a travel course area 67, and that they engage in dumping operations for dumping the earth in a dumping area 65. In this case, this plurality of unmanned vehicles 2, 2 . . . is guided over a travel course 71 generated for each vehicle, as will be described subsequently. The loading area 73, travel course area 67, and dumping area 65 constitute the course area 68. By course area 68, then, is meant that area over which an unmanned vehicle 2 is able to travel. The areas outside the course area 68 are areas such as cliffs or excavation faces where it is impossible for a vehicle to travel, as diagrammed in FIG. 8.

Besides the plurality of unmanned vehicles 2, 2 . . . , a loading machine 14 and a manned vehicle 20 are also traveling inside the course area 68. The loading machine 14 is also a manned vehicle driven by an operator, but to facilitate the description it is distinguished from the manned vehicle 20.

The loading machine 14 is a manned work machine that digs ore in the loading area 73 (excavation site) and loads that excavated ore (earth) onto the unmanned vehicle 2. Examples of such a machine are excavators and wheel loaders. The vehicle position of the loading machine 14 is subject to change at any time in conjunction with the progress of the excavation operation.

The manned vehicle 20 is a manned work vehicle, driven by an operator, that performs various work other than the loading work described above. Examples thereof include manned dump trucks, bulldozers, road graders, water spraying vehicles, fuel supply vehicles, and four-wheel drive vehicles for performing teaching operations.

Figure 8:
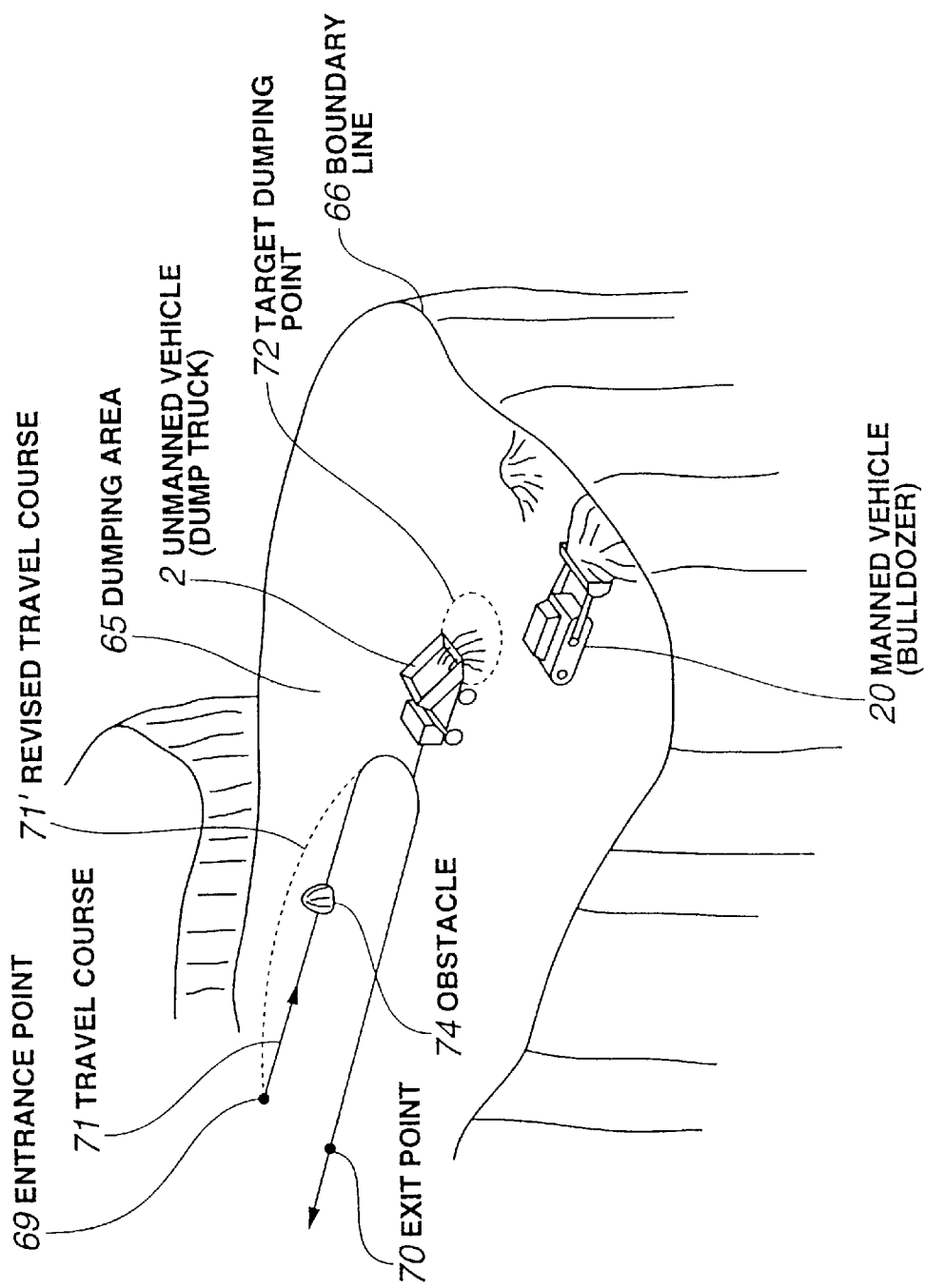
FIG. 8 is a diagram representing what goes on at a work site.

If the manned vehicle 20 is a bulldozer, for example, as diagrammed in FIG. 8, it will perform the work of dumping and otherwise handling earth dumped by an unmanned vehicle 2 in the dumping area 65 (dumping ground). As with the loading machine 14, the vehicle position of the manned vehicle 20 is also subject to change at any time as the work progresses.

As the work is advanced by the loading machine 14 and manned vehicle 20 described in the foregoing, the positions and shapes of the loading area 14 and dumping area 65 also changes. That is because the position and shape of the excavation face and cliff and so forth change in conjunction with the work. The position and shape of the travel course area 67 may also change due to changes in the position and shape of the road shoulder as the work advances.

Thus the position and shape of the course area 68 are subject to change at any time as the work progresses.

The interior of the course area 68 is unpaved. Therefore, the road surface condition is subject to change at any time as the plurality of unmanned vehicles 2, 2 . . . travels over it. The rock loaded on the unmanned vehicles 2 also sometimes falls onto the road surface as the unmanned vehicle 2 travels. Hence potholes and mud are formed on the travel course of the unmanned vehicle 2, sometimes making it very difficult for vehicles to negotiate. Rocks may also appear on the travel course such as make it impassable to vehicles. Accordingly, these potholes, mud, and rocks and the like constitute obstacles to the traveling of the unmanned vehicles 2.

Such obstacles (load) can fall at any time. There are also cases where such obstacles (load) fall, but a manned vehicle 20 such as a bulldozer discovers and removes such obstacles. There are also times when another bulldozer or fuel supply truck or other manned work vehicle 20 is stopped on the travel course of the unmanned vehicle 2. In such cases, that manned vehicle 20 becomes an obstacle to the unmanned vehicle 2. And the position where such a manned vehicle 20 constituting an obstacle is stopped is also subject to change at any time. Thus the obstacles inside the course area 68 over which the plurality of unmanned vehicles 2, 2 . . . travels are not fixed. The positions thereof are subject to change at any time as new obstacles develop in conjunction with the traveling of the unmanned vehicles 2 or are removed.

Thus obstacles inside the course area 68 are subject to change at any time as the work progresses.

Figure 6:
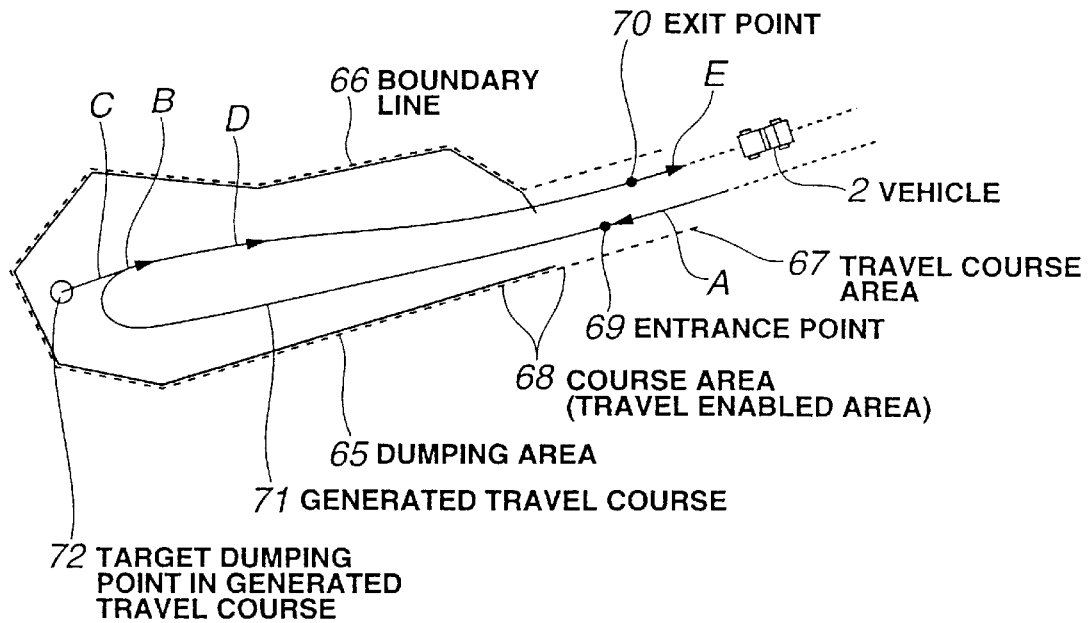
FIG. 6 is a conceptual diagram exemplifying travel course generation.

In this embodiment aspect, a dumping area 65 is assumed as the course area 68 as diagrammed in FIG. 6, and a case is supposed where a travel course 71 is created in the dumping area 65.

As diagrammed in this FIG. 6, the dumping area 65 is an area enclosed by a boundary line 66. The dumping area 65 is provided with an entrance/exit for the unmanned vehicles 2. The entrance/exit to the dumping area. 65 and the travel course area 67 that is the travel route for the unmanned vehicle 2 are connected.

The unmanned vehicle 2 begins traveling from a travel starting point, travels in the direction indicated by arrow A over the travel course area 67, and arrives at the entrance point 69 to the dumping area 65. Then it passes the entrance point 69 and enters into the dumping area 65 from the dumping area entrance/exit. Then, inside the dumping area 65, the unmanned vehicle 2 reverses its direction of travel. That is, the unmanned vehicle 2 advances in the direction indicated by arrow B, and then backs up in the direction indicated by arrow C in line with the dumping direction. The vehicle stops at the target dumping point 72 and dumps its load. That is, the dump truck 2 raises its bed and dumps the earth therein at the target dumping point 72. After completing this dumping operation, the unmanned vehicle 2 advances in the direction indicated by arrow D, leaves the dumping area 65 from the dumping area entrance/exit, and proceeds into the travel course area 67. The vehicle passes the exit point 70, travels over the travel course area 67 in the direction indicated by the arrow E, and returns to the travel termination point. Thus the unmanned vehicle 2 is guided along the travel course 71 described above.

Here, to indicate the actual topography outside the dumping area 65 (interior enclosed by the boundary line 66) and the travel course area 67, that is, outside the course area 68, that is shown here to be an area where travel by the unmanned vehicles 2 is impossible due to such topography as walls and cliffs, as diagrammed in FIG. 8.

As diagrammed in FIG. 8, the position and shape of the dumping area 65 are subject to change at any time as the work progresses, and the obstacles 74 inside the dumping area 65.are also subject to change at any time, wherefore the travel course 71 is revised whenever necessary, as indicated by 71', so that vehicles can travel inside the course area 68 (dumping area 65) without conflicting with obstacles 74.

Figure 1:
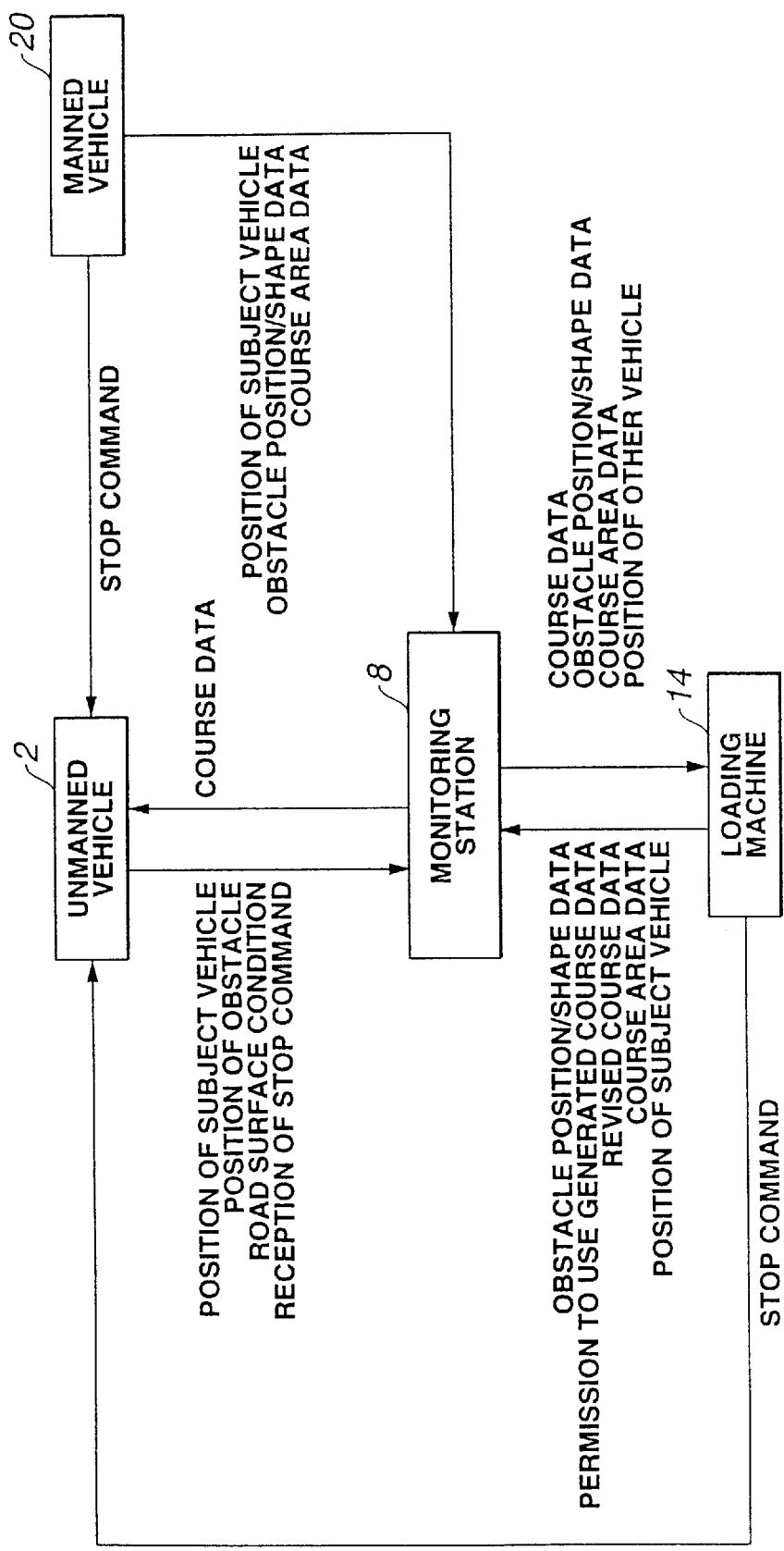
FIG. 1 is a block diagram of the data flow in an embodiment aspect.

FIG. 1 is a block diagram of the flow of various kinds of data in the embodiment aspect. Data are sent and received reciprocally between a monitoring station 8, unmanned vehicle 2, loading machine 14, and manned vehicle 20. The monitoring station 8 has a function to manage and monitor a plurality of unmanned vehicles 2, 2 . . . . A variety of data are sent and received between the monitoring station 8, unmanned vehicle 2, loading machine 14, and manned vehicle 20, whereby, not only are data on obstacles 74 common to the plurality of unmanned vehicles 2, 2 . . . stored in a database in the monitoring station 8, but data indicating the position and shape of the course area 68 are also stored. The data on the obstacles 74 are updated, and the course area 68 data are updated, as the plurality of unmanned vehicles 2, 2 . . . travels.

The travel course 71 is revised whenever necessary to the revised travel course 71' based on data which are updated whenever necessary.

FIGS. 2, 3, 4, and 5 are block diagrams of the configurations of an unmanned vehicle 20, monitoring station 8, loading machine 14, and manned vehicle 20, respectively.

Figure 2:
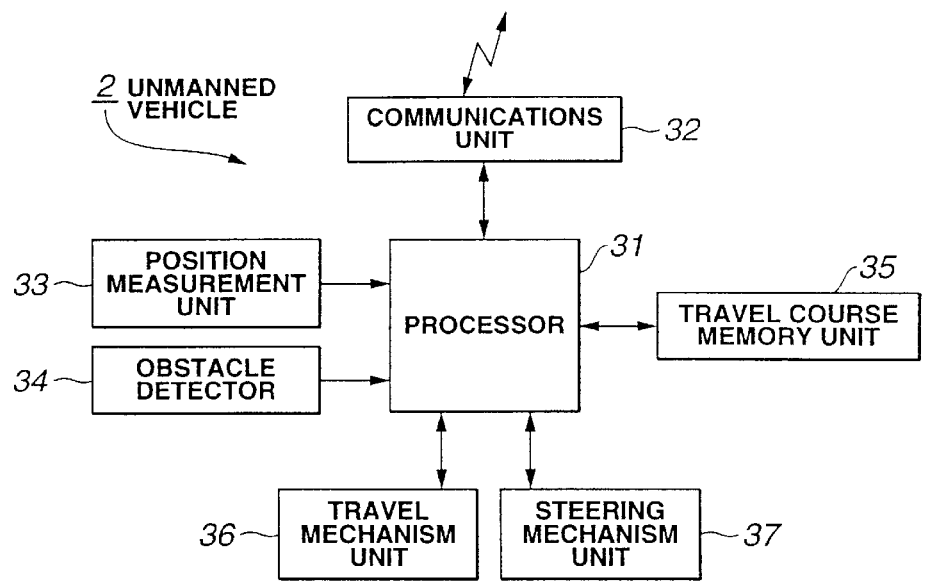
FIG. 2 is a block diagram of the configuration of an unmanned vehicle.

The configuration of the unmanned vehicle 2 diagrammed in FIG. 2 is described first.

With a position measuring unit 33 of the unmanned vehicle 2, the position of that vehicle (X, Y) is measured. As position measurement means, a gyro and wheel revolution counters provided for the front and back wheels of the unmanned vehicle 2 are used. The vehicle position is measured on the basis of output signals from these wheel revolution.counters and output signals from the gyro. In this embodiment aspect, a GPS capable of measuring the position of the vehicle 2 relative to the ground is also carried as a device for measuring vehicle positions.

Deviations between the vehicle position obtained from the outputs of the wheel revolution counters and the vehicle position obtained from the output of the GPS that is a ground position measuring device are found by a processor 31 in the unmanned vehicle 2. From this deviation, the road surface condition of the road surface being-currently traveled over by the unmanned vehicle 2 is detected.

An obstacle detector 34 for detecting obstacles 74 lying ahead in the direction of vehicle advance is carried in the unmanned vehicle 2. A milliwave radar, laser radar, or visual sensor or the like is used as the obstacle detector 34.

Figure 9:
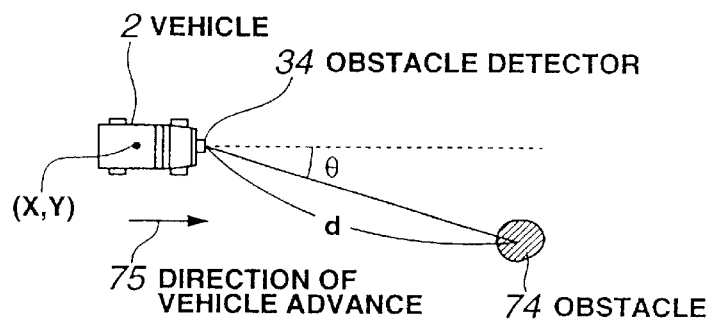
FIG. 9 is a diagram representing how an obstacle is detected.

In FIG. 9 is diagrammed the way in which an obstacle 74 ahead of the unmanned vehicle 2 is detected. Let it be assumed that, as the vehicle 2 is advancing in the direction indicated by arrow 75, an obstacle 74 lying ahead in the direction of vehicle advance is detected by the obstacle detector 34 when a radio or laser beam is projected at a projection angle θ. At this time, the relative position of the obstacle 74 relative to the vehicle 2 is determined on the basis of the radio or laser beam projection angle θ and the distance d to the obstacle 74 that corresponds to the time required for transmission and reception of the radio or laser beam. The absolute position (X, Y) of the unmanned vehicle 2 is being measured by the position measuring unit 33, wherefore the absolute position of the obstacle 74 is measured from that absolute position (X, Y) of the unmanned vehicle 2 and the relative position of the obstacle 74 relative to the vehicle 2 obtained from the obstacle detector 34.

For the obstacle detector 34, it is also permissible to use a detector provided with a scanning mechanism for scanning radio or laser beams. Alternatively, an obstacle detector that projects a radio or laser beam in a certain direction may also be used.

When an obstacle 74 is present in the vicinity of the unmanned vehicle 2, moreover, this obstacle 74 will be discovered by an operator driving the loading machine 14 or manned vehicle 20. When that happens, a stop command is transmitted to the unmanned vehicle 2 via a communications unit 55 in the loading machine 14 or via a communications unit 63 in the manned vehicle 20. This stop command is received by a communications unit 32 in the unmanned vehicle 2.

Data indicating the vehicle position measured by that selfsame unmanned vehicle 2, data indicating the detected position of the obstacle 74, data indicating the road surface condition, and data indicating that a stop command was received are processed in the processor 31 and transmitted via the communications unit 32 to the monitoring station 8.

Data indicating the travel course 71 (or the revised travel course 71') that that selfsame unmanned vehicle 2 should travel over are transmitted from the monitoring station 8, and received by the communications unit 32. Data for the travel course 71 or 71' received are also stored in a travel course memory unit 35.

In the processor 31, while continually comparing the position of that vehicle measured by the position measuring unit 33 against successive positions on the travel course 71 or 71' stored in the travel course memory unit 35, travel commands and steering commands are generated so that the unmanned vehicle 2 arrives at the successive positions on the travel course 71 or 71' one after another. These travel commands and steering commands are output to a travel mechanism unit 36 and a steering mechanism unit 37. As a result, the unmanned vehicle 2 is guided over the travel course 71 or 71' and arrives at the target dumping point 72.

Figure 4:
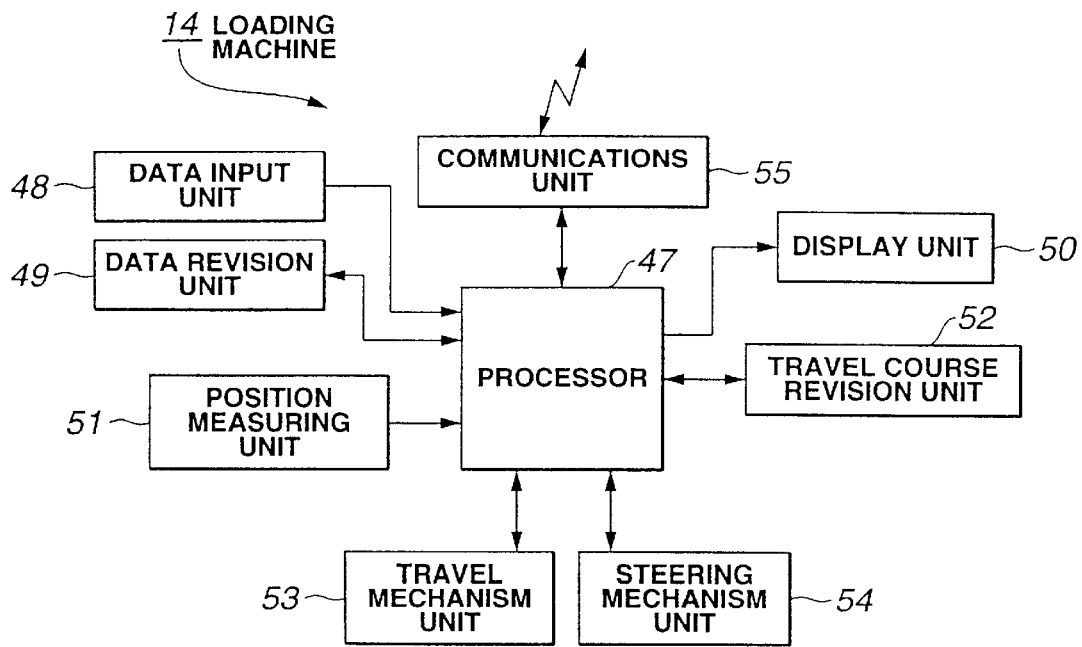
FIG. 4 is a block diagram of the configuration of a loading machine.

The configuration of the loading machine 14 diagrammed in FIG. 4 is described next.

In the loading machine 14 is deployed a position measuring unit 51 for measuring the position of that vehicle, in order to measure to position of that vehicle as the position of the obstacle 74. A GPS that can measure ground positions of that vehicle 14, for example, is used as position measurement means.

From a data input unit 48 in the loading machine 14, data indicating the course area 68 position and shape, and data indicating the position, shape, and size of the obstacle 74 are designated and entered.

In the communications unit 55 of the loading machine, various kinds of data are received from the monitoring station 8, namely data on the travel courses 71 and 71', obstacle 74 data, course area 68 data, and data on the positions of other vehicles.

In a display unit 50 in the loading machine 14, the course area 68, travel courses 71 and 71', the various kinds of vehicle, including that vehicle 14, and the obstacle(s) 74 are displayed on the same screen.

Figure 12A:
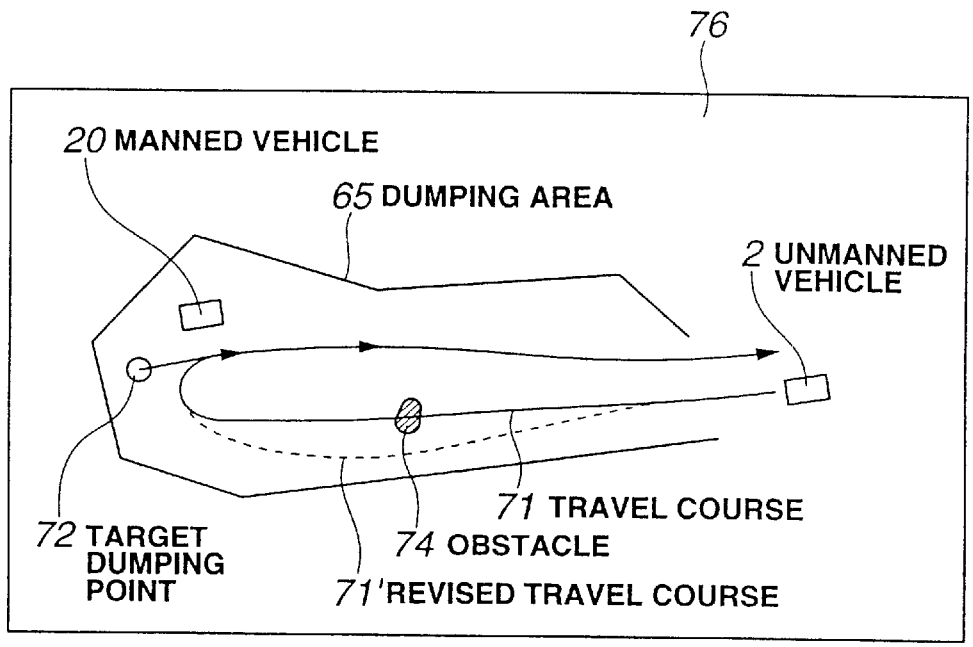
FIGS. 12(a) and 12(b) are diagrams representing a display screen.

In FIG. 12(a) is given a representation of how the dumping area 65, the travel courses 71 and 71' inside that dumping area 65, the unmanned vehicle 2 and the manned vehicle 20 inside that dumping area 65, and the obstacle(s) 74 inside that dumping area 65 are displayed on the display screen 76 of the display unit 50. When the loading site is displayed, moreover, the loading area 73, travel courses 71 and 71' inside that loading area 73, unmanned vehicle 2 and loading machine 14 inside that loading area 73, and the obstacle(s) 74 inside that loading area 73 will be displayed on the display screen 76 of the display unit 50.

The relative positions of the items displayed on the display screen 76 of the display unit 50 (that is, the course area 68, obstacle 74, etc.) correspond to the actual relative positions.

The position and shape of the course area 68 and the position, shape, and size of the obstacle 74 on the display screen 76 change according to the data input from the data input unit 48 as the plurality of unmanned vehicles 2, 2 . . . travels (that is, as the operations of the vehicles progress). In other words, when a new instruction control input is made with the data input unit 48, the position and shape of the course area 68 and the position, shape, and size of the obstacle 74 displayed on the display screen 76 of the display unit 50 change according to the content of the instruction control inputs.

That is, the operator ascertains changes in the position and shape of the course area 68 visually, and also recognizes the appearance and disappearance of obstacles 74.

Then, the operator makes data instruction control inputs using the data input unit 48 so that the results visually ascertained on the display screen 76 are obtained. More specifically, the display screen 76 is configured with a touch panel. Data input are also automatically revised by a data revision unit 49 as will be described subsequently.

Travel commands and steering commands are generated by the processor 47 in response to the manual control inputs of the operator, and these travel commands and steering commands are output to a travel mechanism unit 53 and steering mechanism unit 54. As a result, the loading machine 14 is steered and travels according to the manual control inputs.

The loading machine 14 also becomes the target point of the travel course 71 of the unmanned vehicle 2 in the loading area 73. Therefore, in the travel course revision unit 52 of the loading machine 14, processing is performed to revise the route of the travel course 71 in accord with changes in the target point as that vehicle 14 moves.

Obstacle 74 data input and revised at the loading machine 14, course area 68 data input and revised, travel course 71 data revised, and data indicating the position of that vehicle 14 that was measured are processed by the processor 47 and transmitted to the monitoring station 8 via the communications unit 55. When the travel course 71 has been revised in conjunction with movements of the loading machine 14, data indicating utilization permission to the effect that permission to travel on that revised travel course 71 is granted are transmitted to the monitoring station 8.

When the operator of the loading machine 14 has discovered visually that an obstacle 74 is present in the vicinity of the traveling unmanned vehicle 2, a stop command is transmitted via the communications unit 55 to that unmanned vehicle 2 to tell it to stop.

Figure 5:
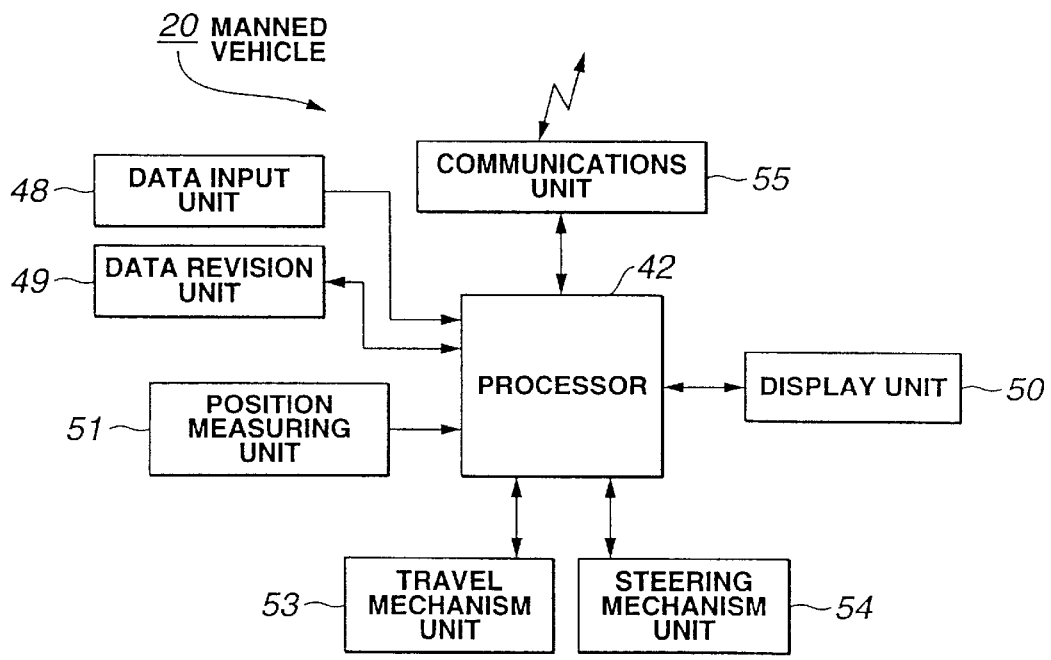
FIG. 5 is a block diagram of the configuration of a manned vehicle.

The configuration of the unmanned vehicle 20 diagrammed in FIG. 5 is next described.

In FIG. 5, items designated by the same symbol as in FIG. 4 are identical configuring elements. In other words, the manned vehicle 2 is configured more or less the same way as the loading machine 14. The point of difference is that, whereas in the loading machine 14 there is a travel course revision unit 52, the manned vehicle 20 has no such travel course revision unit 52.

Figure 3:
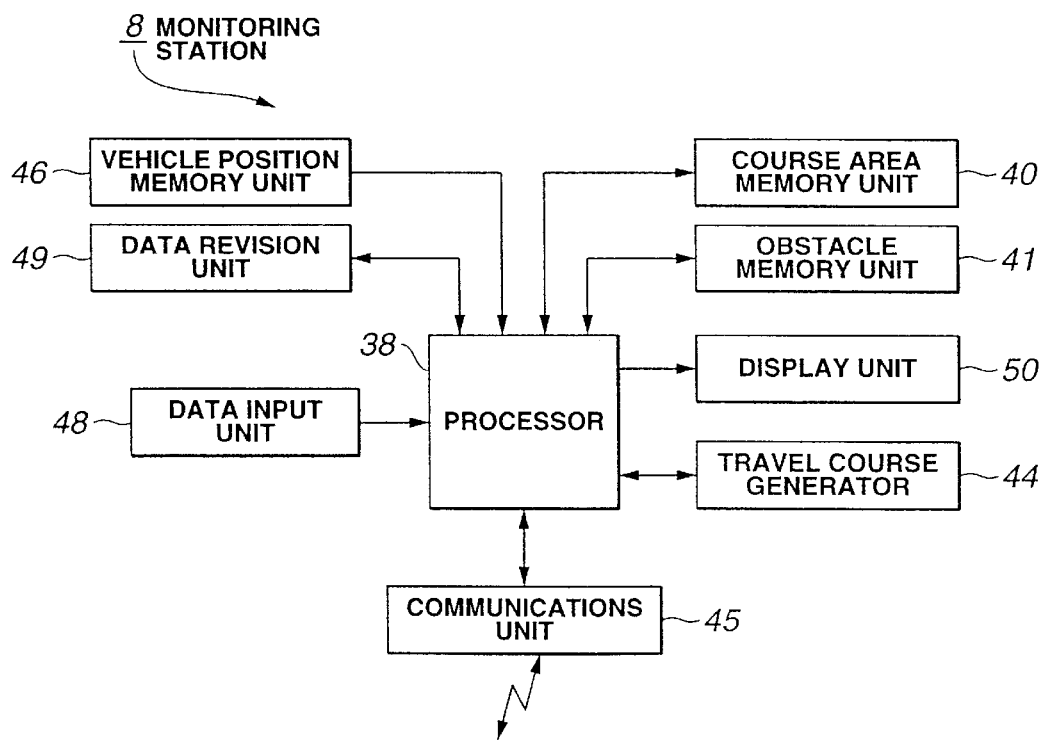
FIG. 3 is a block diagram of the configuration of a monitoring station.

The configuration of the monitoring station 8 diagrammed in FIG. 3 is next described.

In FIG. 3, items designated by the same symbol as in FIG. 4 are identical configuring elements. In other words, the same displays are made on the display unit 50 of the monitoring station 8 as on the display screen 76 diagrammed in FIG. 12(a). Accordingly, when an operator of the monitoring station 8 designates and enters obstacle 74 data and course area 68 data from the data input unit 48, the content displayed on the display screen 76 changes according to the content entered. The input data are also automatically revised by the data revision unit 49.

Various kinds of data transmitted from the plurality of unmanned vehicles 2, 2 ..., the loading machine 14, and the manned vehicle 20 are received by the communications unit 45 in the monitoring station 8. These various kinds of data are processed by the processor 38.

More specifically, the position data for the plurality of unmanned vehicles 2, 2 ..., the loading machine 14, and the manned vehicle 20, which is to say the position data for all of the vehicles, are stored in the vehicle position memory unit 46. The content so stored are rewritten to the latest position data every time the latest position data are transmitted.

In a course area memory unit 40 are stored course area 68 data transmitted from the loading machine 14, course area 68 data transmitted from the manned vehicle 20, and course area 68 data input and revised at the monitoring station 8. The content so stored is rewritten to the latest data every time the latest course area 68 data are transmitted. That is, in the course area memory unit 40 are stored the latest position and shape data for the course area 68 which are subject to change at any time as the work progresses.

In the processor 38 of the monitoring station 8, data are generated which indicate the position, shape, and size of an obstacle 74, as described subsequently, based on obstacle position data, road surface condition data, stop command reception data, and vehicle position data transmitted from the unmanned vehicle 2.

In the processor 38 of the monitoring station 8, similarly, data are generated which indicate the position, shape, and size of an obstacle 74, as described subsequently, based on obstacle data and vehicle position data transmitted from the loading machine 14.

In the processor 38 of the monitoring station 8, similarly, data are generated which indicate the position, shape, and size of an obstacle 74, as described subsequently, based on obstacle data and vehicle position data transmitted from the manned vehicle 20.

In the obstacle memory unit 41 are stored the obstacle 74 data generated on the basis of the data transmitted from the unmanned vehicle 2, loading machine 14, and manned vehicle 20, and obstacle 74 data input and revised at the monitoring station 8. The content so stored is rewritten to the latest data every time data are generated for the latest obstacle of obstacles 74. In other words, in the obstacle memory unit 41 are stored data on the latest position, shape, and size of obstacles 74 that are subject to change at any time as the work progresses.

On the display screen 76 of the display unit 50, the latest vehicle position, the latest course area 68 (dumping area 65) position and shape, and the latest obstacle 74 position, shape, and size are displayed based on the content of memory in the vehicle position memory unit 46, content of memory in the course area memory unit 40 and content of memory in the obstacle memory unit 41 (cf. FIG. 12(a)).

Before the unmanned vehicle 2 begins to operate, a manned vehicle 20 used for teaching travels beforehand over the course area 68, whereupon position data on the course area 68 (dumping area 65) are acquired, and position data on the travel course 71 of the unmanned vehicle 2 are acquired. The position data obtained from this teaching are sent to the monitoring station 8. These position data may also be acquired by surveying.

In the travel course generator 44 of the monitoring station 8 is generated the travel course 71, based at first on the position data obtained by the teaching described above.

Then, as the multiple unmanned vehicles 2, 2 . . . travel (as the work progresses), data stored in the course area memory unit 40 and obstacle memory unit 41 are read out whenever necessary. Based on the latest obstacle and course area data read out whenever necessary, the travel course 71 is revised so that the unmanned vehicles 2 travel within the course area 68 (dumping area 65) and pass the target dumping point 72 without conflicting with the obstacle or obstacles 74.

The position data for the travel course 71 generated by the travel course generator 44 or the position data for the revised travel course 71' revised are transmitted to the unmanned vehicles 2 through the communications unit 45.

Next, various aspects are described for revising the travel course 71 in response to the appearance or disappearance at any time of an obstacle 74.

Aspect 1

Let it be assumed that, as diagrammed in FIG. 12(a), a dumping area 65, a travel course 71 within that dumping area 65, and an unmanned vehicle 2 and manned vehicle 20 within that dumping area 65 are displayed on the display screen 76 of the display unit 50 in the manned vehicle 20.

The operator visually ascertains the appearance and disappearance of obstacles 74 in the course area 68. An example of this would be when rock that is part of the load of the unmanned vehicle 2 falls to the road surface within the field of view of the operator. Other examples thereof include the formation of potholes or mud on the road surface, or rough road surface, within the field of view of the operator. Such potholes, mud, and rough road surface constitute obstacles that cannot be detected by the obstacle detector 34 carried on the unmanned vehicles.

Another such case would be when fallen load (rock) is removed by an manned vehicle 20 such as a bulldozer within the field of view of the operator.

Next, the operator shifts his or her attention to the display screen 76, and changes the position of the appearance or disappearance of the obstacle 74 within the actual dumping area 65 to a position on the display screen 76. In other words, the dumping area 65 is displayed on the display screen 76, wherefore the position of the appearance or disappearance of the obstacle 74 can be confirmed on the screen from the relative positional relationship with that dumping area 65, and that position can be designated.

When an obstacle 74 newly appears, for example, data on the position of that appearance and on the shape and size are designated and input from the data input unit 48. Thus, as diagrammed in FIG. 12(*a*), the obstacle 74 ascertained by the operator will be displayed on the display screen 76.

Processing similar to the obstacle designation processing described above, performed through the display unit 50 and the data input unit 48 of the manned vehicle 20, is performed through the display unit 50 and the data input unit 48 of the loading machine 14. And a similar obstacle designation process is also performed in the monitoring station 8.

In the obstacle memory unit 41 of the monitoring station 8 are stored data on the position, shape, and size of obstacles 74 designated on the display screen 76 of the display unit 50. And the content stored in the obstacle memory unit 41 is updated every time an obstacle 74 is newly designated on the display screen 76.

Then, in the travel course generator 44 of the monitoring station 8, the revised travel course 71' that avoids that obstacle 74 is generated on the basis of data on the obstacle 74 stored in the obstacle memory unit 41, as indicated by the broken line in FIG. 12(*a*). The display screen 76 displays a travel course 71' which has been revised.

The revised travel course 71' at the actual work site is diagrammed in FIG. 8.

The unmanned vehicle 2 is guided over that revised travel course 71'. Thus the unmanned vehicle 2 can travel safely without conflicting with the obstacle 74.

When the disappearance of the obstacle 74 is indicated on the display screen 76, no conflict will occur even if the unmanned vehicle 2 passes over the position of that disappearance. Thereupon, in the travel course generator 44, the generation of a travel course that passes over the obstacle disappearance position is enabled. That is, unnecessary revision of the travel course is prevented.

In this embodiment aspect, the processing for revising the travel course 71 in response to indications of the appearance and disappearance of obstacles 74 on the display screen 76 is performed by the monitoring station 8, but provision may also be made so that the revision of the travel course 71 is performed by the loading machine 14. Embodiments are also possible that have the manned vehicle 20 perform the same processing.

Based on this embodiment aspect, as described above, the obstacle 74 indicated on the display screen 76 is stored as the position of an obstacle 74 common to the plurality of unmanned vehicles 2, 2 .... As a consequence, it is possible to perform the operation of revising travel courses 71, 71 ... for those unmanned vehicles 2, 2 ... easily and in a short time from those stored data. Hence revision operations on the travel courses 71, 71 ... can be performed with good work efficiency. Work efficiency improves dramatically compared to teaching operations wherewith a teaching vehicle must be driven every time an obstacle develops.

Also, by having the indications on the display screen 76 made whenever necessary, the obstacle 74 data are updated whenever necessary, wherefore a work site where the appearance and disappearance of obstacles 74 occur in real time, such as one where a plurality of unmanned vehicles 2, 2 ... is traveling, can be coped with. In other words, obstacles 74 that change at odd times are not overlooked, nor are things erroneously judged to be obstacles.

Based on this embodiment aspect, moreover, provision is made so that an operator visually verifies that something is an obstacle 74, wherefore even obstacles 74 that exist within a range that is undetectable by the obstacle detector 34 carried on board an unmanned vehicle or obstacles 74 having undetectable shapes (such as potholes, mud, or rough road surface and the like) can be judged to be obstacles.

Based on this embodiment aspect, furthermore, provision is made so that an operator visually verifies that something is an obstacle 74, wherefore obstacles 74 can be ascertained without fail, irrespective of the surrounding environment, compared to cases where detection is made by an obstacle detector 34.

Aspect 2

Let it here be assumed that, as diagrammed in FIG. 12(*a*), a dumping area 65 and an unmanned vehicle 2 and manned vehicle 20 inside that dumping area 65 are displayed on the display screen 76 of the display unit 50 of the manned vehicle 20. On that display screen 76 is also displayed a completed travel course 71" that has already been traveled over by the unmanned vehicle 2, as diagrammed in FIG. 12(*b*).

For this run-completed travel course 71", the latest travel course can be selected from the travel courses that have already been completely traveled over in the past. Or the run-completed travel course 71" can be selected and displayed on the screen by designating a symbol (vehicle number) that specifies an unmanned vehicle 2.

The operator visually ascertains the development of obstacles 74 within the course area 68. When it is ascertained that rock is present on the road surface within the field of view of the operator, the operator shifts his or her attention to the display screen 76 and changes the position where the obstacle 74 (rock) appeared in the actual dumping area 65 to the position on the display screen 76.

In such case, the dumping area 65 is displayed on the display screen 76, wherefore the position where that obstacle 74 appeared can be judged by its relative positional relationship with the dumping area 65.

At work sites at mining sites of extensive area, obstacles 74 such as rock and the like occur mainly from load carried on the unmanned vehicles 2 being dropped. Accordingly, such obstacles 74 are most often positioned on a run-completed travel course 71" that an unmanned vehicle 2 has traveled over.

Here, as diagrammed in FIG. 12(*b*), the run-completed travel course 71" is being displayed on the display screen 76, wherefore the position where such an obstacle 74 as rock or the like developed can be judged even more accurately by the relative positional relationship thereof with that run-completed travel course 71". In other words, the operator can revise a judgment concerning an obstacle 74 judged by the relative positional relationship with the course area 68 to one wherein it is positioned at 74' on the run-completed travel course 71", and designate and input accurate position data on the obstacle 74 from the data input unit 48. The directions in which load falls will differ depending on the curvature of the travel course 71", etc. That being so, the position of the obstacle 74 can be revised even more precisely taking the direction in which the load falls (i.e. behind the vehicle, to the left side of the vehicle, or to the right side of the vehicle) into consideration.

Thus, based on this embodiment aspect, a benefit is realized in that the position of an obstacle 74 occurring due to load such as rock or the like falling from an unmanned vehicle 2 can be indicated even more accurately on the display screen 76.

The same processing as the obstacle designation processing described above and done through the display unit 50 and the data input unit 48 of the manned vehicle 20 is also done through the display unit 50 and the data input unit 48 of the loading machine 14. Or the same obstacle designation processing is done at the monitoring station 8 also.

The processing following the obstacle designation processing is the same as in aspect 1, wherefore no description thereof is given here.

Aspect 3

Let it here be assumed that, as diagrammed in FIG. 12(a), a dumping area 65 and an unmanned vehicle 2 and manned vehicle 20 inside that dumping area 65 are displayed on the display screen 76 of the display unit 50 of the manned vehicle 20. On that display screen 76 is also displayed a completed travel course 71" that has already been traveled over by the unmanned vehicle 2, as diagrammed in FIG. 12(b).

The operator visually ascertains the development of obstacles 74 within the course area 68. When it is ascertained that rock is present on the road surface within the field of view of the operator, the operator shifts his or her attention to the display screen 76 and changes the position where the obstacle 74 (rock) appeared in the actual dumping area 65 to the position on the display screen 76.

In such case, the dumping area 65 is being displayed on the display screen 76, wherefore the position where that obstacle 74 appeared can be judged from its relative positional relationship with the dumping area 65. Thereupon, the operator designates and inputs data on the position of the obstacle 74 judged in this way from the data input unit 48.

At work sites at mining sites of extensive area, obstacles 74 such as rock and the like occur mainly from load carried on the unmanned vehicles 2 being dropped. Accordingly, such obstacles 74 are most often positioned on a run-completed travel course 71" that an unmanned vehicle 2 has traveled over.

Figure 12B:
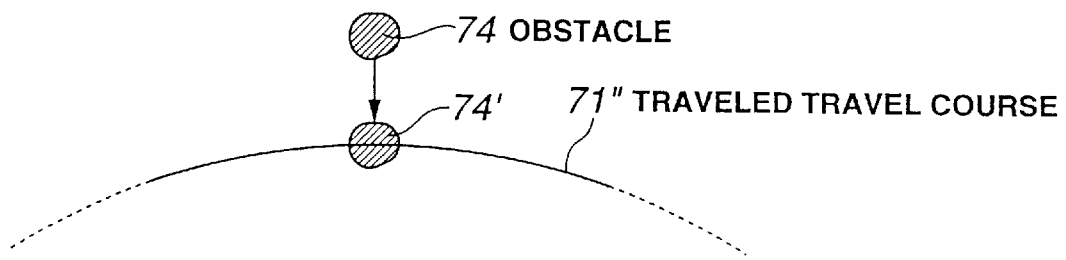

Thereupon, in the data revision unit 49, based on the position data on the run-completed travel course 71", as diagrammed in FIG. 12(b), revising processing is automatically performed to reposition the position of the obstacle 74 designated by the operator to 74' on the run-completed travel course 71". The direction in which load falls will differ depending on the curvature of the travel course 71", etc. That being so, the position of the obstacle 74 may be revised more precisely based on data indicating the direction in which the load falls (i.e. behind the vehicle, to the left side of the vehicle, or to the right side of the vehicle) into consideration.

Based on this embodiment aspect, as provided for in the foregoing, a benefit is realized in that, when an obstacle 74 occurring due to load such as rock or the like falling from an unmanned vehicle 2 is designated and input on the display screen 76, that indicated position is automatically revised to the more accurate position 74'.

The same processing as the obstacle designation revision processing described above and done through the display unit 50, the data input unit 48, and the data revision unit 49 of the manned vehicle 20 is also done through the display unit 50, data input unit 48, and data revision unit 49 of the loading machine 14. Or the same obstacle designation revision processing is done at the monitoring station 8 also.

The processing following the obstacle designation revision processing is the same as in aspect 1, wherefore no description thereof is given here.

Aspect 4

As diagrammed in FIG. 9, obstacles 74 ahead of an unmanned vehicle 2 are detected by an obstacle detector 34 in that vehicle. Obstacles 74 to the side or behind the unmanned vehicle 2 may also be detected by suitably altering the numbers of obstacle detectors 34 deployed and the positions where they are deployed. Obstacle detectors 34 may also be carried in the manned work vehicles 20 and 14. And obstacle detectors 34 may be either carried in all of the unmanned vehicles or in only some of the unmanned vehicles.

In the processor 31 of the unmanned vehicle 2, the relative position of the obstacle 74 relative to the unmanned vehicle 2 is computed, based on the projection angle e of the radio or laser beam projected from the obstacle detector 34 and on the distance d to the obstacle 74 corresponding to the transmission-receive time for the radio or laser beam. In the processor 31 of the unmanned vehicle 2, furthermore, the absolute position of the obstacle 74 is computed by adding the absolute position (X, Y) of the vehicle 2 measured by the position measuring unit 33 when the obstacle 74 was detected by the obstacle detector 34 and the relative position of the obstacle 74 found from the projection distance d and projection angle θ described above.

The processing for computing the position of the obstacle 74 may also be performed at the monitoring station 8 by transmitting the detection signals of the obstacle detector 34 to the monitoring station 8.

For this reason, computed positional data for obstacles 74 transmitted from the plurality of unmanned vehicles 2, 2 . . . will be stored in the obstacle memory unit 41 of the monitoring station 8. The content stored in this obstacle memory unit 41 will be updated every time another obstacle 74 is detected by the obstacle detector 34 and the position of that obstacle 74 is computed. There will be times, however, when the same obstacle 74 is detected by a plurality of the unmanned vehicles 2, 2 . . . . In such cases, the average value of the positions computed for that same obstacle 74 transmitted from the vehicles 2, 2 . . . can be found, and that average value stored in the obstacle memory unit 41 as the position data for that same obstacle 74.

In the travel course generator 44 of the monitoring station 8, a revised travel course 71' that avoids the obstacle 74 is generated, based on the position data for the obstacle 74 stored in the obstacle memory unit 41, as indicated by the broken line in FIG. 12(a). The revised travel course 71' is then displayed on the display screen 76.

The revised travel course 71' in the actual work site is diagrammed in FIG. 8.

The unmanned vehicle 2 is guided over that revised travel course 71'. Thus the unmanned vehicle 2 can travel safely without conflicting with the obstacle 74.

Based on this embodiment aspect, as described above, an obstacle 74 detected by one unmanned vehicle 2 is stored as the position of an obstacle 74 common to the plurality of unmanned vehicles 2, 2 . . . , wherefore the operation of revising the travel courses 71, 71 . . . of that plurality of unmanned vehicles 2, 2 . . . can be performed easily and in a short time by using those stored data. Thus the work for revising travel courses 71, 71 . . . can be performed efficiently.

Moreover, because an obstacle 74 detected by one unmanned vehicle 2 is considered an obstacle 74 also for the other unmanned vehicles 2, the other unmanned vehicles 2 can avoid that obstacle 74 without fail, even if that obstacle 74 is not detected by the obstacle detectors 34 carried on board those other unmanned vehicles 2. In other words, even in cases where the obstacle detector 34 of another unmanned vehicle 2 malfunctions or its operation becomes uncertain, or cases where an obstacle 74 cannot be detected precisely due to the influence of the surrounding environment, that other vehicle 2 can still avoid the obstacle 74 without fail.

Based on this embodiment aspect, furthermore, the detection and computation of an obstacle 74 by the plurality of unmanned vehicles 2, 2 . . . are performed whenever necessary, and the data on the obstacle 74 is updated as necessary, wherefore a work site where obstacles 74 develop in real time, such as a work site where a plurality of vehicles 2, 2 . . . travels about, can be coped with. That is, by mutually sharing data obtained from the plurality of unmanned vehicles, obstacles 74 that are subject to change at any time will not be overlooked.

Aspect 5

In the processor 31 of the unmanned vehicle 2, the deviation between the vehicle position obtained from the output of the wheel revolution counter and the vehicle position obtained from the output of the GPS that is a ground position measurement system is found, and the road surface condition of the road surface over which that unmanned vehicle 2 is currently traveling is detected from that deviation.

The road surface condition data are transmitted to the monitoring station 8, and a judgment is made by the processor 38 in the monitoring station 8 as to whether or not that road surface constitutes an obstacle 74.

That is, when the deviation between the vehicle position obtained from the output of the wheel revolution counter and the vehicle position obtained from the output of the GPS that is a ground position measurement system is equal to or greater than a prescribed threshold value (that is, when there is little change in the ground position even though the wheels are turning), it is judged that the unmanned vehicle 2 is slipping badly, and that the road surface at that time constitutes an obstacle 74 (mud or pothole or the like). It is further judged that the current measured position (X, Y) of the unmanned vehicle 2 that transmitted those road surface condition data is the position of the obstacle 74 (mud, pothole, etc.). The size of the obstacle 74 (mud, pothole, etc.) may also be established according to how badly the slipping is (how large the deviation noted above is).

A judgment is made as to whether or not an obstacle 74 exists from the deviation between the vehicle position obtained from the output of the wheel revolution counter and the vehicle position obtained from the output of the GPS that is a ground position measurement system. However, a judgment as to whether or not an obstacle 74 exists may also be made from the deviation between the output of a front wheel revolution counter and the output of a back wheel revolution counter. When the deviation between the number of revolutions of the front wheels and the number of revolutions of the back wheels is large, it can be judged that the unmanned vehicle 2 is slipping.

That an obstacle 74 exists is judged by detecting that slipping has occurred, moreover, but the existence of an obstacle 74 may also be judged by detecting road surface roughness.

On board the unmanned vehicle 2 is carried a gyro as a component configuring the position measuring unit 33. The output from that gyro, that is, the angular velocity of the angle of attitude of the unmanned vehicle 2, is transmitted as road surface condition data to the monitoring station.8.

At the monitoring station 8, when the angular velocity of the angle of attitude of the unmanned vehicle 2 output from the gyro is equal to or greater than a prescribed threshold value (that is, when the change in attitude per unit time about the yaw axis of the unmanned vehicle 2 is large), it is judged that the road surface under the unmanned vehicle 2 is very rough, and that the road surface at that time constitutes an obstacle 74 (road surface roughness). Then it is judged that the current measured position (X, Y) of the unmanned vehicle 2 that transmitted the road surface condition data is the position of an obstacle 74 (road surface roughness). The size of the obstacle 74 (road surface roughness) may also be established according to the size of the road surface roughness (that is, according to the size of the values output by the gyro).

The judgment as to whether or not an obstacle 74 is constituted is made from the output of the gyro, but an inclinometer may be carried on board the unmanned vehicle 2, and the judgment as to whether or not an obstacle 74 is constituted made on the basis of the rate of change in the angle of inclination per unit time obtained from the output of that inclinometer. When the rate of change in the angle of inclination per unit time obtained from the output of the inclinometer is large (that is, when the change in attitude per unit time about the roll or pitch axis of the unmanned vehicle 2 is large), it can be judged that the road surface under the unmanned vehicle 2 is rough.

Even in cases where the degree of slip or road surface roughness as described in the foregoing is too small to be judged as constituting an obstacle 74, depending on that degree of slip or road surface roughness, a travel command or stop command can be transmitted to the unmanned vehicle 2. That is, the monitoring station 8 can transmit a travel command to the unmanned vehicle 2 to cause it to lower its speed according to the extent of the slip or road surface roughness. Depending on the case, moreover, the monitoring station 8 may transmit a stop command to the unmanned vehicle 2 to cause it to stop traveling.

In this embodiment aspect, furthermore, the degree of slip or road surface roughness is judged on the monitoring station 8 side on the basis of road surface condition data, but judgments of the degree of slip or road surface roughness may also be made independently on the unmanned vehicle 2 side on the bases of the road surface condition data.

In that case, when it is judged on the unmanned vehicle 2 side that there is slipping or that the road surface is rough, that unmanned vehicle 2 lowers its speed of travel according to the level of slip or road surface roughness. If the slip or road surface roughness equals or exceeds a prescribed threshold value, travel is stopped. In that case, data are transmitted to the monitoring station 8 indicating that the unmanned vehicle 2 has lowered its speed or stopped traveling.

It is also permissible to have judgments as to whether or not an obstacle 74 is constituted made in the unmanned vehicle 2, and the results of that judgment transmitted to the monitoring station 8. In that case, the monitoring station 8 may use the judgment results transmitted from the unmanned vehicle 2 as they are, or, alternatively, a final decision as to whether or not an obstacle 74 is constituted may be made at the monitoring station 8 after further analysis of the data transmitted from the unmanned vehicle 2 (i.e. the road surface condition data, speed lowered or travel stopped data, and obstacle judgment data).

For that reason, in the obstacle memory unit 41 of the monitoring station 8, the measured position (X, Y) of the unmanned vehicle 2 at the time the slip or road surface roughness occurred is stored in memory as the position of the obstacle 74. The content stored in the obstacle memory unit 41 is updated every time a judgment is made by the obstacle detector 34 that a new obstacle 74 (slip or road surface roughness) exists.

In the travel course generator 44 of the monitoring station 8, a revised travel course 71' that avoids the obstacle 74 is generated, based on the position data for the obstacle 74 stored in the obstacle memory unit 41, as indicated by the broken line in FIG. 12(*a*). The revised travel course 71' is then displayed on the display screen 76.

The revised travel course 71' in the actual work site is diagrammed in FIG. 8.

The unmanned vehicle 2 is guided over that revised travel course 71'. Thus the unmanned vehicle 2 can travel safely without conflicting with the obstacle 74.

Based on this embodiment aspect, as described above, an obstacle 74 (slip or road surface roughness) that has occurred at one unmanned vehicle 2 is stored as the position of an obstacle 74 common to the plurality of unmanned vehicles 2, 2 . . . , wherefore the operation of revising the travel courses 71, 71 . . . of that plurality of unmanned vehicles 2, 2 . . . can be performed easily and in a short time from those stored data.

Based on this embodiment aspect, moreover, data on the obstacle 74 are updated as necessary, according to the occurrence at odd times of obstacles 74 (slips or road surface roughness), by the plurality of unmanned vehicles 2, 2 . . . , wherefore a work site where obstacles 74 develop in real time, such as a work site where a plurality of vehicles 2, 2 . . . travels about, can be coped with. That is, by mutually sharing obstacle data obtained from the plurality of unmanned vehicles, obstacles 74 (slips and road surface roughness) that are subject to change at any time will not be overlooked.

Based on this embodiment aspect, furthermore, because judgements are made that an obstacle 74 exists from the condition of the road surface traveled over by the unmanned vehicles 2, even obstacles (such as mud, potholes, and roughness or the like) that cannot be detected by the obstacle detector 34 carried on board the unmanned vehicles can be judged to be obstacles.

There will also be cases where such obstacles 74 as mud, potholes, or rough road surfaces fluidly change or disappear as the work progresses. When an operator visually determines that an obstacle 74 has disappeared, he or she indicates the disappearance of that obstacle 74 on the display screen 76 as described earlier.

At the monitoring station 8, processing is done to erase data on the corresponding obstacle 74 from the obstacle memory unit 41 in response to such indications of the disappearance of an obstacle 74.

Provision may also be made so that after a certain time has elapsed since an obstacle 74 was stored in the obstacle memory unit 41 a query is sent from the monitoring station 8 to an operator asking whether that obstacle 74 has disappeared or not.

In this embodiment aspect, moreover, it is assumed that all of the unmanned n vehicles detect road surface conditions, but it is permissible to have only some of the unmanned vehicles detect the road surface conditions. The road surface conditions may also be detected by the loading machine 14 and manned vehicle 20. In such cases, obstacles 74 (mud, potholes, rough road surfaces and the like) on the road surface traveled over by the loading machine 14 and manned vehicle 20 can be ascertained.

Aspect 6

When the operator of the manned vehicle 20 or loading machine 14 discovers visually that an obstacle 74 exists in the vicinity of a traveling unmanned vehicle 2, he or she transmits a stop command via the communications unit 55 to that unmanned vehicle 2 instructing it to stop. In such cases, the obstacle 74 would be load (rock or earth, etc.) fallen from an unmanned vehicle 2, mud, a pothole, or rough road surface or the like.

At the monitoring station 8, data are received from the unmanned vehicle 2 receiving the stop command notifying that such stop command was received. At the monitoring station 8, furthermore, data on the current measured position (X, Y) of the unmanned vehicle 2 that received that stop command are received. Thereupon, at the monitoring station 8, a judgment can be made that the measured position (X, Y) of the unmanned vehicle 2 that received that stop command (i.e. the position where the unmanned vehicle 2 stopped) is the position of the obstacle 74.

In order to define the position of the obstacle 74 more accurately, data indicating the relative position of the obstacle 74 relative to the unmanned vehicle 2 may be transmitted to the monitoring station 8 from the loading machine 14 or manned vehicle 20 that transmitted that stop command.

Figure 10:
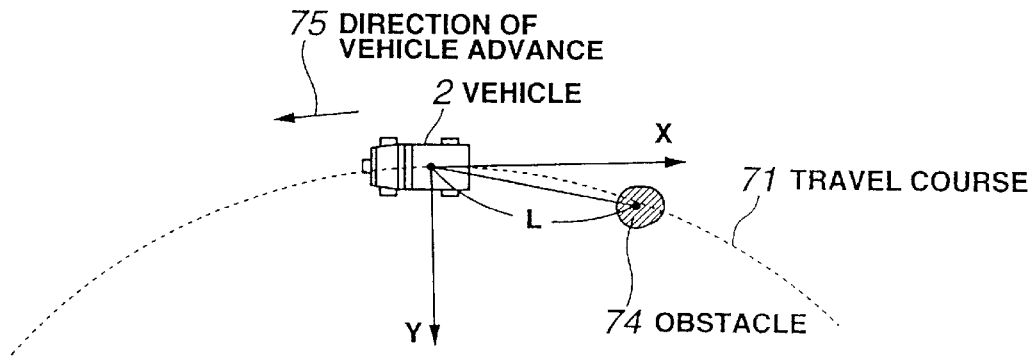
FIG. 10 is a diagram representing the positional relationship between an obstacle and a travel course.
Figure 11:
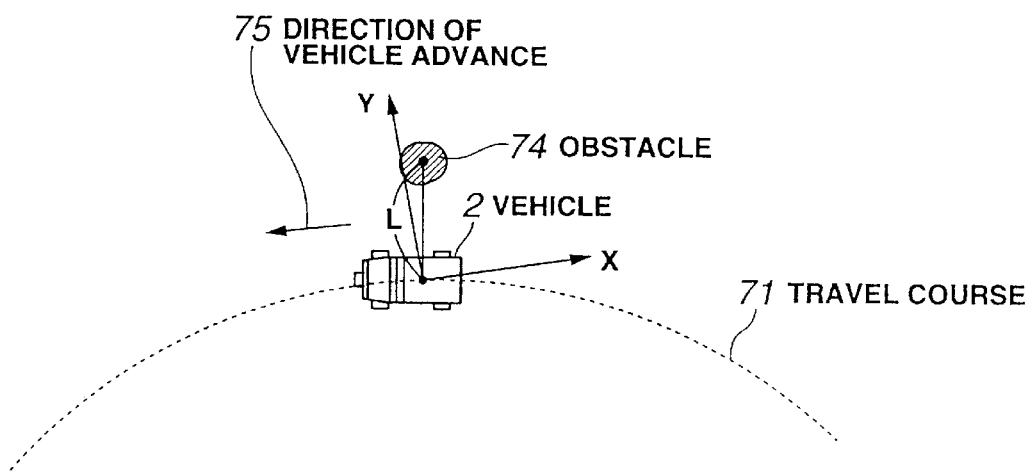
FIG. 11 is a diagram representing the positional relationship between an obstacle and a travel course.

In FIG. 10 and FIG. 11, respectively, are diagrammed examples of positional relationships between an obstacle 74 and a travel course.

When, as diagrammed in FIG. 10, the operator of an manned vehicle 20 or loading machine 14 verifies that an obstacle 74 exists behind an unmanned vehicle 2 (on the travel course 71), he or she transmits coordinate position data in a coordinate system X-Y having that unmanned vehicle 2 as the origin to the monitoring station 8. Or the data "L(m) behind unmanned vehicle 2" may be transmitted to the monitoring station 8. In that case, the corresponding data are transmitted to the monitoring station 8 when the corresponding position is indicated on the display screen 76 of the display unit 50 of the manned vehicle 20 or loading machine 14.

At the monitoring station 8, the position of the obstacle 74 is accurately computed based on the measured position (X, Y) of the unmanned vehicle 2 that received the stop command (i.e. the position where the unmanned vehicle 2 stopped) and the relative position data transmitted from the manned vehicle 20 or loading machine 14. That is, the accurate position of the obstacle 74 is specified as being behind the unmanned vehicle 2 (on the travel course 71).

Similarly, when, as diagrammed in FIG. 11, the operator of the manned vehicle 20 or loading machine 14 verifies that an obstacle 74 exists at one side of an unmanned vehicle 2, he or she transmits coordinate position data in a coordinate system X-Y having that unmanned vehicle 2 as the origin to the monitoring station 8. Or the data "L(m) to side of unmanned vehicle 2" may be transmitted to the monitoring station 8. In that case, the corresponding data are transmitted to the monitoring station 8 when the corresponding position is indicated on the display screen 76 of the display unit 50 of the manned vehicle 20 or loading machine 14.

At the monitoring station 8, the position of the obstacle 74 is accurately computed based on the measured position (X, Y) of the unmanned vehicle 2 that received the stop command (i.e. the position where the unmanned vehicle 2 stopped) and the relative position data transmitted from the manned vehicle 20 or loading machine 14. That is, the accurate position of the obstacle 74 is specified as being to one side of the unmanned vehicle 2.

The shape and size of the obstacle 74 may also be specified, as well as the position thereof, by transmitting data on the shape and size of the obstacle 74 to the monitoring station 8 from the manned vehicle 20 or loading machine 14.

Thus the position of the unmanned vehicle 2 that received the stop command (or a position close to one side thereof) is stored in the obstacle memory unit 41 of the monitoring station 8 as the position of the obstacle 74. And the content stored in the obstacle memory unit 41 is updated every time an unmanned vehicle 2 receives a stop command.

In the travel course generator 44 of the monitoring station 8, a revised travel course 71' that avoids the obstacle 74 is generated, based on the position data for the obstacle 74 stored in the obstacle memory unit 41, as indicated by the broken line in FIG. 12(a). The revised travel course 71' is then displayed on the display screen 76.

The revised travel course 71' in the actual work site is diagrammed in FIG. 8.

The unmanned vehicle 2 is guided over that revised travel course 71'. Thus the unmanned vehicle 2 can travel safely without conflicting with the obstacle 74.

Based on this embodiment aspect, as described in the foregoing, the location where one unmanned vehicle 2 has stopped is stored in memory as the position of an obstacle 74 common to the plurality of unmanned vehicles 2,2 . . . . Therefore, from these stored data, the operation of revising the travel courses 71, 71 . . . for the plurality of unmanned vehicles 2, 2 . . . can be done easily and in a short time. Thus the operation of revising the travel courses 71, 71 . . . can be performed with good work efficiency.

Based on this embodiment aspect, furthermore, the data on the obstacle 74 are updated as necessary, in response to the plurality of unmanned vehicles 2, 2 . . . stopping at odd times, wherefore a work site where obstacles 74 develop in real time, such as a work site where a plurality of vehicles 2, 2 . . . travel about, can be coped with. That is, by mutually sharing obstacle data obtained from the plurality of unmanned vehicles, obstacles 74 that are subject to change at any time will not be overlooked.

Based on this embodiment aspect, furthermore, an operator verifies obstacles 74 visually, wherefore even obstacles 74 that cannot be detected by the obstacle detector 34 carried on board the unmanned vehicles (such as mud, potholes, or rough road surface, etc.) can be judged to be an obstacle.

Based on this embodiment aspect, moreover, the verification that something constitutes an obstacle 74 is done visually by an operator, wherefore, compared to when detection is made by an obstacle detector 34, an obstacle 74 can be definitely ascertained irrespective of the surrounding environment.

In this embodiment aspect, it is assumed that all of the unmanned vehicles have functions for receiving stop commands and then stopping, but embodiment is also possible such that the functions for receiving stop commands and then stopping are imparted only to some of the unmanned vehicles.

Aspect 7

With the position measuring units 51 in the manned vehicle 20 and loading machine 14, the position of that selfsame vehicle is measured. These measured position data are transmitted to the monitoring station 8.

The manned vehicle 20 and loading machine 14 become obstacles to the traveling of the plurality of vehicles 2, 2 . . . .

That being so, the measured positions transmitted from the manned vehicle 20 and loading machine 14 are stored as the positions of obstacles 74 in the obstacle memory unit 41 in the monitoring station 8. The content stored in the obstacle memory unit 41 is updated every time the measured position of the manned vehicle 20 or loading machine 14 is updated, which may happen anytime.

In the travel course generator 44 of the monitoring station 8, a revised travel course 71' that avoids an obstacle 74 is generated on the basis of position data for that obstacle 74 stored in the obstacle memory unit 41, as indicated by the broken line in FIG. 12(a). The revised travel course 71' is displayed on the display screen 76.

The revised travel course 71' at the actual work site is diagrammed in FIG. 8.

The unmanned vehicle 2 is guided over that revised travel course 71'. Thus the unmanned vehicle 2 can travel safely without conflicting with the obstacle 74.

Provision may also be made so that the revision of the stored position of the obstacle 74 is performed at odd times, irrespective of whether the manned vehicle 20 and loading machine 14 are traveling or stopped.

Alternatively, provision may be made so that the updating of the stored position of the obstacle 74 is only performed each time the manned vehicle 20 or loading machine 14 stops, and not while they are traveling. In that case, while the manned vehicle 20 and loading machine 14 are traveling, the obstacle data corresponding to those traveling vehicles will be erased from the content stored in the obstacle memory unit 41.

However, if the stored positions of obstacles 74 are updated at odd times while the manned vehicle 20 and loading machine 14 are traveling, the travel course 71 will be revised frequently. In order to avoid that, it is preferable that the stored positions of the obstacles 74 be updated, and the travel course 71 revised, every time the manned vehicle 20 or loading machine 14 stops.

Also, even though the travel course 71 has been revised to avoid the manned vehicle 20 and loading machine 14, there is still a danger of conflicting with the unmanned vehicle 2 when the manned vehicle 20 and loading machine 14 resume traveling. That being the case, it is preferable that radio communications be conducted reciprocally between the unmanned vehicle 2, on the one hand, and the manned vehicle 20 and loading machine 14, on the other, and the unmanned vehicle 2 guided while verifying the mutual positional relationships.

In this embodiment aspect, the case where the unmanned vehicle 20 and loading machine 14 themselves become obstacles 74 is assumed, but the following embodiment is also possible.

That is, when an operator discovers an obstacle 74 such as rock or the like, the manned vehicle 20 is made to continue traveling up to a position near that obstacle 74. Thereupon, the manned vehicle 20 specifies the relative position of the obstacle 74, relative to that selfsame vehicle, as diagrammed in FIG. 10 and FIG. 11. These relative position data are transmitted to the monitoring station 8.

At the monitoring station 8, the position of the obstacle 74 is accurately computed on the basis of the measured position data for the manned vehicle 20 transmitted and the relative position data for the obstacle 74, relative to the manned vehicle 20. These position data for the obstacle 74 are stored in the obstacle memory unit 41.

In this embodiment aspect, only the position data for the obstacle 74 are transmitted to the monitoring station 8, but embodiment is also possible such that data on the shape and size of the obstacle 74 are generated and transmitted to the monitoring station 8.

In that case, the vehicle travel speed and direction of vehicle advance are computed on the basis of the output of the position measuring unit 51 in the manned vehicle 20 and loading machine 14. Then data on the size of the obstacle 74 are generated according to the size of that computed vehicle speed. More specifically, by judging the obstacle 74 to be successively larger as the travel speeds of the manned vehicle 20 and loading machine 14 are progressively higher, the size of the obstacle 74 is specified.

Shape data for the obstacle 74 are also generated according to the direction of vehicle advance computed as noted above. More specifically, by judging the obstacle 74 to have a shape that is long in the direction of the advance of the manned vehicle 20 and loading machine 14, the shape of the obstacle 74 is specified.

Thus position, shape, and size data for.the obstacle 74 are stored in the obstacle memory unit 41.

In this embodiment aspect, it is assumed that the manned work vehicles 20 and 14 constitute obstacles to the unmanned vehicle 2, but those work vehicles 20 and 14 may also be unmanned vehicles.

According to this embodiment aspect, as described in the foregoing, the work vehicles 20 and 14 are stored as positions of obstacles 74 common to the plurality of vehicles 2, 2 . . . , wherefore it is possible to perform the operation of revising the travel courses 71, 71 . . . for the plurality of vehicles 2, 2 . . . easily and in a short time from those data stored in memory. Hence the operation of revising the travel courses 71, 71 . . . can be done with good work efficiency.

The obstacle 74 data are updated as necessary as the positions of the work vehicles 20 and 14 are altered at odd times, wherefore work sites where obstacles 74 change in real time, such as work sites where a plurality of vehicles 2, 2 . . . is traveling about, can be coped with. That is, obstacles 74 that are subject to change at any time are no longer overlooked.

In the embodiment aspect(s) described in the foregoing, cases where revised travel courses 71' are generated according to obstacle 74 data are assumed. However, with this invention it is not absolutely necessary to generate a travel course. It is only required that at least obstacle 74 data are acquired. In cases where unmanned vehicles having artificial intelligence are employed, for example, if only obstacle 74 data are supplied to the vehicle at issue, the unmanned vehicles will be able to follow a logic engine, negotiate a route that avoids the obstacle 74, and arrive at a target dumping point 72.

An embodiment aspect will now be described wherewith it is easy to generate guided travel courses when the course area or target point changes.

Figure 15:
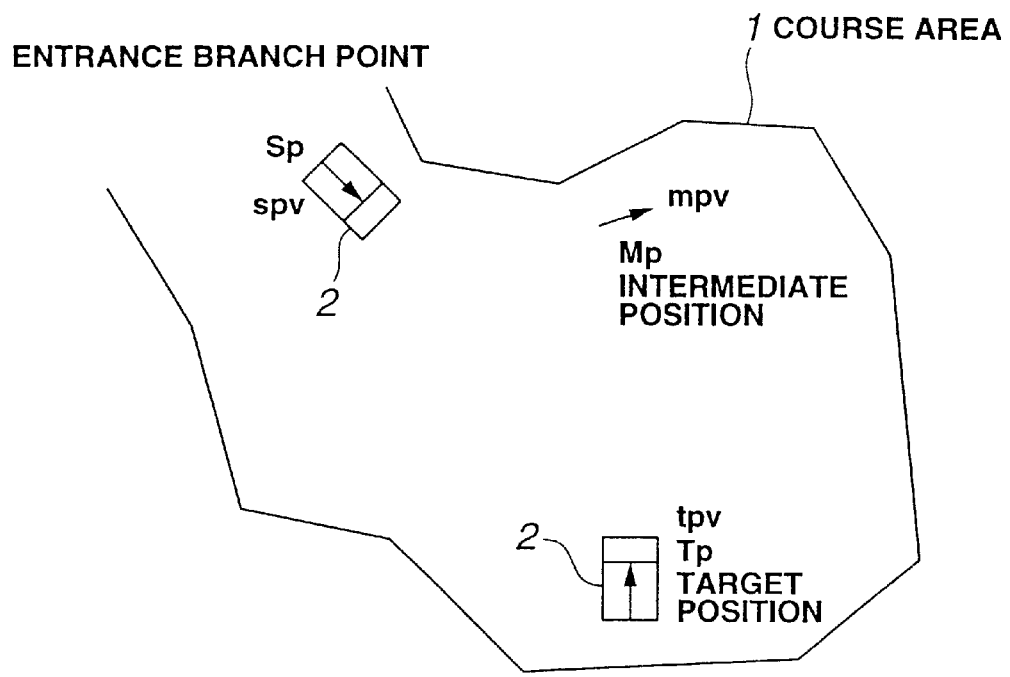
FIG. 15 is a conceptual diagram exemplifying the shape of a course area.

In FIG. 15, course area 1 is a work area (loading area or dumping area) at a mining facility. An unmanned off-road dump truck 2 that is an unmanned moving body arrives at position $S_P$ at an entrance branch point in this course area 1, then travels toward position $T_P$ that is a movement target point over a guidance course that will be described below, and performs prescribed work (loading or dumping work) at that position $T_P$.

The unmanned off-road dump truck 2 (hereinafter called an unmanned dump truck) is equipped with a travel control system such as is diagrammed in FIG. 13.

Figure 13:
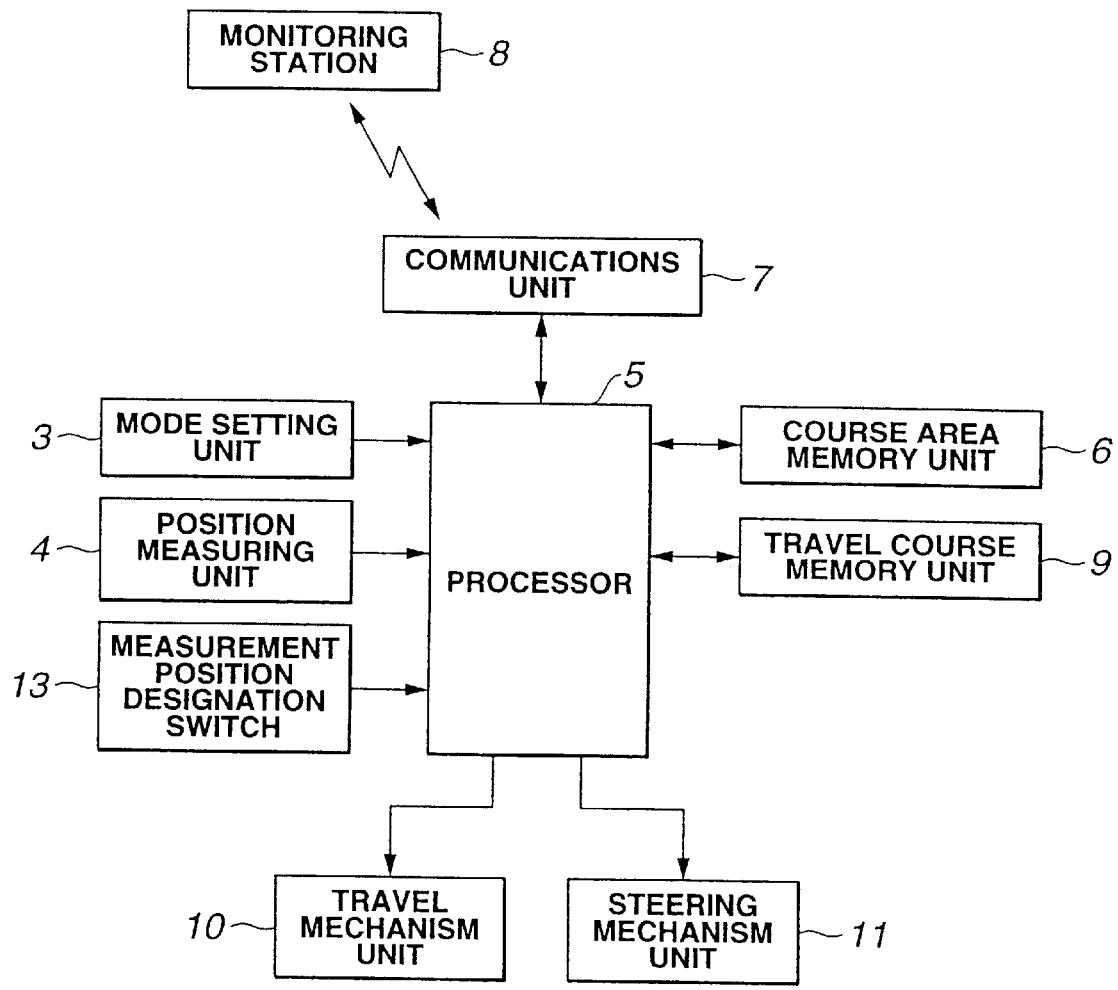
FIG. 13 is a block diagram, of the configuration of a control system deployed in an unmanned dump truck.

In FIG. 13, a mode setting unit 3 is for setting a measurement mode and an automatic operation mode, configured by a switch or switches, for example.

A position measurement unit 4 is for detecting the current travel position of the unmanned dump truck 2 using a GPS (global positioning system), tire revolution counting sensor for obtaining distance traveled information, and/or an optical fiber gyro for obtaining travel direction information, or the like (not shown).

Figure 14:
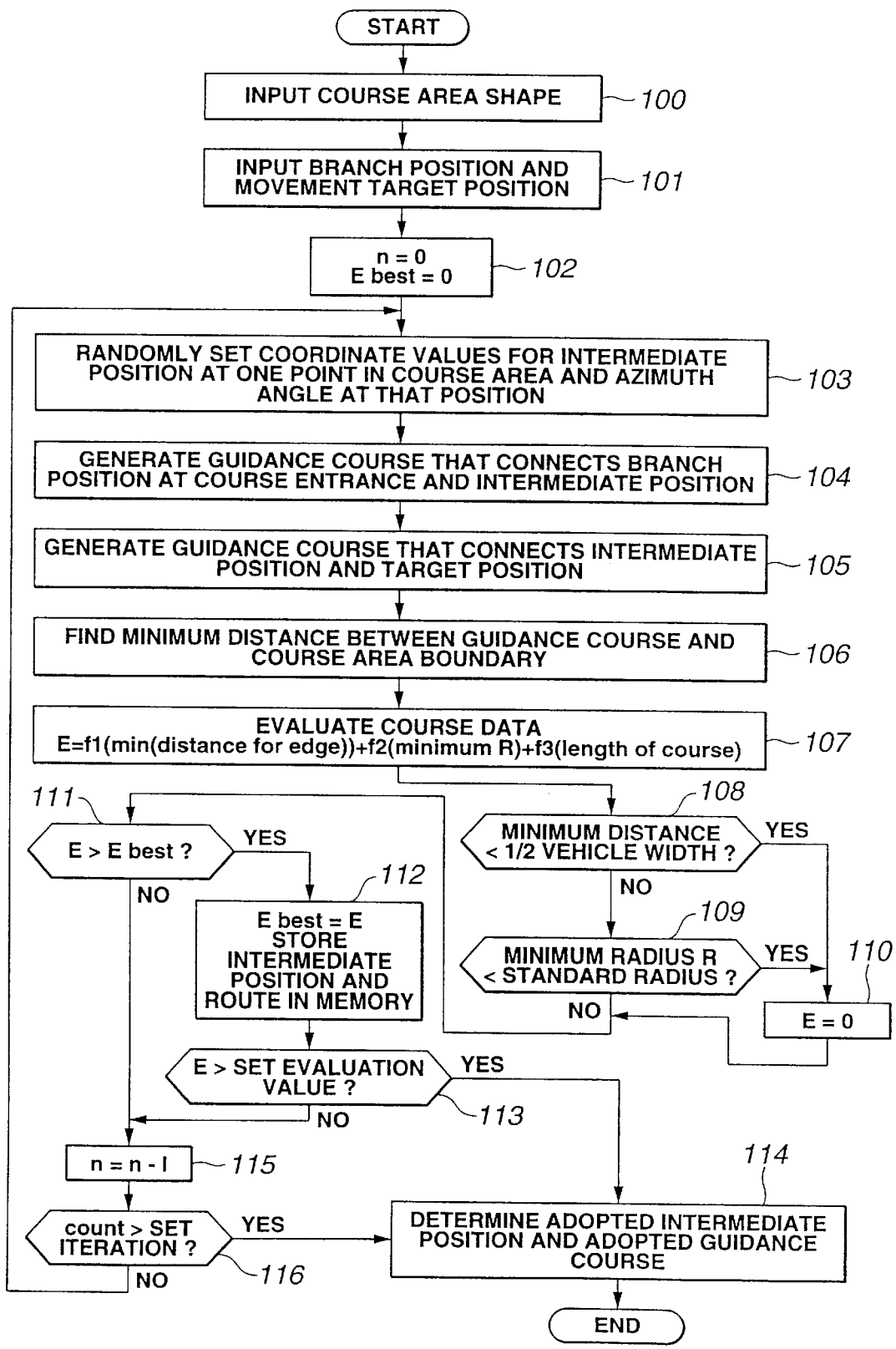
FIG. 14 is a flowchart exemplifying procedures for generating a guidance course.

FIG. 14 provides an example of a guidance course generation procedure.

In this procedure, first, a routine for inputting the shape of the course area 1 is executed (step 100).

When inputting the shape of the course area 1, an area measuring dump truck (hereinafter called measuring dump truck)(not shown) is driven. That is, an operator boards this measurement dump truck, operates the mode setting unit 3 noted above to set the measurement mode noted above, and then drives the dump truck 2 along the boundary of the course area 1.

At such time, the position measurement unit 4 in the measurement dump truck detects the travel position of that measurement dump truck moment by moment, and records it in a course area memory unit 6. Accordingly, the shape of the course area 1 will be stored in the course area memory unit 6 as a sequence of travel position coordinate points.

In cases where there is area which cannot be traveled inside the course area (such as areas where there are large rocks), the measurement dump truck is moved to the vicinity thereof, and a relative range from that position is either entered manually or entered by an operator on a screen using a graphic interface.

The communications unit 7 indicated in FIG. 13 is for conducting communications with a monitoring station 8 located at a prescribed location. The communications unit 7 in the measurement dump truck described above transmits data to the monitoring station 8 indicating the shape of the measured course area.

Now, the loading operation of the working unmanned dump truck 2 is done by bringing the dump truck 2 alongside a loading apparatus such as a wheel loader or power shovel that is digging ore, and having that loading apparatus load the ore into the dump truck.

The position $T_P$ at the movement target point noted earlier is the loading position for the loading apparatus, but this loading position will change as the work progresses.

That being so, this embodiment makes provision for obtaining the position of the bucket of the power shovel or wheel loader and the angle of incursion of the unmanned dump truck 2 using a GPS on the loading apparatus and a geomagnetic azimuth sensor.

The loading apparatus is equipped with a radio communication device, and transmits the bucket position as the position $T_P$ at the movement target point during loading to the monitoring facility 8 noted earlier.

Furthermore, the movement target point position $T_P$ can be obtained, even when provision is made for indicating the relative position from the previous loading position, following changes in the position of the loading apparatus, as noted in Japanese Patent Application Laid-Open No. 9-44242.

The monitoring station 8 transmits data indicating the shape of the course area, the position $S_P$ of the entrance branch point (movement origin) of the course area 1, and the movement target point position $T_P$ to the working unmanned dump truck 2.

Thereupon, a processor 5 in the unmanned dump truck 2 inputs the branch point position $S_P$ and the movement target point position $T_P$ via the communications unit 7 (step 101), and then initializes at zero a guidance course generation number n and best evaluation value E best, described below, respectively (step 102).

Then, the processor 5 randomly sets the coordinates of a position $M_P$ at one intermediate point in the course area 1 and the azimuth angle of the unmanned dump truck 2 at that intermediate point position $M_P$ (step 103), and generates a guidance course for the unmanned dump truck 2 that connects the branch point position $S_P$ and the intermediate point position $M_P$ (step 104). Now, if the direction vector of the unmanned dump truck 2 at the branch point position $S_P$ is made spv, the same direction vector at the intermediate point position $M_P$ made mpv, and the same direction vector at the target point position $T_P$ made tpv, as diagrammed in FIG. 15, the procedure for generating the guidance course in step 104 will be as follows.

Figure 16:
FIG. 16 is a diagram representing an aspect of guidance course generation.
Figure 17:
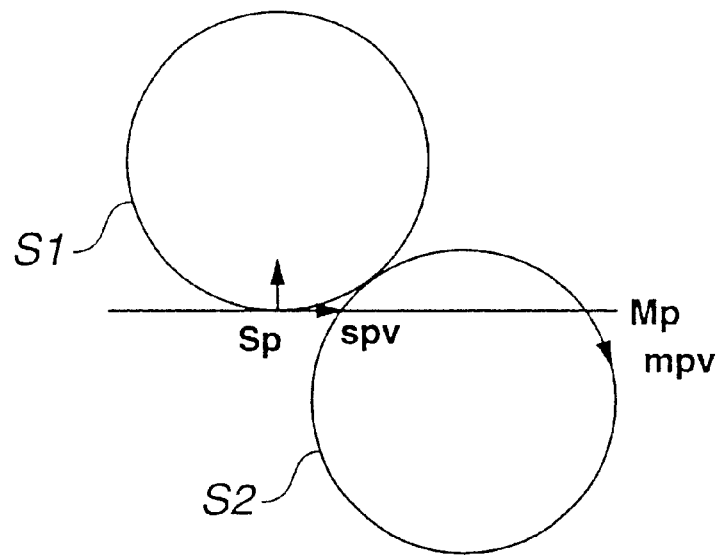
FIG. 17 is a diagram representing an aspect of guidance course generation.

(A) Case where the position $M_P$ exists on the straight line $S_P$+m spv, as diagrammed in FIG. 16 and FIG. 17:

(a-1)

When spv=mpv, the straight line connecting the positions $S_P$ and $M_P$ is generated as the guidance course, as diagrammed in FIG. 16.

(a-2)

When spv≠mpv, circles S1 and S2 satisfying conditions 1 and 2 noted below are established, and a line made up of combinations of arcs on those circles S1 and S2 intervening between the positions $S_P$ and $M_P$ is generated as the guidance course.

Condition 1: The circumference of the circle S1 passes through the point $S_P$ and the straight line $S_P$+k spv is tangent to that circle S1. The circumference of the circle S2 passes through the position $M_P$ and the straight line $M_P$+l mpv is tangent to that circle S2.

Condition 2: The center of the circle S1 is on the side toward the position $M_P$ as seen from the position $S_P$, and the center of the circle S2 is on the side toward the position $S_P$ as seen from the position $M_P$.

Condition 3: The circles S1 and S2 are of equal diameter and mutually tangent.

(B) When the position $M_P$ does not exist on the straight line $S_P$+m spv, and both spv≠mpv and spv≠−mpv are true, the intersection $SM_P$ between the straight line $S_P$+m spv and the straight line $M_P$+n mpv is found, as diagrammed in FIGS. 18 to 22.

(b-1)

Figure 18:
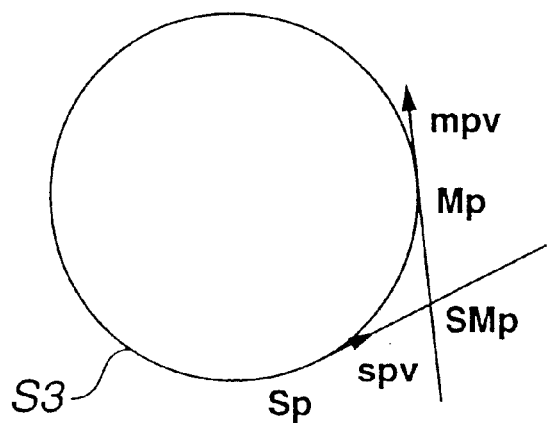
FIG. 18 is a diagram representing an aspect of guidance course generation.

When in front of the position $S_P$ and behind the position $M_P$, a straight line that passes through the position $S_P$ and contains the vector spv, and a circle S3 to which a straight line that passes through the position $M_P$ and contains the vector mpv is tangent is established, and a guidance course is generated that passes over a circular arc on the circle S3 existing between the positions $S_P$ and $M_P$ and the straight line, as diagrammed in FIG. 18.

In other words, when the distance between the intersection $SM_P$ and the position $S_P$ is shorter than the distance between the intersection $SM_P$ and the position $M_P$, a circular arc that extends from the position $S_P$ through the circle $M_P$ to the intersection with a straight line parallel to the vector mpv, and a line segment that extends from that intersection to the position $M_P$ are generated as the course.

Conversely, when the distance between the intersection $SM_P$ and the position $M_P$ is shorter, a course is generated which comprises a line segment extending from the position $S_P$ to the point where the straight line containing the vector spv touches the circle, and the arc on the circle extending from that tangent point to the position $M_P$.

(b-2)

Figure 19:
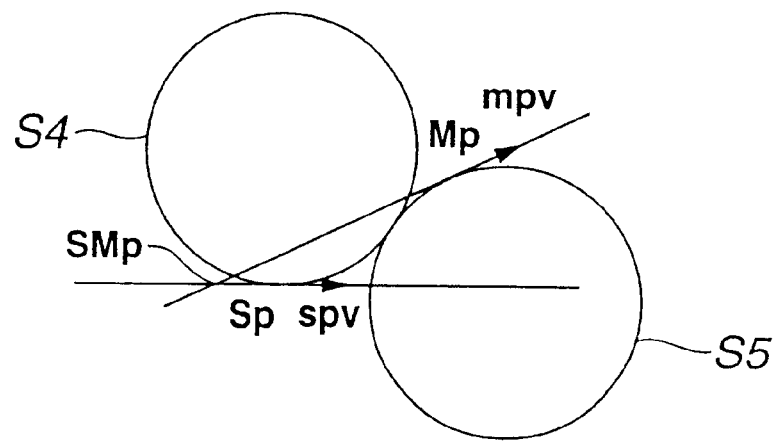
FIG. 19 is a diagram representing an aspect of guidance course generation.
Figure 20:
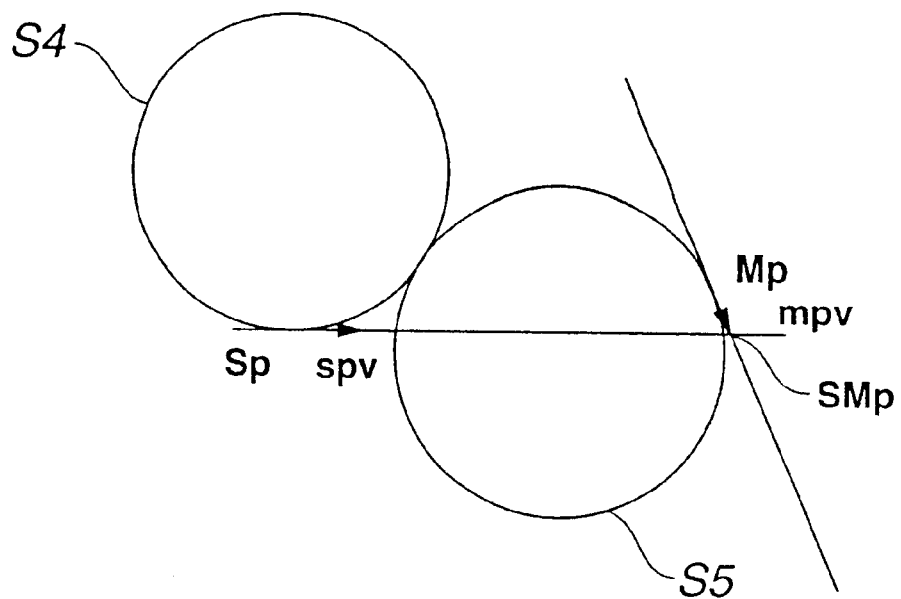
FIG. 20 is a diagram representing an aspect of guidance course generation.

When the intersection $SM_P$ is behind the position $S_P$ and the position $M_P$, as diagrammed in FIG. 19, or when the intersection $SM_P$ is in front of the position $S_P$ and the position $M_P$, as diagrammed in FIG. 20, circles S4 and S5 that satisfy conditions 1 to 3 noted below, respectively, are established, and a line comprising combinations of arcs on those circles S4 and S5 existing between the positions $S_P$ and $M_P$ is generated as the guidance course.

Condition 1: The circle S4 passes through the position $S_P$ and a straight line containing the vector spv is tangent thereto. The circle S5 passes through the position $M_P$ and a straight line containing the vector mpv is tangent thereto.

Condition 2: The center of the circle S4 is on the position $M_P$ side as seen from the position $S_P$, and the center of the circle S5 is on the position $S_P$ side as seen from the position $M_P$.

Condition 3: The circles S4 and S5 have the same diameter and are mutually tangent.

Figure 21:
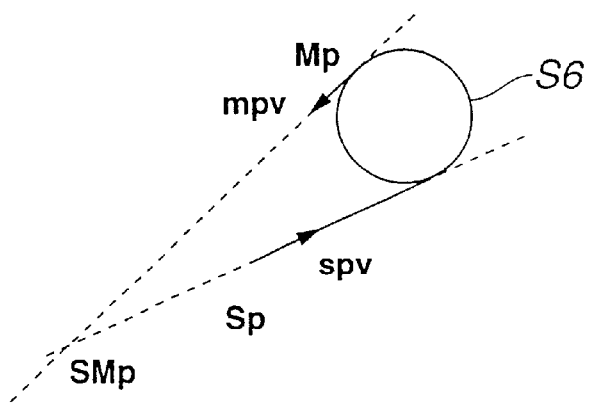
FIG. 21 is a diagram representing an aspect of guidance course generation.

(b-3) When the intersection $SM_P$ is behind the position $S_P$ and in front of the position $M_P$, as diagrammed in FIG. 21, a straight line containing the vector spv and a circle S6 to which a straight line containing the vector mpv is tangent are established. Then a line comprising a straight line extending from the position $S_P$ to the point where the straight line containing the vector spv touches the circle S6, and the arc on the circle S6 extending from that tangent point to the position $M_P$, is generated as the guidance course.

Figure 22:
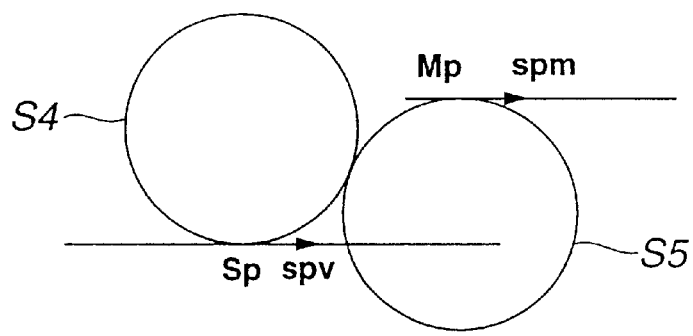
FIG. 22 is a diagram representing an aspect of guidance course generation.

(C) When the position $M_P$ does not exist on the straight line $S_P$+m spv, the vectors spv and mpv are mutually parallel, and spv=mpv, as diagrammed in FIG. 22, circles S4 and S5 satisfying the conditions noted under (b-2) are established, and a line comprising combinations of arcs on those circles S4 and S5 existing between the positions $S_P$ and $M_P$ is generated as the guidance course.

Figure 23:
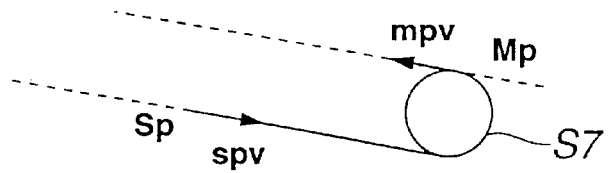
FIG. 23 is a diagram representing an aspect of guidance course generation.
Figure 24:
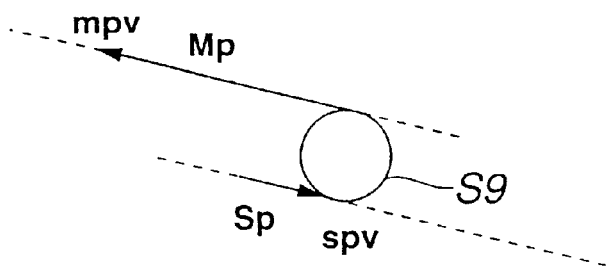
FIG. 24 is a diagram representing an aspect of guidance course generation.

(D) When the position $M_P$ does not exist on the straight line $S_P$+m spv, the vectors spv and mpv are mutually parallel, and spv=−mpv, as diagrammed in FIG. 23 and FIG. 24:

(d-1)

When the inner product (spv, $M_P$−$S_P$) of the vector spv and a vector directed from the position $S_P$ to the position $M_P$ is such that (spv, $M_P$−$S_P$)>0, as diagrammed in FIG. 23, a circle S7 the circumference whereof passes through the position $M_P$ and to which the straight line $S_P$+k spv and the straight line $M_P$+l mpv are tangent is established. Then a line comprising a straight line extending from the position $S_P$ to the point where the tangent $S_P$+k spv touches a circle 8, and an arc on the circle 8 extending from that tangent point to the position $M_P$, is generated as the guidance course.

(d-2)

When the inner product (spv, $M_P$−$S_P$) is such that (spv, $M_P$−$S_P$)<0, a circle S9 that passes through the position $S_P$ and to which the straight line $S_P$+k spv and the straight line $M_P$+l mpv are tangent is established. Then a line comprising an arc on the circle S9 extending from the position $S_P$ to the point where the straight line $M_P$+l mpv touches a circle S10, and a straight line extending from that tangent point to the position $M_P$, is generated as the guidance course.

The procedures for generating guidance courses for the unmanned dump truck 2 between the entrance branch point position $S_P$ and the intermediate point position $M_P$ described earlier are as described above. In the procedures for generating courses diagrammed in FIGS. 19, 20, and 22, the diameters of two circles are set equal, but this is done to simplify the computations, and it is possible to generate courses without setting the diameters of the circles equal.

Next, the processor 5 generates a guidance course between the intermediate point position $M_P$ and the target point position $T_P$ (step 105). The generation of this guidance course, however, follows the procedures for generating the guidance course between the branch point position $S_P$ and the intermediate point position $M_P$ described in the foregoing, and so is not further described here.

In step 103 described above, furthermore, coordinates for the position $M_P$ at the intermediate point are set randomly, but it is also permissible to provide so that coordinates are set sequentially from the coordinates of a prescribed end or edge of the course area 1. In step 105, moreover, when the guidance course is generated between the intermediate point position $M_P$ and the target point position $T_P$, it is permissible to establish one or a plurality of other intermediate points between those positions as may be necessary.

Figure 25:
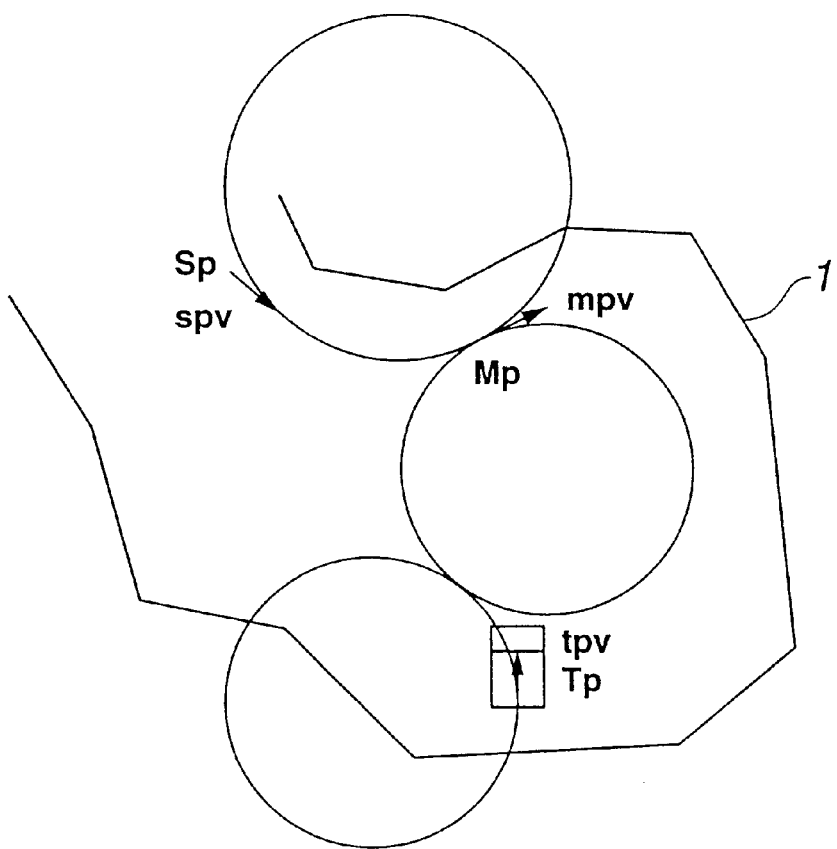
FIG. 25 is a diagram representing an aspect of guidance course generation.

Thus is completed the generation of one guidance course extending from the entrance branch point position $S_P$ through the intermediate point position $M_P$ to the target point position $T_P$, such as the guidance course exemplified in FIG. 25, for example. Thereupon the processor 5 computes the minimum distance between that guidance course and the boundary of the course area described earlier (step 106).

That is, the guidance course generated as described in the foregoing is represented as a sequence of coordinate points in like manner as the shape of the course area 1. Thereupon, the processor 5 finds the distances between the line segments indicated by points on the guidance course and the line segments indicated by points on the course area 1, and determines that minimum distance.

Now, it is preferable that the guidance course generated be established so that the distance from the boundary of the course area 1 becomes as great as possible, so that the unmanned dump trucks 2 can move with the largest turning radius, and so that the dump trucks 2 can reach the position $T_P$ at the target pot in the shortest possible distance.

Thereupon, the processor evaluates the guidance course generated as described in the foregoing, using the evaluation functions noted below (step 107).

$$E=f1\{min(\text{distance from edge})\}+f2\ (\text{minimum } R)+f3(\text{length of course})$$

where min(distance from edge) is the minimum distance between the guidance course and the boundary of the course area 1; minimum R is the minimum value of the radiuses of the circular arc portions of the guidance course; and length of course is the length of the guidance course.

In step 108, a determination is made as to whether or not the minimum distance noted above is smaller than ½ the vehicle width, and in step 109, a determination is made as to whether or not it is smaller than the minimum radius noted above (the minimum turning radius of the dump truck 2).

If the minimum distance is smaller than ½ the vehicle width, that suggests the possibility of the dump truck 2 conflicting with the boundary of the course area 1, and if the minimum radius is smaller than the standard radius, that suggests that the guidance course generated contains portions where the dump truck 2 cannot turn around.

When the results of the determinations made in steps 108 and 109 here are both YES, a routine is executed to make the evaluation value E a value of 0 (step 110).

In step 111, a determination is made as to whether or not the evaluation value E is larger than the best evaluation value E best obtained thus far.

When the result of the determination made in step 111 is YES, the best evaluation value up till then is updated by the evaluation value E, and the intermediate point position $M_P$ established in step 103 and the guidance course generated in steps 104 and 105 are stored in the guidance course memory unit 9 indicated in FIG. 13 (step 112).

Next, in step 113, a determination is made as to whether or not the evaluation value E is larger than the preset standard evaluation value. If the evaluation value E is larger than the standard evaluation value, the intermediate point position $M_P$ and guidance course currently stored in the guidance course memory unit 9 are established as the adopted intermediate point position and the adopted guidance course (step 114).

If the results of the determinations made in steps 111 and 113 are NO, on the other hand, the guidance course generation number n (set suitably according to the size of the course area, etc.) is incremented by 1 (step 115), and a determination is made as to whether or not the generation number n has reached a set iteration (step 116).

If the generation iteration n has not reached the set iteration, the procedure returns to step 103, whereas, if that iteration n has reached the set iteration, the procedure moves to step 114.

As already noted, when the results of the determinations made in steps 108 and 109 are YES, a routine is executed to make the evaluation value E a value of 0. Therefore, the result of the determination made in step 111 becomes NO, and, as a consequence, the procedure returns to step 103 and generation processing for another course is executed.

What that means is that, based on the procedure described above, when the guidance course generated contains a portion wherein the dump truck 2 cannot turn around, or there is a possibility of the dump truck 2 conflicting with the boundary of the course area, another guidance course, different from that guidance course, will be generated.

Ultimately, then, a guidance course is generated that contains no segment wherein the dump truck 2 cannot turn around and wherewith there is no danger of a conflict occurring.

The minimum distance that is the subject of the determination in step 108 contains course area measurement errors. Also, when the dump truck 2 is guided based on the course data described earlier, errors such as position measurement errors and travel control errors and the like occur. Accordingly, in order to raise the reliability of the conflict check made in step 108, decision criteria that are adjusted for such errors should be employed in ½ the vehicle width noted earlier.

As is evident from the foregoing description, based on the procedures described above, a guidance course is generated, on the basis of the coordinates of a randomly designated intermediate point position $M_P$, that extends from an entrance branch point position $S_P$, passes through the intermediate point position $M_P$, and arrives at the target point position $T_P$, that is, more specifically, a guidance course configured by straight lines, circular arcs, or a combination thereof When the evaluation value for the guidance course generated is higher than the standard evaluation value, or when the guidance course generation iteration n has reached a set iteration, the adopted intermediate point position and the adopted guidance course are determined.

The processor 5 transmits that adopted intermediate point position and that adopted guidance course by the communications unit 7 indicated in FIG. 13 to the monitoring station 8.

In the guidance course generation method described in the foregoing, the intermediate point position $M_P$ is randomly established, but that intermediate point position $M_P$ may instead be established sequentially from any edge position in the course area 1. Alternatively, a prescribed zone may be designated in the course area and the intermediate point position $M_P$ sequentially established from any edge position in that zone.

In the guidance course generation method described in the foregoing, furthermore, the guidance course is configured by straight lines, circular arcs, or a combination thereof, but it is also possible to configure a guidance course wherein the intervals between the positions $S_P$ and $M_P$ and between the positions $M_P$ and $T_P$, respectively, are connected by a spline curve, or, alternatively, the configuration may be made by combining straight lines, circular arcs, and spline curves.

In the description above, moreover, guidance courses are automatically generated wherein no conflicts arise, but provision may also be made so that every time one course is generated the response of an operator is requested for that course.

In other words, an embodiment aspect can be adopted wherein, every time one course is generated, indications are made as to whether conflicts arise or the possibility of conflicts exists with that course, and an operator then selects the best course based on those indications.

Next, the guided travel of a dump truck 2 using the guidance courses described above is described.

An unmanned dump truck 2 that has been automatically driven to the entrance branch point position $S_P$ described earlier is temporarily stopped by a stop command from the monitoring station 8. Then, at the point in time where an automatic operation command is received from the monitoring station 8, automatic operation travel is commenced inside the course area 1.

More specifically, the processor 5, based on the automatic operation command, starts a travel mechanism unit 10, causing the unmanned dump truck 2 to travel, or, simultaneously, verifies the current position of the unmanned dump truck 2 based on the output of the travel position measurement unit 4, and, based on that current position and the guidance course stored in the guidance course memory unit 9, controls a steering mechanism unit 11 in the dump truck 2 so that that unmanned dump truck 2 is positioned on that guidance course. Hence the unmanned dump truck 2 will travel over the guidance course and arrive at the target point position $T_P$.

In the embodiment aspect(s) described in the foregoing, the unmanned dump truck 2 branch point $S_P$ is established as the entrance to the course area 1. However, in cases where the boundary between the entrance to that course area and the so-called whole road that is the travel route for the dump truck 2 up to the entrance to the course area 1 is not clear, or the course area 1 is very long, the branch point $S_P$ may be made at any position on that whole road.

In that case, that branch point $S_P$ may be determined on a one-to-one basis as a position on the whole road removed a prescribed distance from the target point position $T_P$, or, alternatively, the branch point position $S_P$ may be expressed using a parameter for determining a position on the whole road (such, for example, as the distance of movement of the dump truck 2 from a prescribed departure point on the guidance course established beforehand on the whole road), searching for that parameter together with the intermediate point position $M_P$, and then determining the branch point $S_P$.

In the embodiment aspects described in the foregoing, furthermore, the intermediate point position $M_P$ is given in terms of rectangular coordinates (X, Y), but that intermediate point position $M_P$ can also be given in terms of cylindrical coordinates (θ, 1). It is also permissible to use two perpendicular vectors as the standard in the coordinate system, or to use any vectors having different directions, such, for example, as the entrance branch point position $S_P$ or target point position $T_P$ described earlier.

The intermediate point position $M_P$ can also be given as follows.

That is, a circle can be drawn which passes through the entrance branch point position $S_P$ and touches the direction vector spv, and the intermediate point position $M_P$ then established by the radius of that circle and the length of the arc from the position $S_P$ in that circle.

Similarly, moreover, a circle can be drawn which passes through the movement target point position $T_P$ and touches the direction vector tpv, and the intermediate point position $M_P$ then established by the radius of that circle and the length of the arc from the position $T_P$ in that circle.

In cases like that, either a partial guidance course extending from the position $S_P$ to the position $T_P$, or a partial guidance course extending from the position $T_P$ to the intermediate point position $M_P$, will be produced simultaneously with the establishment of that intermediate point position $M_P$, so it is then no longer necessary to produce this partial guidance course according to the algorithm described earlier.

The partial guidance courses described above will be configured as courses wherein the dump truck 2 is fully able to make turns, by the radius of the circle being set equal to or greater than the minimum turning radius of the dump truck 2.

In the foregoing description, the intermediate point position $M_P$ is established drawing one circle, but a plurality of circles can be drawn, and that intermediate point position $M_P$ established by the radiuses of those circles and the arc lengths on those circles.

Figure 26:
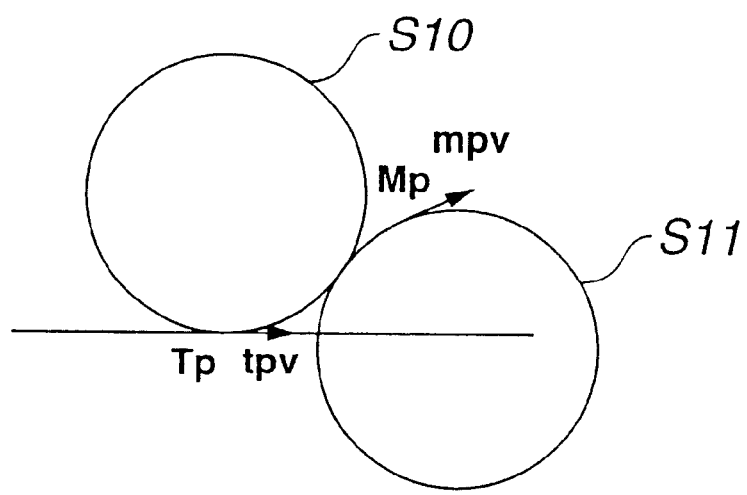
FIG. 26 is a diagram representing an aspect of guidance course generation.

More specifically, as diagrammed in FIG. 26, for example, a circle S10 that passed through the movement target point position $T_P$ and is tangent to the vector tpv and another circles S11 of the same radius tangent to that circle S10 can be drawn, and an intermediate point position $M_P$ referenced to the movement target position $T_P$ then established on the basis of the radiuses of those circles, the length of the arc extending from the position $T_P$ to the point where the circles S10 and S11 are tangent, and the length of the arc extending from that tangent point to the intermediate point position $M_P$.

There are two different circles that pass through the movement target point position $T_P$ and touch the vector tpv, namely the circle S10 (drawn in the diagram) positioned above the vector spv, and a circle (not shown) positioned below the vector spv.

That being so, in order to draw the two circles noted above and establish the intermediate point position $M_P$, a total of four parameter values will be designated, namely the radius of the circles, the length of the arc in one circle, the length of the arc in the other circle, and a flag indicating whether the circle on the left is positioned below or above the tangent line. It is not absolutely necessary, either, to set the radiuses of the two circles equal.

When the intermediate point position $M_P$ is established drawing a plurality of circles, as described in the foregoing, a partial guidance course reaching to that intermediate point position $M_P$ will be produced simultaneously with that establishment, so it will no longer be necessary to produce that partial guidance course using the algorithm described earlier.

That partial guidance course also will contain no portion wherein the unmanned dump truck 2 cannot turn around, by the setting of the radiuses of the circles equal to or greater than the minimum turning radius of the dump truck 2.

Figure 27:
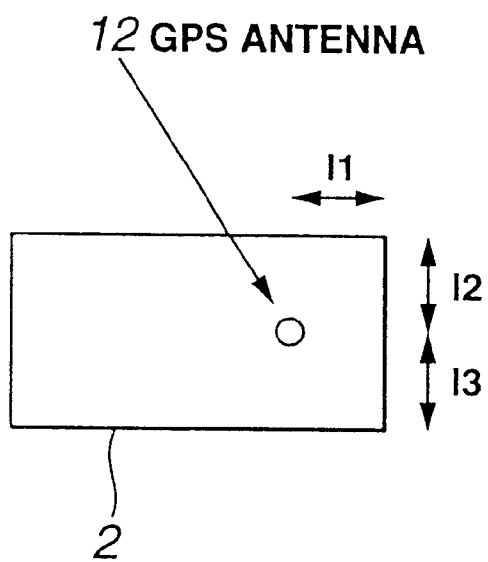
FIG. 27 is a plan representing the positions wherein a GPS antenna is deployed.

Now, the position measurement unit 4 indicated in FIG. 14 comprises the GPS described earlier, but, when the antenna 12 for that GPS is deployed at the front center of the unmanned dump truck 2, as diagrammed in FIG. 27, the GPS will measure the position where that antenna 12 is deployed as the travel position of the unmanned dump truck 2.

Accordingly, when the unmanned dump truck 2 is made to travel along the boundary of the course area 1, and an attempt is made to measure the shape of the course area 1 based on the results of the positions detected moment by moment by the GPS obtained at such time, the measured shape of the course area 1 will become a shape wherein the boundary of the actual course area 1 is shifted toward the inside by a distance that is approximately half the vehicle width of the unmanned dump truck 2. In other words, the shape of the course area 1 so measured will contain an error corresponding to a distance that is approximately half the vehicle width.

Figure 28:
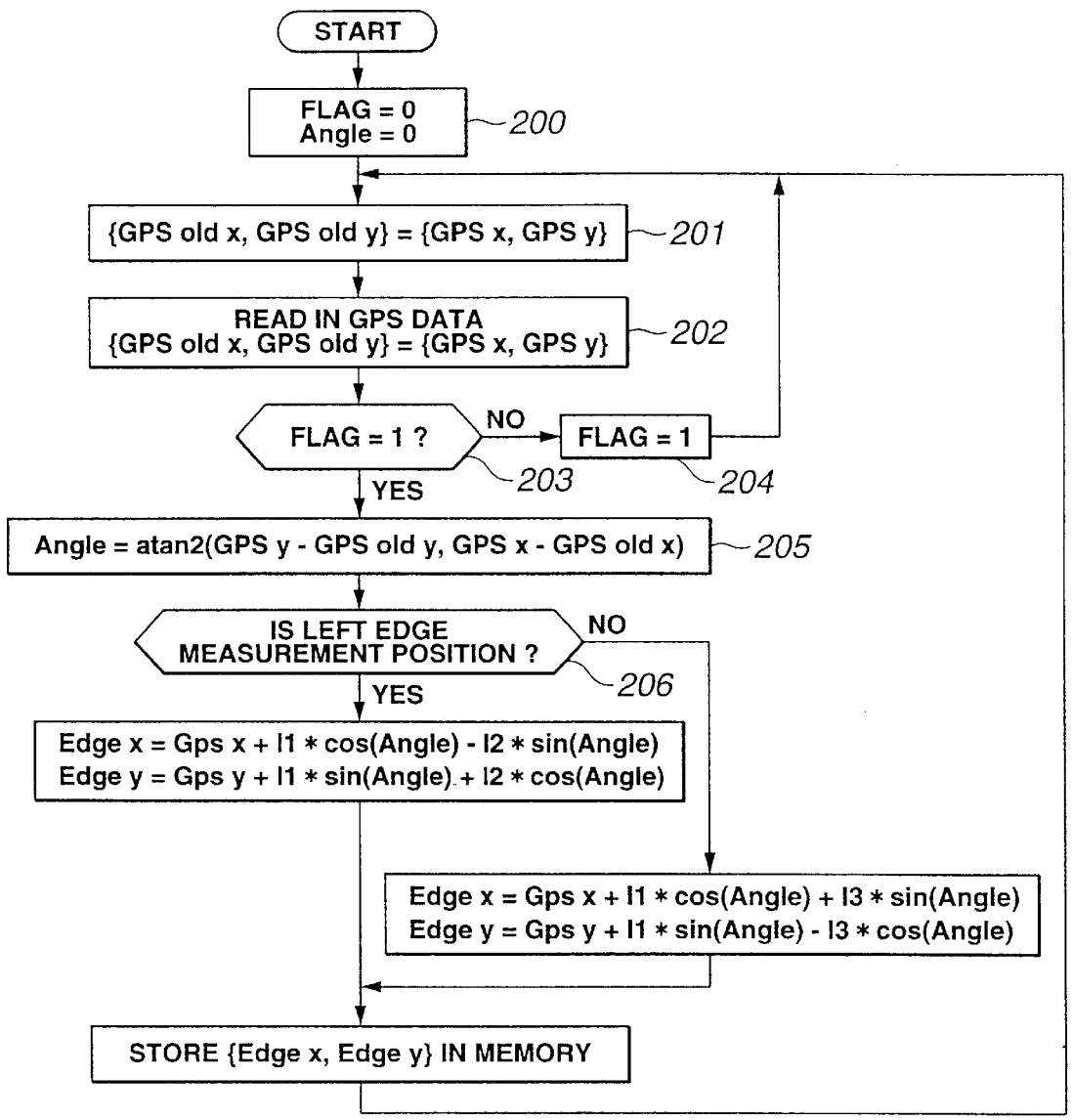
FIG. 28 is a flowchart of GPS-based measured position switching processing.

In FIG. 28 is exemplified a procedure that reduces the error described above to the extent possible. That procedure is executed in the processor 5, but, when it is being executed, the measurement mode is set by the mode setting unit 3 described earlier.

The GPS outputs data (hereinafter called GPS data) indicating the position of the dump truck 2 at prescribed periods. With the procedure diagrammed in FIG. 28, after a flag and the dump truck 2 azimuth angle have respectively been initialized at 0 (step 200), read-in GPS data {GPS x, GPS y} are set as the GPS data {GPS old x, GPS old y} that were output the previous period (step 201).

Next, when the GPS data {GPS x, GPS y} are being read in (step 202), a determination is made as to whether or not the flag has been set to 1 (step 203).

At the current point in time, the flag is 0, wherefore the result of the determination made in step 203 will be NO. That being so, after that flag has been set to 1 (step 204), the procedure returns to step 201.

Subsequently, the routines in steps 201 to 203 will be executed again, but the result of the determination made in step 203 will be YES due to the fact that the flag is set to 1.

Thus the GPS data {GPS old x, GPS old y} output the previous period and the GPS data {GPS x, GPS y)} output in the current period are obtained, wherefore the azimuth angle of the unmanned dump truck 2 is computed according to the formula 1 below (step 205).

$$\text{Angle} = a\tan2(\text{GPS } y - \text{GPS old } y, \text{GPS } x - \text{GPS old } x) \quad (1)$$

where a tan2 is an arctangent function for finding angles adjusted for the X and Y signs.

Next, a determination is made as to whether or not the left edge of the unmanned dump truck 2 is to be made the measurement position (step 206). The measurement position indication switch 13 indicated in FIG. 14 selectively designates the left edge or right edge of the unmanned dump truck 2 as the measurement position, and the determination made in step 206 is made based on the indication of that switch 13.

When the left edge measurement position has been designated, the position of that left edge is computed as the travel position, based on formulas (2) and (3) below (step 207). When the right edge measurement position has been designated, on the other hand, the position of that right edge is computed as the travel position, based on formulas (4) and (5) below (step 208).

$$\text{Edge } x = \text{GPS } x + 11*\cos(\text{Angle}) - 12*\sin(\text{Angle}) \quad (2)$$

$$\text{Edge } y = \text{GPS } y + 11*\cos(\text{Angle}) - 12*\cos(\text{Angle}) \quad (3)$$

$$\text{Edge } x = \text{GPS } x + 11*\cos(\text{Angle}) - 13*\sin(\text{Angle}) \quad (4)$$

$$\text{Edge } y = \text{GPS } y + 11*\cos(\text{Angle}) - 13*\cos(\text{Angle}) \quad (5)$$

where 11, 12, and 13 are parameters indicating the positional relationship of the GPS antenna 12 on the dump truck 2 (cf FIG. 27).

The computed travel position (Edge x, Edge y) is stored in the course area memory unit 6 (step 209), and then the procedure noted above is repeated.

Accordingly, if, with the left edge measurement position noted earlier designated, the unmanned dump truck 2 is made to travel so that the left edge thereof follows the boundary of the course area 1, the shape of the course area 1 can be measured with extremely good precision.

In the procedures described in the foregoing, furthermore, the azimuth angle of the unmanned dump truck 2 is calculated on the basis of quantitative positional changes in the unmanned dump truck 2, but that azimuth angle may also be measured using an optical fiber gyro or geomagnetic sensor. A so-called sensor fusion technique for improving detection precision using a plurality of different sensors complexly can also be employed in the measurement of the azimuth angle.

It is also possible, incidentally, to improve the precision of measuring the shape of the course area 1 by altering the position in which the GPS antenna 12 is actually deployed.

In that case, connectors for attaching the GPS antenna 12 are deployed at the left edge and the right edge of the unmanned dump truck 2, and the GPS antenna 12 selectively coupled to one of those connectors according to how the dump truck 2 is operated relative to the course area.

It is of course also possible to make the configuration such that separate GPS antennas are attached to the left edge and right edge, respectively, and have those antennas selectively connected to the GPS receiver by switching means.

If the course area is the loading area described earlier, that course area 1 will expand as the digging work of the excavating machine proceeds. That is, the shape of the course area 1 will change.

When the shape of the course area 1 changes, errors will appear in the minimum distance calculated in step 106 diagrammed in FIG. 14, and that will have an effect on the evaluation value in step 107. As the course area 1 changes and becomes larger, moreover, it will also become necessary to modify the guidance course of the unmanned dump truck 2.

In order to cope with shape changes in the course area 1, the operation of measuring the shape of the course area 1 may be implemented periodically, but that will reduce work performance, and so is not the best approach.

Accordingly, a procedure is described below for updating the shape of the course area 1 without implementing the measurement operation described earlier.

Figure 29:
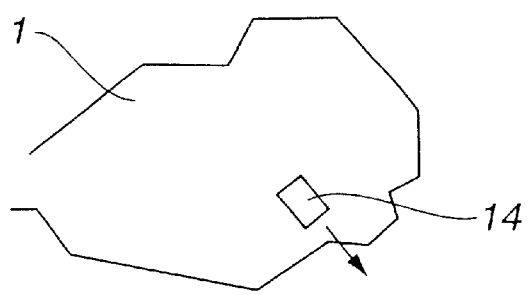
FIG. 29 is a conceptual diagram indicating the position of a loading machine in a course area.

A loading machine (loading apparatus) 14 such as a wheel loader is positioned at the loading place in the course area 1, as diagrammed in FIG. 29.

Figure 32:
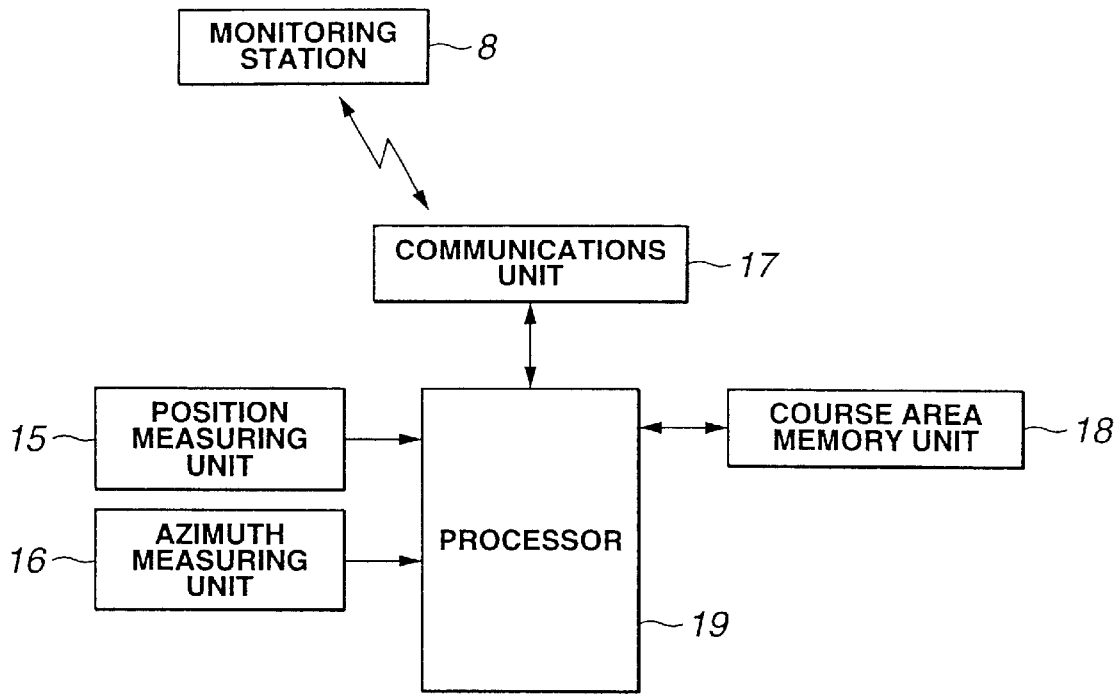
FIG. 32 is a block diagram of the configuration of a control system deployed in a loading machine.

This loading machine 14 is equipped with a position measuring unit 15 comprising a GPS, an azimuth measuring unit 16 comprising an optical fiber gyro or the like, a communications unit 17 for communicating with the monitoring station 8, a guidance course memory unit 18, and a processor 19, as diagrammed in FIG. 32.

Data indicating the shape of the course area 1 transmitted from the monitoring station 8, after being received by the communications unit 17, are stored in the processor 19 via the processor 18. The data indicating the shape of the course area 1 relate to the course area actually measured by the unmanned dump truck 2. That course area is hereinafter called the initial course area.

Figure 33:
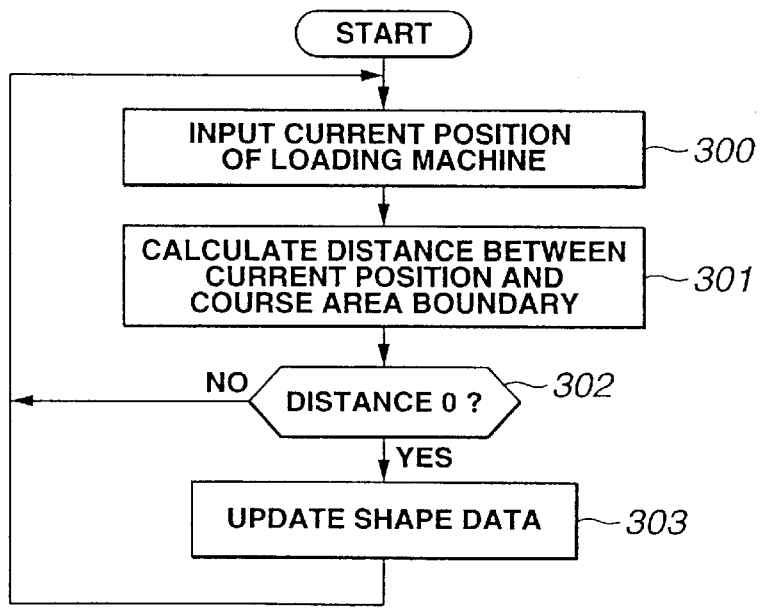
FIG. 33 is a flowchart exemplifying a course area updating procedure.

As diagrammed in FIG. 33, the processor 19 inputs the current position of the loading machine 14 measured by the position measuring unit 15 (step 300), calculates the distance between that position and the initial course area 1 (step 301), and makes a determination as to whether or not that distance has become 0 (step 302).

The loading machine 14, as indicated by the arrow in FIG. 29, advances toward the outside of the initial course area 1 as the ore excavation progresses. As a consequence, the distance between that position and the boundary of the initial course area 1 gradually diminishes.

Figure 30:
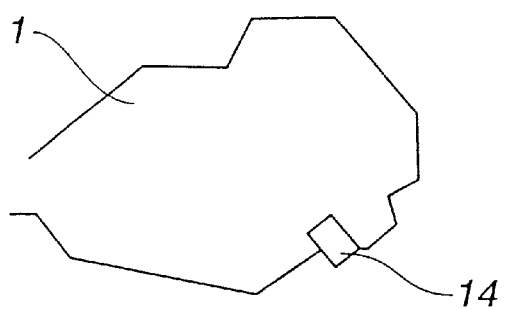
FIG. 30 is a conceptual diagram representing how a loading machine moves in a course area.

Then, when the loading machine 14 advances to the point where the distance noted above becomes 0, as diagrammed in FIG. 30, the result of the determination made in step 302 will become YES, so a course area shape updating routine is executed in the guidance course memory unit 18 (step 303).

That is, the course area shape data stored in the guidance course memory unit 18 are updated so that the area of advance of the loading machine 14 is added to the initial course area.

Figure 31:
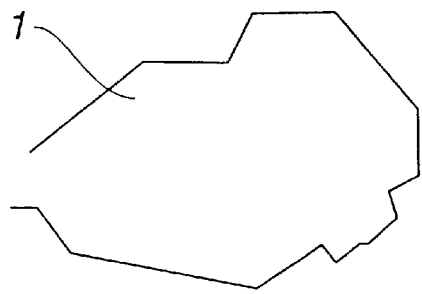
FIG. 31 is a conceptual diagram representing the shape of an updated course area.

As a result of that updating process, data indicating an enlarged course area shape, as diagrammed in FIG. 31, will be stored in the guidance course memory unit 18. That updated course area will subsequently be re-updated when the loading machine 14 has advanced further.

The area occupied by the loading machine 14 and the positions of the left and right front edges are computed by the processor 19, based on the position, shape, and azimuth of the loading machine 14.

The updated course area shape is transmitted via the communications unit 17 to the monitoring station 8. There the monitoring station 8 updates the movement target point position $T_P$ described earlier in response to the movement of the loading machine 14, and transmits that updated movement target point position $T_P$ and data indicating the updated course area shape to the dump truck 2.

The processor 5 of the dump truck 2 indicated in FIG. 13 executes the guidance course generation procedure diagrammed in FIG. 15, based on the movement target point position $T_P$ and the course area shape after the updating described above. As a result, the dump truck 2 will be guided along the guidance course that has been adapted to changes in the course area shape until it arrives at the movement target point position $T_P$.

Figure 34:
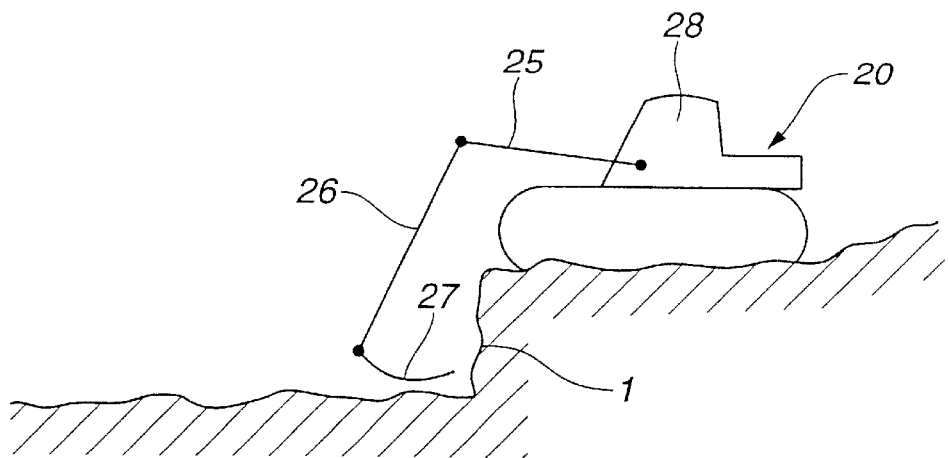
FIG. 34 is a conceptual diagram representing how a power shovel digs.

In the foregoing description, the course area shape is updated on the basis of changes in the position of the loading machine 14, but it is also possible to update the course area shape on the basis of the form of work being done by the excavating machine, such as the form of the work being done by the power shovel 20 diagrammed in FIG. 34, for example.

Figure 35:
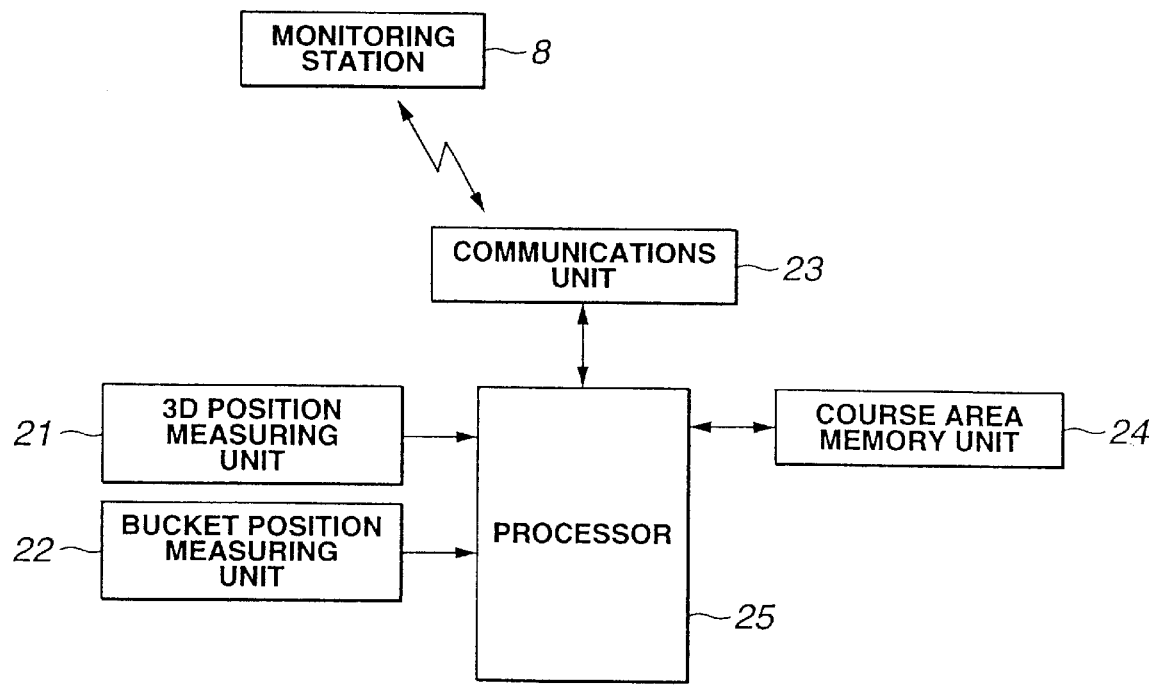
FIG. 35 is a block diagram of the configuration of a control system deployed in a power shovel.

In that case, the power shovel 20 is provided with a three-dimensional position measurement unit 21 comprising a GPS or the like, a bucket position measurement unit 22, a communications unit 23 for communicating with the monitoring station 8, a course area memory unit 24 for storing the course area shape, and a processor 25, as diagrammed in FIG. 35.

The bucket position measurement unit 22 measures the three-dimensional position of the bucket 27 on the basis of the three-dimensional position of the power shovel 20 measured by the three-dimensional position measurement unit 21, the turning angles of the boom 25, arm 26, and bucket 27, and the turning angle of the upper turning body 28.

Data indicating the shape of the course area (i.e. the initial course area) 1 transmitted from the monitoring station 8 are stored via the communications unit 23 and the processor 25 in the course area memory unit 24.

Figure 36:
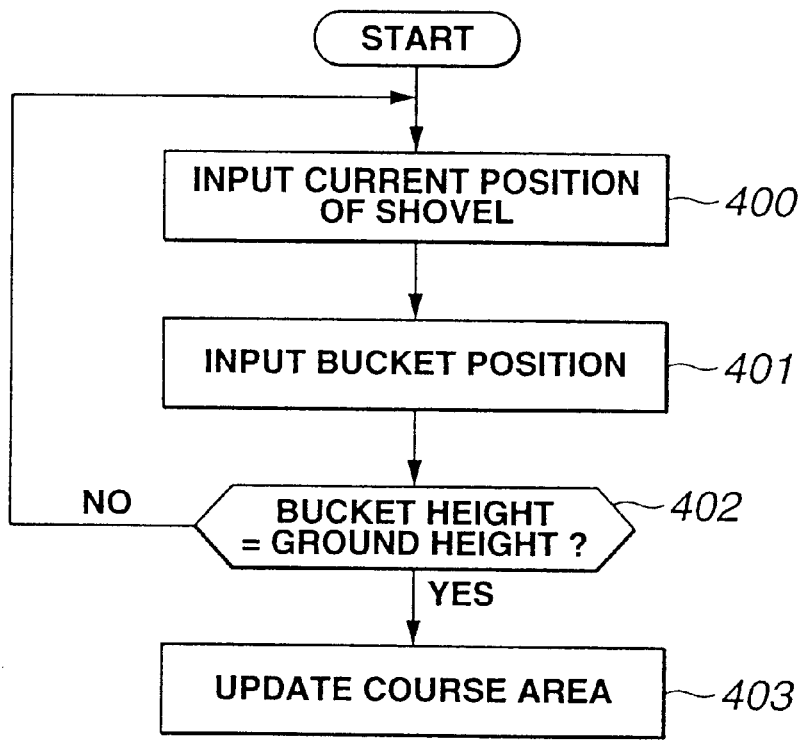
FIG. 36 is a flowchart exemplifying a course area updating procedure.
Figure 37:
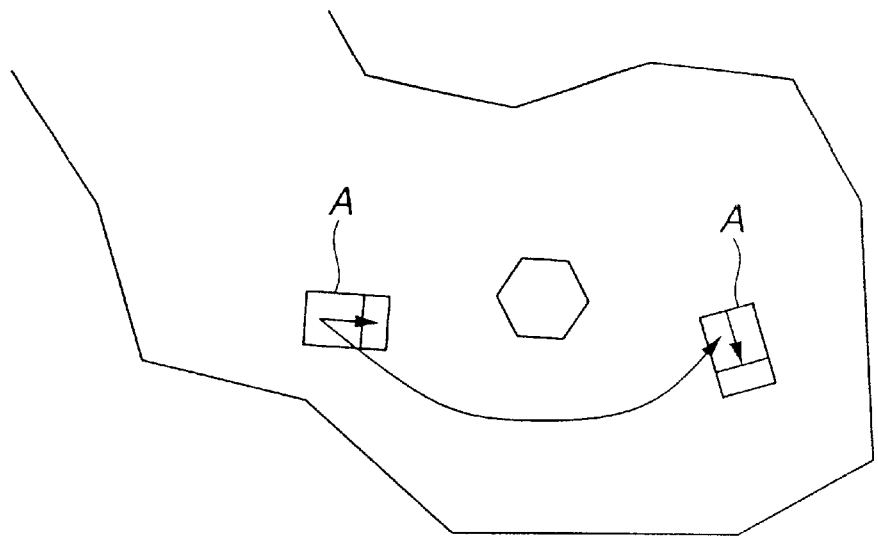
FIG. 37 is a conceptual diagram of one example of a route that cannot be negotiated.
Figure 38:
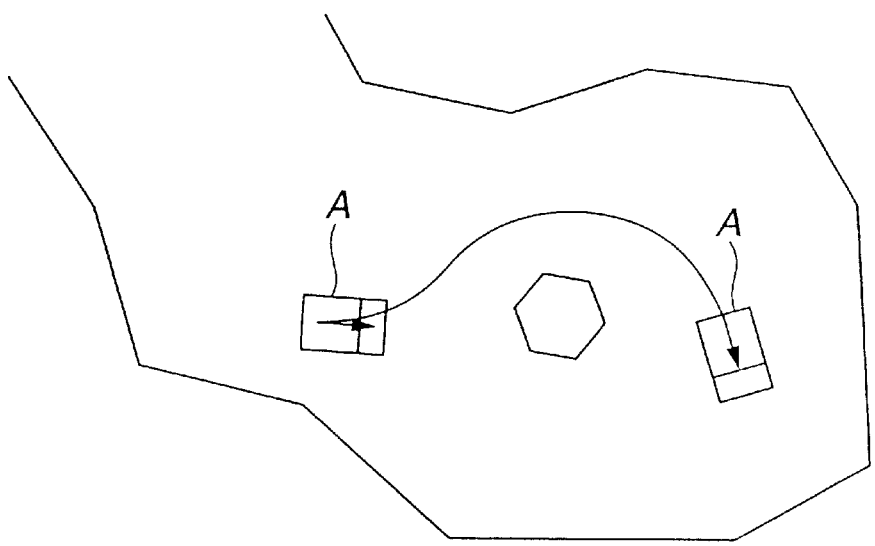
FIG. 38 is a conceptual diagram of one example of a route that can be negotiated.

In FIG. 36 is exemplified a course area shape updating procedure executed in the processor 25.

With this procedure, the position of the power shovel 20 measured by the three-dimensional position measurement unit 21 is input (step 400), and then the position of the bucket 27 measured by the bucket position measurement unit 22 is input (step 401).

The height of the site of excavation by the power shovel 20 above the ground becomes lower as the excavation progresses until it eventually coincides with the ground height inside the course area. Thereupon, in the next step, step 402, a determination is made as to whether or not the height of the bucket 27 coincides with the initial ground height inside the course area.

When making the decision in step 402, the height of the bucket 27 can be obtained from the output of the bucket position measurement unit 22. The initial ground height inside the course area is measured beforehand by appropriate means.

If the bucket 27 strikes the ground inside the course area, the height position at the three-dimensional position output by the bucket position measurement unit 22 will indicate that ground height, wherefore it is also possible for the power shovel 20 to measure the initial ground height itself.

When the result of the determination made in step 402 becomes YES, the course area updating process is executed (step 403). That is, the course area shape data stored in the course area memory unit 24 are updated so that the area commanded by the bucket 27 is added to the initial course area. Those updated shape data are re-updated subsequently as the excavation being done by the power shovel 20 advances further.

It is possible to update the shape of a course area 1 even when that course area is the dumping area described earlier.

That is, with a dumping area, the shape of that area will change in conjunction with the dumping operations of the dump truck 2, but the position of that dumping will be known from the position of the dump truck 2, and the dumping range will be known from the quantity of dumping done by that dump truck.

That being so, the course area shape data are updated so that the portion of the course area corresponding to that dumping position is subtracted from the dumping range. The updated shape data are of course re-updated in conjunction with subsequent dumping operations.

Now, in the embodiment aspect described in the foregoing, a measuring dump truck is actually made to travel about in order to measure the shape of a course area 1, but it is also possible to deploy a laser projector that projects a laser beam in horizontal directions while turning about a vertical shaft in, for example, the entrance portion of the course area 1, and a light receiver for receiving reflected light from that laser beam (light reflected from the boundary of the course area 1), and measuring the shape of that course area 1 on the basis of the time from the projection of that laser beam until the reception of the reflected light.

Based on that method, it is possible to measure the entire course area, but it is also permissible to measure only the shapes of zones in that area where the shape has been altered, using a low-power laser beam.

It is further possible to measure the shapes of such zones of altered shape by causing the measuring dump truck described earlier to travel in those zones of altered shape.

With the embodiment described in the foregoing, the height of the bucket 27 of the power shovel 20 is measured by the bucket position measurement unit 22 and, when that height measured by the bucket position measurement unit 22 has become the initial ground height in the course area 1, the course area 1 is expanded and updated just by the part of the area occupied by the bucket 27.

In many cases, however, the loading machine 14 is not provided with a working member position measuring unit such as the bucket position measurement unit 22. That being so, an embodiment is described next wherewith it is possible to update the course area 1 even when no working member position measuring unit such as the bucket position measurement unit 22 is carried on board.

Embodiment 1

It is assumed that the position of a loading machine 14 such as an excavator or wheel loader is measured by a position measuring apparatus such as a GPS. The position measured by the loading machine 14 is set to the movement target point $T_P$ of the unmanned dump truck 2. If the loading machine 14 is an excavator, for example, the position thereof is measured by one or more GPS units attached to the main body of the excavator, or to an arm or boom thereof FIG. 39 is a diagram for describing an updating process for expanding a course area 1 based on the current position of a loading machine 14 measured by that same loading machine 14. In FIG. 39, the boundary line of the course area 1 is indicated by the broken line designated 1a.

Figure 39A:
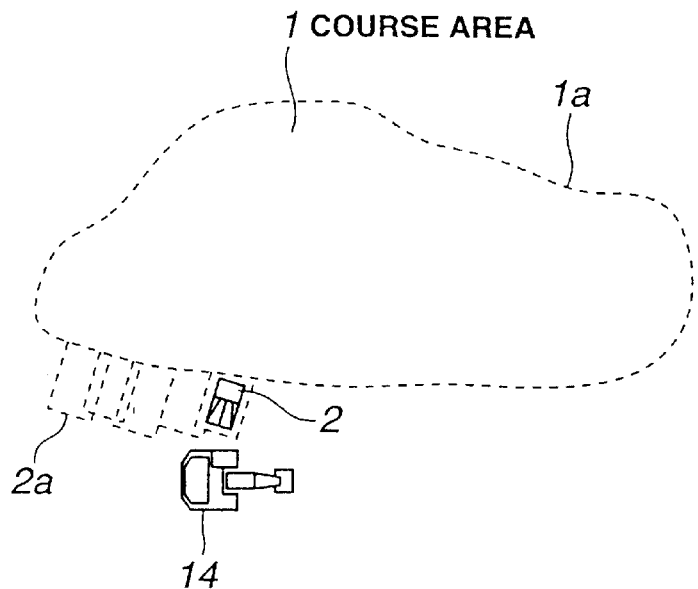
FIGS. 39(a), 39(b), and 39(b) are diagrams for describing how a course area is expanded.
Figure 39B:
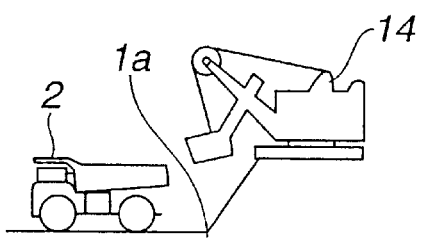
Figure 39C:
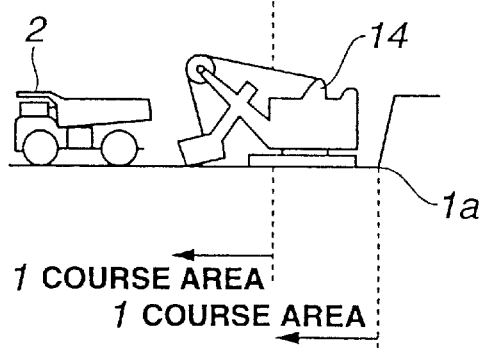

As diagrammed in FIG. 39(a), the loading machine 14 performs an excavation operation by so-called top loading, as diagrammed in FIG. 34. Accordingly, as the excavation and loading operations of the loading machine 14 progress, the situation diagrammed in FIG. 39(a) changes to the situation diagrammed in FIG. 39(b). In this manner, the operator of the loading machine 14 levels off the work surface according to the excavation, and expands the course area 1 again to make it possible for the unmanned dump truck 2 to travel.

When in this case a working member position measuring unit such as the bucket position measurement unit 22 is carried on board the loading machine 14, as in the embodiment described earlier, positional data can be acquired for the portion of the course area 1 to be expanded from the position of the bucket 27 when the height of the bucket measured by the bucket position measurement unit 22 has become the initial ground height in the course area 1. The course area 1 is then expanded just by the portion of the area occupied by the bucket 27.

In cases where no working member position measuring unit such as the bucket position measurement unit 22 is carried on board the loading machine 14, the position where the course area 1 expands and the range of that expansion are found on the basis of the current position of the loading machine 14 measured by the position measuring unit (GPS) carried on board the loading machine 14, that is, on the basis of the movement target point $T_P$ (i.e. the loading position) of the unmanned dump truck 2. More specifically, the area designated as the target position $T_P$ of the unmanned dump truck 2 is an area where ground surface roughness and the like have been smoothed out by the loading machine 14. This smoothed area is an area that is guaranteed by the operator of the loading machine 14 to be suitable for the unmanned dump truck 2 to travel over.

Thereupon, every time the current position of the loading machine 14 is measured by the position measuring apparatus (GPS) carried on board the loading machine 14 and the movement target point $T_P$ (loading position) of the unmanned dump truck 2 is given, that movement target point $T_P$ is deemed the position where the course area 1 is to be expanded, the course area 1 is successively expanded, and the course area 1 is subjected to automatic updating processing.

How to set the range wherein the course area 1 will be expanded when the movement target point $T_P$ is given is discretionary. The range wherein the course area 1 is expanded can be set, for example, to the size of the vehicle occupation range 2a centered on (referenced to) the movement target point $T_P$ (loading position) of the unmanned dump truck 2, as diagrammed in FIG. 39(a). When setting the range 2a occupied by the vehicle 2, a certain degree of latitude may be anticipated. Thus, as diagrammed in FIG. 39(a), the course area 1 will be successively expanded, by the amount of the range 2a occupied by the vehicle 2, every time the movement target point $T_P$ of the unmanned dump truck 2 is given.

When the movement target point $T_P$ for the unmanned dump truck 2 is given, the unmanned dump truck 2 moves toward that movement target point $T_P$. The travel course required for this unmanned dump truck 2 to move toward the movement target point $T_P$ may also be deemed to be that which has been smoothed by the loading machine 14, and it is possible simultaneously to add that to the expansion range of the course area 1.

Embodiment 2

An embodiment is described next wherewith the course area 1 is updated so that it contracts. In this case, the loading machine 14 performs excavation and loading operations in the situation d in FIG. 40(b). Thus, as the work being done by the loading machine 14 progresses, the boundary line 1a of the course area 1 will move toward the inside, and the course area 1 will contract.

A loading machine 14 such as an excavator moves a bucket to dig earth, then turns (rotates) its main body (upper turning body), and transports the ore in the bucket to the unmanned dump truck 2 and loads it, thus performing a chain of excavation and loading operations. The turning speed of the main body of the loading machine 14 is fast compared to the vehicle moving speed. For that reason, the operation of transporting the earth (ore) after digging the earth (i.e. the loading operation) is performed by rotating the main body while the vehicle itself remains stationary. Accordingly, when loading earth into the unmanned dump truck 2, the earth within a certain range referenced to the turning center position of the main body of the loading machine 14 will be excavated and that ground will be smoothed. Hence, at the point in time where the target point $T_P$ for the unmanned dump truck is given, the area excavated (to be excavated) can be estimated with reference to the turning center position of the loading machine 14.

Figure 40A:
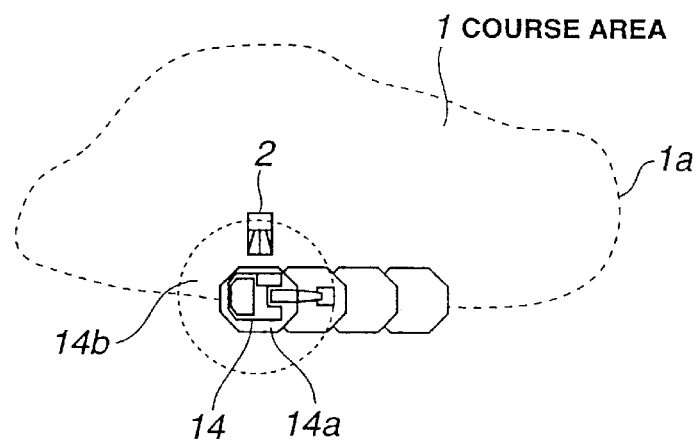
FIGS. 40(a) and 40(b) are diagrams for describing how a course area is contracted.
Figure 40B:
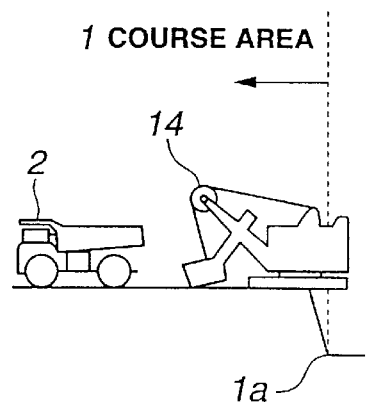

A loading machine 14 such as an excavator is capable of excavating any area within a range reachable by its arm, as diagrammed in FIG. 40(a). That being so, provision is made so that, at the point in time when the target point $T_P$ (loading position) of the unmanned dump truck 2 is given, all of the area 14b within the range reachable by the arm is excluded from the course area 1, based on the position of the turning center of the loading machine 14 at that time. As a result, it is possible to avoid the unmanned dump truck 2 intruding into an area being excavated, regardless of what work is being done by the loading machine 14 within the area 14b.

When the entire area 14b reachable by the arm of the loading machine 14 is excluded from the course area 1, however, the movement target point $T_P$ of the unmanned dump truck 2, if the condition is left unchanged, will end up being outside the course area 1. Thereupon, the process of excluding the range 14b reachable by the arm of the loading machine 14 is performed, making use of embodiment 1 also, so that the movement target point $T_P$ for the unmanned dump truck 2 is set inside the course area 1.

That is, the target point $T_P$ for the unmanned dump truck 2 is an area that has been smoothed by the loading machine 14 and made negotiable by vehicles. Thereupon only the target point $T_P$ is removed from inside the circle 14a reachable by the arm of the loading machine 14. That is because the possibility of areas within the range 14a of the loading machine 14 being excavated is conceivable.

Embodiment 3

In embodiment 2, embodiment is also possible such that only a part of the range 14b reachable by the arm of the loading machine 14, and not the entirety thereof, is excluded from the course area 1. That is, in ordinary mining operations, it is common not to begin excavating from the center of the course area where there is nothing, but to excavate within a certain range from the border 1a of the course area 1, and to leave the remaining portions as course area capable of being traveled over by the unmanned dump truck 2. Also, as the excavation progresses, the loading machine 14 will repeatedly move at odd times in intervals of 1 to 3 meters or so. Accordingly, even if the range excluded from the course area 1 is made about the size of the vehicle body, for example, the course area 1 that changes due to the excavation can be covered. Therefore, as the loading machine 14 moves, the areas 14a (octagonal area 14a) that are each about the size of the vehicle body existing within a certain range from the boundary of the course area 1, inside the circle 14b of the range reachable by the arm of the loading machine 14, are successively excluded from the course area 1, as diagrammed in FIG. 40(a).

Figure 41:
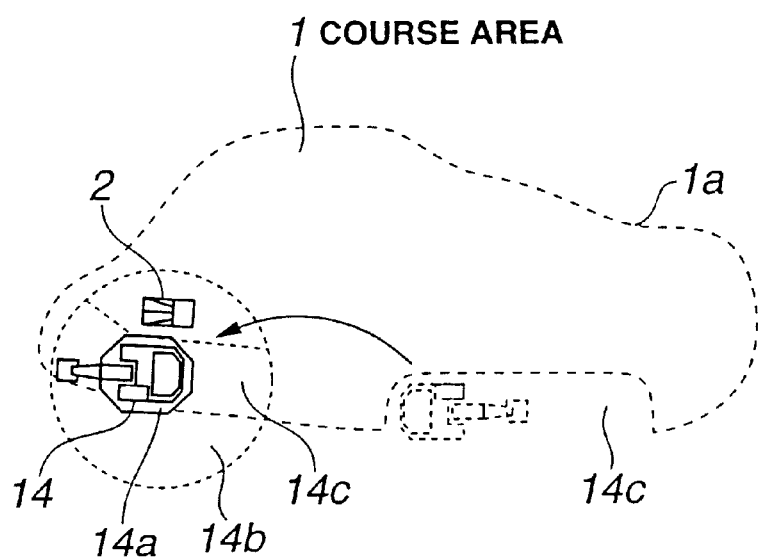
FIG. 41 is a diagram for describing how a coarse area is contracted.

When it has been determined that the loading machine 14 has moved at a high speed, the areas 14c wherewith the distance from the boundary 1a of the course area 1 becomes constant, in the circle 14b of the range reachable by the arm of the loading machine 14, are successively excluded from the course area 1, as diagrammed in FIG. 41.

Embodiment 4

In cases where the excavation operation does not exhibit a certain regularity, the operator of the loading machine 14 may directly designate the range to be excluded from the course area 1. If the loading machine 14 is an excavator, for example, embodiment is conceivable such that, by having the operator press a button or the like when he or she has moved the bucket over the position that is to be dug, that current bucket position can be designated as the range to be excluded from the course area 1. In such case, the direction and the position of the turning center of the excavator are determined by a plurality of position measuring apparatuses (GPSs) deployed on the excavator. Then the position of the bucket is calculated using those values and the already known distance between the bucket and the center of turning of the main body.

In embodiment 1 above was described an updating process for the case where the course area 1 expands, and in embodiments 2, 3, and 4 above were described updating processes for cases where the course area 1 contracts. Provision may be made so that either updating processing for expanding the course area 1 or updating processing for diminishing the course area 1 is performed according to the work situation. Embodiment is conceivable wherewith, for example, a selection switch is provided for selecting whether to expand or diminish the course area 1 according to the form of the work being done by the loading machine 14, and either an updating process for expanding the course area 1 or an updating process for diminishing the course area 1 is performed according to the result of the selection made with that selection switch.

The guidance course described in the foregoing is obtained by a heuristic problem solving technique, and various methods have been proposed for such solving techniques. With the simple Monte Carlo method, multiple trials are conducted, and the trial yielding the best evaluation function results is selected therefrom. With a method called the hill climbing method, trials are not conducted in all of the space, but a trial is conducted in a solution space near the previous trial, the evaluation value therefor is compared with the previous evaluation value, and the new trial is adopted when the evaluation value has improved. The hill climbing method is an effective technique for resolving heuristic problems at high speed.

With the hill climbing method, there are cases where the optimal solution will not be selected when a local solution exists in the solution space. When there is an island-shaped area into which entry is forbidden inside the course area, for example, a local solution sometimes exists, in which case there is a possibility that the optimal solution will not be selected.

Another heuristic method is the genetic algorithm (GA). This is a computation method wherewith some data for a plurality of candidates are exchanged, "intersections" that make new candidates, and mutations that alter some of the candidates are repeatedly implemented, and descendents are created having better evaluation values.

This method performs mutations from the entire solution space, so there is little likelihood that a local solution will be missed. Accordingly, the desired solution can be arrived at faster than with the Monte Carlo method, for which reason this method is frequently employed.

In this embodiment the genetic algorithm is used, but the details will have to be omitted here.

In this embodiment, guided travel course data are generated by providing a movement starting point $S_P$ and a direction spv at that position, as diagrammed in FIG. 15, but, instead of providing the movement starting point $S_P$ and direction spv at that position, the guided travel course may also be generated by providing a plurality of point sequences on a course that enters the course area 1. In that case, the following method is conceivable as a method for selecting the plurality of point sequences on the course that enters the course area 1. Specifically, it is only necessary to make trial changes, as with the intermediate point $M_P$, and select the case wherewith the evaluation function value is optimized. Or the operator may make a discretionary selection. Or, instead of providing point sequences, the points may be on line segments or circular arcs or spline curves, and one location among those selected.

The evaluation functions for evaluating the guided travel courses in the present invention are not limited by those cited in the embodiments described in the foregoing. The subject of the evaluation may be the time predicted for a guided travel course to be moved, for example. In that case, the shorter the movement time, the better the evaluation value. Or the position of a direction reversal may be made the subject of evaluation. In that case, the closer the position of direction reversal, the better the evaluation value. Or the evaluation value may be better the smaller the change in the attitude angle at the target position and the attitude angle at the position of direction reversal.

What is claimed is:

1. A vehicle guidance system for guiding a plurality of vehicles, comprising:

memory means for storing positions of obstacles at a work site common to the plurality of vehicles when the plurality of vehicles travel simultaneously over that work site;

updating means for updating content stored in the memory means, the stored content including common data for all of the vehicles; and guidance means for generating, based on the common data, travel course data for each vehicle that does not conflict with the obstacles, and guiding the plurality of vehicles respectively along each of the generated travel courses.

2. The vehicle guidance system according to claim 1, in which some or all of the plurality of vehicles comprise obstacle detection means for detecting obstacles; the vehicle guidance system further comprising:

obstacle position measurement means for measuring positions of those obstacles based on position of a vehicle when an obstacle has been detected by the obstacle detection means; and wherein the memory means stores the positions of obstacles measured by the obstacle position measurement means as positions of obstacles common to the plurality of vehicles; and the updating means updates the content stored in the memory means, based on the position of a new obstacle measured by the obstacle position measurement means, every time a new obstacle is detected by the obstacle detection means.

3. The vehicle guidance system according to claim 1, in which some or all of the plurality of vehicles comprise:

road surface condition detection means for detecting a road surface condition; and determination means for determining that a current road surface is an obstacle based on the road surface condition detected by the road surface condition detection means;

wherein the memory means stores position of a vehicle at the time when the current road surface was determined to be an obstacle by the determination means as position of an obstacle common to the plurality of vehicles; and the updating means updates the content stored in the memory means every time the determination means determines a new obstacle.

4. The vehicle guidance system according to claim 1, in which some or all of the plurality of vehicles comprise:

reception means for receiving signals from other manned vehicles indicating that an obstacle exists in vicinity of its own vehicle;

transmission means for transmitting signals indicating position of its own vehicle when a signal is received indicating that an obstacle exists in vicinity of its own vehicle; and obstacle position measurement means for receiving signals indicating a vehicle position transmitted from the transmission means and for measuring positions of obstacles near that vehicle based on the vehicle position received;

wherein the memory means stores the positions of obstacles measured by the obstacle position measurement means as positions of obstacles common to the plurality of vehicles; and the updating means updates the content stored in the memory means, based on the position of a new obstacle measured by the obstacle position measurement means, every time a signal is received by the reception means indicating that a new obstacle exists.

5. The vehicle guidance system according to claim 1, wherein, when a manned or unmanned work vehicle having vehicle position measurement means for measuring position of its own vehicle is present inside an area traveled over by the plurality of vehicles, the memory means stores the position of the work vehicle measured by the vehicle position measurement means as position of an obstacle common to the plurality of vehicles, and the updating means updates the content stored in the memory means every time the position of the work vehicle is altered by the vehicle position measurement means.

6. The vehicle guidance system according to claim 5, wherein the updating means updates the content stored in the memory means every time the positions of the work vehicles are successively changed in conjunction with traveling of the work vehicles.

7. The vehicle guidance system according to claim 5, wherein the updating means updates the content stored in the memory means every time the work vehicle stops traveling and stopped position of that work vehicle is changed.

8. A vehicle guidance system wherein:

each of a plurality of vehicles is provided with vehicle position measurement means for measuring current position of that vehicle;

when position data for target points that should be reached by each of the plurality of vehicles are given, data are generated for travel courses that pass through those target points; and each of the plurality of vehicles is made to guide that vehicle along its proper travel course while comparing the current vehicle position measured by the vehicle position measurement means with positions on the generated travel course;

the vehicle guidance system comprising:

memory means for storing positions of obstacles at a work site common to the plurality of vehicles when the plurality of vehicles travel simultaneously over that work site;

updating means for updating content stored in the memory means; travel course generation means which, when position data on the target points are given, generate data for travel courses that pass through those target points, based on content recorded in the memory means, so that there is no conflict with the obstacles; and guidance means for guiding the plurality of vehicles, respectively, along travel courses generated by the travel course generation means.

9. A vehicle guidance system wherein:

each of a plurality of vehicles is provided with vehicle position measurement means for measuring current position of that vehicle;

when position data for target points that should be reached by each of the plurality of vehicles and position data for a course area capable of being traveled by the plurality of vehicles are given, data are generated for travel courses that travel inside that course area and pass through those target points; and each of the plurality of vehicles is made to guide that subject vehicle along its proper travel course while comparing the current vehicle position measured by the vehicle position measurement means with positions on generated travel course;

the vehicle guidance system comprising:

memory means for storing positions of obstacles at a work site common to the plurality of vehicles when the plurality of vehicles travel simultaneously over that work site;

updating means for updating content stored in the memory means;

travel course generation means which, when position data on the target points and position data on the course area are given, generates data for the travel courses that travel inside the course area and pass through the target points, based on content recorded in the memory means, so that there is no conflict with the obstacles; and guidance means for guiding the plurality of vehicles, respectively, along travel courses generated by the travel course generation means.

10. The vehicle guidance system according to claim 9, comprising:

display means for displaying the course area on a display screen; and obstacle indication means for indicating positions of obstacles on the display screen based on relative positional relationship thereof with the course area on the display screen;

wherein the memory means stores the positions of obstacles on the display screen indicated by the obstacle indication means as positions of obstacles common to the plurality of vehicles; and the updating means updates the content stored in the memory means every time the position of an obstacle is newly indicated by the obstacle display means.

11. The vehicle guidance system according to claim 9, comprising:

display means for displaying on a display screen the course area and, of the travel courses generated by the travel course generation means, a traveled travel course or courses that have already been traveled over by the vehicles; and obstacle indication means for indicating positions of obstacles on the display screen based both on relative positional relationship thereof with the course area on the display screen and on relative positional relationship with the traveled travel course or courses on the display screen;

wherein the memory means stores the positions of obstacles on the display screen indicated by the obstacle indication means as positions of obstacles common to the plurality of vehicles; and the updating means updates the content stored in the memory means every time the position of an obstacle is newly indicated by the obstacle display means.

12. The vehicle guidance system according to claim 9, comprising:

display means for displaying the course area on a display screen;

obstacle indication means for indicating positions of obstacles on the display screen based on relative positional relationship thereof with the course area on the display screen; and revision means for revising the positions of obstacles indicated by the obstacle indication means, based on data on the traveled travel course or courses over which the vehicles have already traveled, of the travel courses generated by the travel course generation means;

wherein the memory means stores the obstacle positions revised by the revision means as positions of obstacles common to the plurality of vehicles; and the updating means updates the content stored in the memory means every time an obstacle position newly indicated by the obstacle indication means is revised by the revision means.

13. A vehicle guidance system comprising vehicle position measurement means for measuring current position of one vehicle, and being constructed such that, when position data for target points that should be reached by the vehicles and position data for a course area where the vehicle can travel are given, data for a travel course that travels inside the course area and passes through the target points are generated; and the subject vehicle is guided over that travel course while comparing current vehicle positions measured by the vehicle position measurement means and positions on the generated travel course;

the vehicle guidance system comprising:

indication means for indicating the position of a movement starting point inside the course area, the direction of a vehicle at the movement starting point, the position of a target point inside the course area, and the direction of a vehicle at the target point;

travel course generation means for generating travel course data wherewith the vehicle departs the movement target point in the indicated vehicle direction, alters the direction of advance thereof, reversing direction at one or more direction reversal points, and arrives at the target point in the indicated vehicle direction, so that, when position data indicating the boundary line of the course area are given, and the position of the movement starting point, the vehicle direction at the movement starting point, the position of the target point, and the vehicle direction at the target point are indicated by the indication means, the vehicle can travel over the interior enclosed by the boundary line of the course area and also turn around with a turning radius equal to or greater than the minimum turning radius of the vehicle; and guidance means for causing the vehicle to be guided over the travel course generated by the travel course generation means.

14. The vehicle guidance system according to claim 13, wherein the vehicle is an unmanned vehicle that is loaded with a load by a loading machine, and the course area position data are updated by excluding a certain area referenced to current position of the loading machine from current course area.

15. The vehicle guidance system according to claim 14, wherein the certain area excluded from the current course area is an area within reach of the loading mechanism of the loading machine.

16. The vehicle guidance system according to claim 14, wherein the certain area excluded from the current course area is inside an area within reach of the loading mechanism of the loading machine, and an area of about size of main body of the loading machine.

17. The vehicle guidance system according to claim 14, wherein the certain area excluded from the current course area is inside an area within reach of the loading mechanism of the loading machine, and an area that is located at a constant distance from the boundary of the course area.

18. The vehicle guidance system according to claim 13, wherein the vehicle is an unmanned vehicle that is loaded with a load by a loading machine; relative position indication means for indicating relative positions relative to the loading machine is provided; and position data for the course area are updated by excluding an area referenced to positions indicated by the relative position indication means from current course area.

19. The vehicle guidance system according to claim 13, wherein the vehicle is an unmanned vehicle that is loaded with a load by a loading machine, and position data for the course area are updated by adding, to current course area, an area within range occupied by the unmanned vehicle at a target point that should be reached by the unmanned vehicle.

20. The vehicle guidance system according to claim 13, wherein the vehicle is an unmanned vehicle that is loaded with a load by a loading machine, and position data for the course area are updated either by excluding a certain area referenced to current position of the loading machine from current course area, or by adding area within range occupied by the unmanned vehicle at target point that should be reached by the unmanned vehicle to current course area.

21. The vehicle guidance system according to claim 20, further comprising selection means for selecting whether the course area is to be expanded or contracted, according to type of work being done by the loading machine, wherein the course area position data are subjected to updating processing according to results of selection made by the selection means.

22. An unmanned vehicle guidance system for guiding unmanned vehicles over guidance courses based on travel positions of those unmanned vehicles measured by travel position measurement means and course data defining guidance courses for the unmanned vehicles; the unmanned vehicle guidance system comprising:

means for inputting shape of a course area;

means for respectively indicating the position of a movement starting point and the direction of advance of the unmanned vehicle at that position, and the position of a movement target point and the direction of advance of the unmanned vehicle at that position;

means for producing course data wherewith the indicated position and the direction of advance are satisfied at the movement starting point and at the movement target point, and wherewith the direction of advance of the unmanned vehicle changes at one or more direction reversal points provided between the movement starting point and the movement target point;

means for inferring conflicts between the course area and the unmanned vehicle when the unmanned vehicle is made to travel over a guidance course defined by the produced course data, based on data relating to the unmanned vehicle; and course data alteration means for altering the course data when a conflict has been inferred.

23. The unmanned vehicle guidance system according to claim 22, wherein the means for producing course data comprises:

means for generating position of an intermediate point in the guidance course inside the course area and direction of vehicle advance at that position; and means for connecting position of the movement starting point, position of the intermediate point, and position of the movement target point, with a circular arc or arcs and/or straight line or lines, so as to pass through each of those positions, and such that the direction of vehicle advance at each of those positions coincides either with direction of a tangent to such circular arc or arcs or with direction of such straight line or lines;

wherein the course data alteration means alters the course data by altering the position of the intermediate point when the conflict has been inferred.

24. The unmanned vehicle guidance system according to claim 23, wherein the means for producing the course data comprises:

evaluation means for evaluating the course data using distances between the guidance course and boundaries of the course area; and selection means for selecting course data having best evaluation values out of a plurality of generated course data.

25. The unmanned vehicle guidance system according to claim 23, wherein the means for producing the course data comprises:

evaluation means for evaluating the course data using a function between distances between the guidance course and boundaries of the course area, and minimum radius of the guidance course; and selection means for selecting course data having best evaluation values out of a plurality of generated course data.

26. The unmanned vehicle guidance system according to claim 22, wherein the means for producing course data comprises:

means for generating position of an intermediate point in the guidance course inside the course area and direction of vehicle advance at that position; and means for connecting position of the movement starting point, position of the intermediate point, and position of the movement target point, with a spline curve, so as to pass through each of those positions, and such that direction of vehicle advance at each of those positions coincides with direction of a tangent to the spline curve;

wherein the course data alteration means alters the course data by altering the position of the intermediate point when such conflict has been inferred.

27. The unmanned vehicle guidance system according to claim 22, wherein the means for producing the course data comprises:

means for generating position of an intermediate point in the guidance course inside the course area and direction of vehicle advance at that position; and means for connecting position of the movement starting point, position of the intermediate point, and position of the movement target point, with a spline curve and a circular arc, or with a spline curve and a straight line or lines, so as to pass through each of those positions, and such that direction of the vehicle advance at each of those positions coincides with direction of a tangent to that spline curve, direction of a tangent to such circular arc, or direction of such straight line or lines;

wherein the course data alteration means alters the course data by altering the position of the intermediate point when such conflict has been inferred.

28. The unmanned vehicle guidance system according to claim 22, wherein the travel position measurement means is a GPS, and means for inputting shape of the course area comprises:

means for switching a position measured by the GPS to a position measured at left edge or right edge of the unmanned vehicle; and indication means for indicating whether to switch to position measured at the left edge or to position measured at the right edge.

29. The unmanned vehicle guidance system according to claim 22, wherein the travel position measurement means is a GPS, and means for inputting shape of the course area comprises means for selectively altering position of antenna of the GPS to left edge or right edge of the unmanned moving body.

30. An unmanned vehicle guidance system for guiding unmanned vehicles over guidance courses based on travel positions of those unmanned vehicles measured by travel position measurement means and course data defining guidance courses for the unmanned vehicles; the unmanned vehicle guidance system comprising:

means for inputting shape of a course area;

means for producing travel course data wherewith the unmanned vehicle alters the direction of advance thereof reversing direction at one or more direction reversal points and arrives at a target point, so that, when the shape of the course area is input, the unmanned vehicle can travel over the interior enclosed by the boundary line of the course area and also turn around with turning radius equal to or greater than the minimum turning radius of the unmanned vehicle;

means for inferring conflicts between the course area and an unmanned vehicle when that unmanned vehicle is made to travel over a course defined by the produced course data;

course data alteration means for altering the course data when the conflict has been inferred; and mode setting means for causing the unmanned vehicle to be guided using the generated course data when automatic operation mode has been set, and for collecting course area shape data by causing the unmanned vehicle to be guided along a course area and detecting positions traveled by the unmanned vehicle when measurement mode been set.

31. An unmanned vehicle guidance system for guiding unmanned vehicles over guidance courses based on travel positions of those unmanned vehicles measured by travel position measuring means and course data defining guidance courses for the unmanned vehicles, the unmanned vehicle guidance system comprising:

means for inputting shape of a course area;

means for producing course data;

means for inferring conflicts between the course area and the unmanned vehicle when that unmanned vehicle is made to travel over a course defined by the produced course data, based on data relating to the unmanned vehicle;

course data alteration means for altering the course data when the conflict has been inferred;

means for recognizing a course area shape change zone; and course area shape updating means for updating shape of the course area so that that course area shape is altered only in the shape change zone.

32. The unmanned vehicle guidance system according to claim 31, wherein the means for recognizing the shape change zone of the course area comprises:

a moving body for measuring that moves through the course area;

movement position measurement means for measuring movement position of the moving body for measuring; and means for specifying the shape change zone based on the movement position of the moving body for measuring and an area occupied by that moving body.

33. The unmanned vehicle guidance system according to claim 31, wherein the means for recognizing the shape, change zone of the course area comprises:

position measurement means for measuring three-dimensional positions of digging unit of a work machine for digging operations in the course area;

ground height measurement means for measuring initial ground height in the course area; and means for specifying the shape change zone of the course area based on position of the digging unit and area occupied thereby when height of the digging unit and the initial ground height coincide.

* * * * *